(12) United States Patent
Thomas et al.

(10) Patent No.: US 9,509,798 B1
(45) Date of Patent: Nov. 29, 2016

(54) SUBSCRIPTIONS TO PAID CHANNELS OF AN INTERNET-BASED CONTENT PLATFORM

(71) Applicant: Google Inc., Mountain View, CA (US)

(72) Inventors: John Thomas, Mountain View, CA (US); Prabhu Balasubramanian, Mountain View, CA (US); Akash Hasmukh Parikh, Mountain View, CA (US); Robert Lee Thompson, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/921,420

(22) Filed: Jun. 19, 2013

Related U.S. Application Data

(60) Provisional application No. 61/820,659, filed on May 7, 2013.

(51) Int. Cl.
 *G06F 21/00* (2013.01)
 *H04L 29/08* (2006.01)
(52) U.S. Cl.
 CPC .................................... *H04L 67/32* (2013.01)
(58) Field of Classification Search
 USPC ............................................... 726/28; 705/51
 See application file for complete search history.

(56) References Cited

U.S. PATENT DOCUMENTS

| | | | |
|---|---|---|---|
| 5,585,866 A | 12/1996 | Miller et al. | |
| 6,314,572 B1 | 11/2001 | LaRocca et al. | |
| 6,774,926 B1 | 8/2004 | Ellis et al. | |
| 8,185,096 B2 * | 5/2012 | Smith et al. | 455/414.1 |
| 8,230,037 B2 * | 7/2012 | Story | G06Q 30/0283 709/217 |
| 8,370,874 B1 * | 2/2013 | Chang | H04N 21/4532 725/44 |
| 8,850,490 B1 * | 9/2014 | Thomas | H04N 21/47211 725/109 |
| 2003/0229900 A1 | 12/2003 | Reisman | |

(Continued)

FOREIGN PATENT DOCUMENTS

| | | |
|---|---|---|
| JP | 2003-150487 | 5/2003 |
| KR | 10-2009-0047756 | 5/2009 |

OTHER PUBLICATIONS

PCT Application No. PCT/US2004/034251 filed Apr. 15, 2014 in the name of Google, Inc, International Search Report and Written Opinion mailed Sep. 5, 2014.

(Continued)

*Primary Examiner* — Jeffrey Pwu
*Assistant Examiner* — William Corum, Jr.
(74) *Attorney, Agent, or Firm* — Lowenstein Sandler LLP

(57) ABSTRACT

An internet-based content platform that includes subscribable channels is provided. The internet-based content platform provides channels to end users. The internet-based content platform receives a selection of a paid channel from the list of channels from the end user. The paid channel includes a plurality of media items including at least one paid media item and at least one free media item. The internet-based content platform receives a selection of one of the plurality of media items from the end user. The internet-based content platform determines whether the selected media item is a free item or a paid item. When the selected media item is a paid item, the internet-based content platform requests subscription information of the end user. When the selected media item is a free item, the internet-based content platform provides the at least one free media item to the end user.

23 Claims, 35 Drawing Sheets

(56) References Cited

U.S. PATENT DOCUMENTS

| | | |
|---|---|---|
| 2006/0010470 A1 | 1/2006 | Kurosaki et al. |
| 2006/0078307 A1 | 4/2006 | Patrick |
| 2007/0219908 A1* | 9/2007 | Martinez .......................... 705/51 |
| 2007/0219910 A1* | 9/2007 | Martinez .......................... 705/51 |
| 2007/0266091 A1 | 11/2007 | Lin et al. |
| 2009/0007176 A1* | 1/2009 | Casey ................ H04N 21/2543 725/39 |
| 2010/0064324 A1 | 3/2010 | Jenkin et al. |
| 2010/0146432 A1* | 6/2010 | Robbin et al. ................. 715/781 |
| 2011/0067076 A1 | 3/2011 | Harris et al. |
| 2011/0191163 A1 | 8/2011 | Allaire et al. |
| 2011/0214170 A1* | 9/2011 | Wu ................................... 726/7 |
| 2011/0264530 A1 | 10/2011 | Santangelo et al. |
| 2011/0321072 A1* | 12/2011 | Patterson et al. .................. 725/5 |
| 2012/0131609 A1 | 5/2012 | Fernandez et al. |
| 2012/0315009 A1 | 12/2012 | Evans et al. |
| 2013/0013677 A1 | 1/2013 | Engstrom et al. |
| 2013/0073403 A1* | 3/2013 | Tuchman et al. ............... 705/16 |
| 2013/0198005 A1 | 8/2013 | Xiong et al. |
| 2014/0013375 A1 | 1/2014 | Giladi |
| 2014/0130182 A1* | 5/2014 | Yackanich et al. ............. 726/27 |
| 2014/0337139 A1 | 11/2014 | Thomas et al. |

OTHER PUBLICATIONS

U.S. Appl. No. 13/921,489, filed Jun. 19, 2013, in the name of Thomas, Notice of Allowance mailed May 22, 2014.
U.S. Appl. No. 13/921,489, filed Jun. 19, 2013, in the name of Thomas, Non-Final Rejection mailed Feb. 3, 2014.
U.S. Appl. No. 13/921,552, filed Jun. 19, 2013, in the name of Thomas, Non-Final Rejection mailed Sep. 25, 2014.
Wikipedia, "Now TV," Feb. 8, 2016, 5 pages, https://en.wikipedia.org/wiki/Now_TV.

* cited by examiner

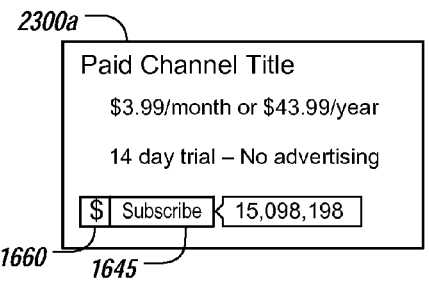
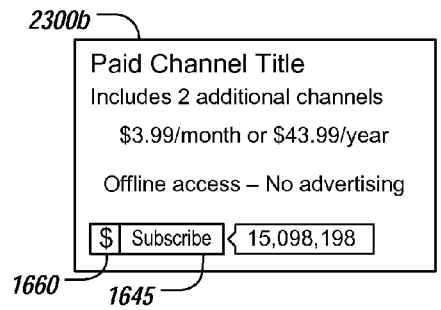
FIGURE 23A                    FIGURE 23B
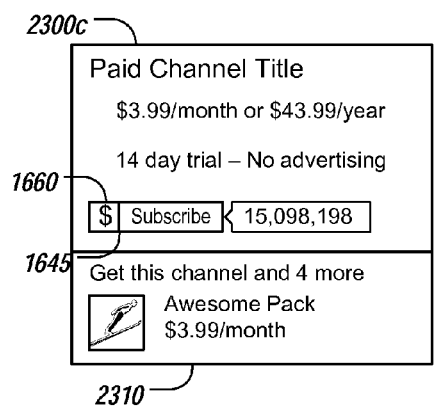
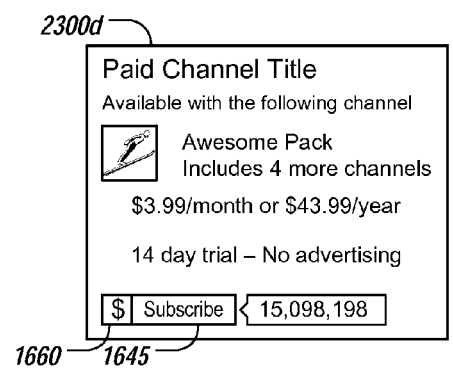
FIGURE 23C                    FIGURE 23D

SUBSCRIPTIONS TO PAID CHANNELS OF AN INTERNET-BASED CONTENT PLATFORM

RELATED APPLICATION

This application claims priority to U.S. Provisional Patent Application No. 61/820,659, filed May 7, 2013, which is herein incorporated by reference.

TECHNICAL FIELD

Embodiments of the present disclosure relate to the field of media consumption and, more particularly, to subscriptions to channels of an internet-based content platform.

BACKGROUND

Online content sharing platforms typically allow users to upload, view, and share digital content such as media items. Media items may include audio clips, movie clips, TV clips, music videos, images, or other multimedia content. Users may use computing devices (such as smart phones, cellular phones, laptop computers, desktop computers, netbooks, tablet computers) to use, play, and/or otherwise consume media items (e.g., watch digital videos, and/or listen to digital music).

Media items can be provided to a user through channels. A channel can include content available from a common source, or content having a common subject or theme. Currently, subscription mechanisms offered by media providers offer little or no flexibility to users and hinder the users' desire to quickly gain access to content of interest.

SUMMARY

The below summary is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for providing content in an internet-based content platform is described. The method includes providing a list of channels to an end user of the internet-based content platform. The method further includes receiving a selection of a paid channel from the list of channels from the end user. The paid channel includes a plurality of media items including at least one paid media item and at least one free media item. The method also includes receiving a selection of one of the plurality of media items from the end user. The method includes determining whether the selected media item is a free item or a paid item. When the selected media item is a paid item, the method further includes requesting subscription information of the end user. When the selected media item is a free item, the method includes providing the at least one free media item to the end user.

In additional implementations, computing devices for performing the operations described herein are also implemented. Additionally, in embodiments of the disclosure, a computer readable storage media stores instructions for performing the operations of the above described embodiments. In other implementations, an apparatus that includes means for performing the operations described herein are also implemented

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

FIGS. 23A-D illustrate example channel subscription information GUIs in accordance with some implementation of the present disclosure.

DETAILED DESCRIPTION

Figure 1:
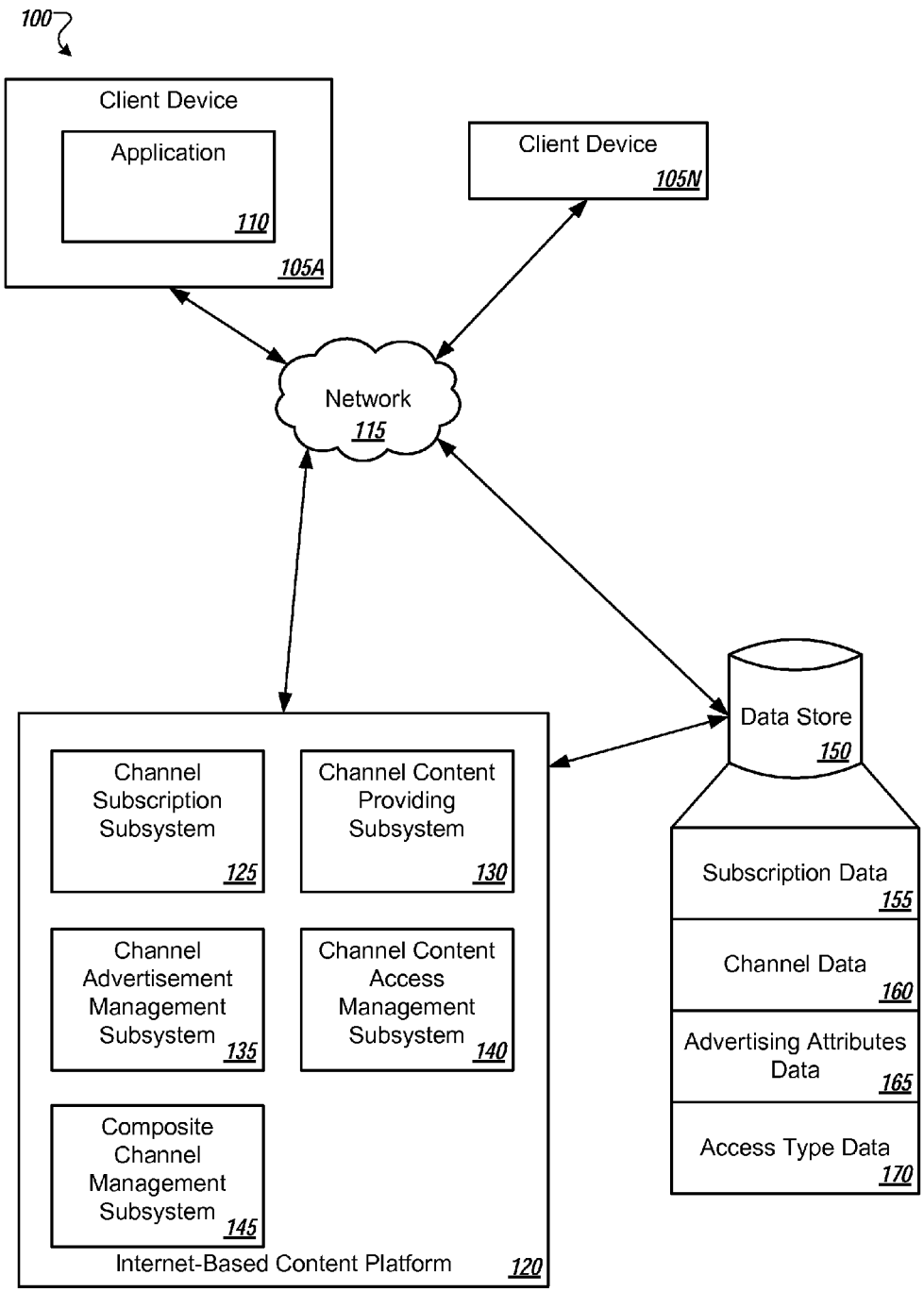
FIG. 1 illustrates an example network architecture in which embodiments of the present disclosure can be implemented.

The following disclosure sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

Implementations of the disclosure pertain to subscribing users to channels of an internet-based content platform. An internet-based content platform can be any platform that facilitates content uploading, sharing of content and feedback among various entities (e.g., individuals, organizations, etc.) and/or content curation. Entities are collectively referred to herein as users. A channel can be data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

According to some aspects of the disclosure, a user of the internet-based content platform is allowed to select a paid channel from multiple paid channels of different curators, subscribe to the paid channel, and immediately gain access to the content of the paid channel. The subscription and access can be facilitated via a single user interface which may involve just a few user interactions to find a paid channel of interest, subscribe to the paid channel, and access the content of the paid channel. The access to the content of the paid channel can be provided via a user feed. A user feed refers to content automatically generated for the subscriber that can include, for example, media items from one or more channels of the subscriber, feedback of other users for those media items, etc. The access to the content of the paid channel can also be provided via a subscription list presented in the user interface, via a search result presented in response to a search query of the subscriber, or the like.

The content of the paid channel can change dynamically, and the changed content can be immediately available to the subscribers. For example, the internet-based content platform can change the content of the paid channel in real time in response to a request of the curator of the paid channel (e.g., a request to add a new media item to the channel or a request to remove an existing media item from the channel), and the subscribers of the paid channel can be automatically presented with the changed content without any delay.

According to some aspects of the disclosure, the internet-based content platform can provide paid channels that include both paid and free media items. A user can select a paid channel of interest from a list of paid channels and may see that some media items of the selected paid channel are free and some media items are paid. If the user has not previously subscribed to the paid channel, the user may be allowed to view or play a free media item of the paid channel but the user may not be allowed to view or play a paid media item of the paid channel.

According to some aspects of the disclosure, the internet-based content platform can permit the user to select a subscription level when subscribing to a free or paid channel. The subscription level can be associated with different subscription fees for different types of access to the channel. Other subscription levels can be associated with different advertising attributes of the channel. Offering the subscription levels provide users with greater flexibility to select content and channel characteristics that better match their personal needs. For example, when a user selects a particular subscription level when subscribing to a channel, the user can view media items of the channel with fewer advertisements or can unlock access for additional user devices (e.g., a mobile phone, a tablet, etc.).

In some implementations, when the user is a subscriber of a channel (e.g., paid or free), the internet-based content platform can present the media item according to a subscription level that corresponds to a certain type of access or certain advertising attributes, as described herein. Similarly, when the user is not a subscriber of the channel, the internet-based content platform can present the requested media item according to a non-subscriber set of advertising attributes or a non-subscriber type of access.

For contemporary television service platforms, users typically submit a subscription request and then wait for an installation technician to complete the setup. In some instances, these services send a technician to the physical location of the user. In other instances, the technician manually activates the user subscription. In some contemporary television service platforms, the user can be usually required to dial a phone number or access another website to complete the subscription activation. Unlike these contemporary television service platforms, aspects of the internet-based content platform described herein permit a user to subscribe to a channel and then start consuming content at virtually the same time and within the same website or mobile application.

In addition, contemporary video hosting and sharing platforms typically either provide access to all content of a paid channel to a subscribed user, or limit or prevent access to all content of the paid channel to a non-subscribed user. Unlike these contemporary platforms, aspects of the internet-based content platform described herein permit full access to some content of a paid channel while restricting or limiting access to other content of the paid channel. A non-subscribed user can have full access to some movies of the paid channel, for example, while having limited or no access to other movies of the paid channel. The user can take an action, such as by subscribing to the paid channel, to unlock access to the other movies.

Further, contemporary media hosting or television platforms usually do not permit users to select advertising attributes when subscribing to a channel. Some music platforms can remove all advertisements when a user subscribes to the platform, but they typically do not permit users to choose different advertising attributes on a per channel basis. In contrast, aspects of the internet-based content platform described herein permit users to select different advertising attributes when subscribing to a channel.

Contemporary media hosting or television platforms typically do not permit users to select different subscription levels to unlock different types of access on a per-channel basis. For example, while contemporary television platforms may permit users to subscribe to different television packages, such platforms may not permit different access types for different individual channels. Aspects of the present disclosure address these limitations by giving users a significant level of flexibility on what they can purchase and watch. Using the techniques described herein, users can quickly gain access to desired content. Further, users can easily select different subscription levels that best fit their needs for individual channels.

As discussed above, a channel can be data content available from a common source or data content having a common topic or theme. The data content can include on or more media items. Examples of a media items can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc., media items comprising at least one of a video item, an audio item, an image, a blog entry, a tweet, a social network post, an online publication, a software program, or an online video game. A media item may be consumed via a web browser and/or via a mobile device application. For brevity and simplicity, an online video (also hereinafter referred to as a video) is used as an example of a media item throughout this document. As used herein, "media," media item," "online media item," "digital media," and a "digital media item" can include an electronic file that can be executed or loaded using software, firmware or hardware configured to present the digital media item to an entity. Content can also include live-streamed content and media items available on-demand.

The media items can be digital content chosen by a channel curator. The channel curator can be a user, a content provider, a media company, a broadband provider, a broadcaster, etc. The channel curator also can select various channel characteristics, such as whether the channel is free or paid. For paid channels, the curator can set or select a subscriber fee. The curator can also select different characteristics of the subscription, or define subscription levels that correspond to different types of access to the channels and corresponding subscriber fees. The internet-based content platform can include multiple channels that are created or curated by different channel curators.

A channel can be a paid channel that can be offered as a rental, purchase, or a paid subscription. A paid subscription involves a recurring payment for temporary access to an experience on the internet-based content platform. A rental involves a one-time payment for temporary access, and a purchase involves a one-time payment for unlimited access. Individual paid channels can be available for purchase "a la carte" (i.e. standalone) or as part of a package. Users can pick and choose the channels they want, unlike contemporary television and cable providers, where users obtain access to content as part of a large bundle.

As used herein, a channel can also refer to a composite channel. A composite channel is a channel that includes at least one component channel along with additional content. For example, a composite channel can include multiple component channels, or one or more component channels and at least one media item that is not part of any component channel. In one implementation, a component channel is not available for individual subscription; it is only available through a subscription to the composite channel.

FIG. 1 illustrates an example network architecture 100 in which embodiments of the present disclosure can be implemented. The network architecture 100 includes client devices 105A through 105N, a network 115, an internet-based content platform 120 and a data store 150. In one implementation, network 115 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) or LTE-Advanced network), routers, hubs, switches, server computers, and/or a combination thereof. In one implementation, the data store 150 may be may be a memory (e.g., random access memory), a cache, a drive (e.g., a hard drive), a flash drive, a database system, or another type of component or device capable of storing data. The data store 150 may also include multiple storage components (e.g., multiple drives or multiple databases) that may also span multiple computing devices (e.g., multiple server computers).

The client devices 105A through 105N may each include computing devices such as personal computers (PCs), laptops, mobile phones, smart phones, tablet computers, netbook computers, e-readers, personal digital assistants (PDA), or cellular phones etc. While only client devices 105A-105N are shown in FIG. 1, network architecture 100 may support a large number of concurrent sessions with many client devices 105.

Each client device includes at least one application 110 that allows an end user to subscribe to channels and view content and media items of the channels. For example, the application 110 may be a web browser that can present a list of subscribable channels to the end user. As a web browser, the application can also access, retrieve, present, and/or navigate content (e.g., web pages such as Hyper Text Markup Language (HTML) pages, digital media items, etc.) served by a web server. The application 110 may render, display, and/or present the list of subscribable channels and associated content to the end user. The application 110 may also provide an embedded media player (e.g., a Flash® player or an HTML5 player) that is embedded in a web page (e.g., a web page that may provide information about a product sold by an online merchant). In another example, the application 110 may be a standalone application (e.g., a mobile application or mobile app) that allows users to subscribe to channels and consume digital media items (e.g., digital videos, digital images, electronic books, etc.). The application 110 may be provided to the client devices 105A through 105N by the internet-based content platform 120. For example, the application 110 may be a browser that provides a media player that is embedded in a web page provided by the internet-based content platform 120. In another example, the application 110 may be an application that is downloaded from an application distribution platform, such as an "app store." (not shown).

The internet-based content platform 120 may include one or more computing devices, such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components.

The internet-based content platform 120 may provide digital content (e.g., digital video, streaming video, images, digital music, streaming music, social media information, etc.) to one or more of the client device 105 and may allow users to share content among multiple users. To provide digital content, for example, the internet-based content platform 120 may allow a user to subscribe to a paid or free channel. The internet-based content platform 120 may present different types of access or different subscriptions levels to the end user. The internet-based content platform 120 can also allow the end user to consume, upload, search for, curate, share, approve of ("like"), dislike, and/or comment on media items of various channels.

Although each of the internet-based content platform 120 and data store 150 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

Internet-based content platform 120 can include a channel subscription subsystem 125 that creates and manages end user channel subscriptions, a channel content providing subsystem 130 that provides content to end users, a channel advertisement management subsystem 135 that manages advertisements presented to end users, a channel content access management subsystem 140 that manages different types of access for the end users, and a composite channel management subsystem 145 that manages composite channel subscriptions and access. Internet-based content platform 120 can include any one of the above subsystems or any combination of the above subsystems. The internet-based content platform 120 and its respective subsystems can interact with the client device 105, such as via the application 110, to communicate data between the internet-based content platform 120 and the end user. The subsystems can be implemented on a single server, a cluster of servers, a cloud, etc. The subsystems can also be implemented individually, each on a separate server, cluster of servers, a cloud, etc.

Data store 150 may include any combination of subscription data 155, channel data 160, advertising attribute data 165 and access type data 170. Subscription data 155 may include subscription data for users that have subscribed to channels identified in channel data 160 (e.g., registered users of an internet-based content platform). The subscription data 155 may include channels that a user has subscribed to, subscription levels for channels the user has subscribed to, selected types of access, selected advertising attributes, data content that the user has liked, topics the user is interested in, etc.

Channel data 160 may include identification information for various channels, such as an identifier of the channel (e.g., name), one or more identifiers (e.g., names) of content or media items associated with the channel, a list of media items in each channel, and/or whether individual media items in the channel are free or paid, etc. Channel data 160 can be used by the internet-based content platform 120 to generate a list of channels to present to users. The channel data 160 can be created based on input from a channel curator (e.g., subscriber fees for a channel, media item groups, etc.). For a composite channel, channel data 160 may also include identifiers of one or more component channels associated with the composite channel.

Advertising attribute data 165 may include various advertising schemes or models that can be implemented by the internet-based content platform when users consume content. Advertising attribute data 165 may include a subscriber set of advertising attributes (e.g., advertising attributes available to subscribers) and a non-subscriber set of advertising attributes (e.g., advertising attributes available to non-subscribers). Advertising attributes may be specified for individual channels or multiple channels (e.g., component channels of a composite channel, channels of the same curator, channels having the same theme, etc.). Advertising attribute data 165 may include instructions for presenting advertisements to users. For example an advertising attribute can be an instruction to display no advertisements to subscribers of a channel. Another advertising attribute can be an instruction to decrease a number of advertisements presented to the end user after the end user has consumed at least one media item of a channel. Other examples of subscriber advertising attributes can include a decrease of an aggregate length of time advertisements are presented to the end user after the end user has consumed at least one of media items of the channel, a presentation of advertisements of a specific category, a reduction of a number of advertisements from a category, a frequency for presenting an advertisement, a duration for presenting an advertisement, or an option to skip an advertisement presentation within the channel. Advertising attributes can affect any advertisement presented within the internet-based content platform including in-stream advertisements, overlay advertisements, banner advertisements, etc. The non-subscriber advertising attributes can include a full complement of advertisements. The non-subscriber advertising attributes can also include non-skippable advertisements, or advertisements that can be skipped after a longer viewing duration than for subscribers of the channel.

Access type data 170 can include different types of access that can be available to users when consuming content. Types of access can include a quality characteristic of the media item (e.g., video resolution, such as HD, 4k, 1080p, 1080i, 720p, etc.), offline access (e.g., caching content for offline consumption), an addition of subtitles to the media items, changing a language of the media items, access to content via additional user devices (e.g., a mobile phone, a table, etc.), blocking access to media items and/or channels (e.g., blocking all horror movies and videos). Types of access attributes may be specified for individual channels or multiple channels (e.g., component channels of a composite channel, channels of the same curator, channels having the same theme, etc.).

In some embodiments, data store 150 is deployed across one or more datacenters. A datacenter is a facility used to house a large number of storage devices. Data in data store 150 may be replicated across the multiple datacenters in order to provide reliability, availability, and scalability (RAS) features and/or to allow fast load times for the presentation of content on the content hosting website. The manner of replication of data may be selected by a user, may be selected based on one or more replication algorithms, etc.

In embodiments of the disclosure, the internet-based content platform 120 notifies end users of the types of information that are stored in data store 150, and provides the end users the opportunity to choose not to have such information collected, analyzed, and/or shared.

During operation of system 100, a user accesses internet-based content platform 120 via client/user device 105 over network 115. When a user navigates the internet-based content platform 120, the internet-based content platform 120 can present one or more lists of subscribable channels. The user can navigate the internet-based content platform 120 to discover content and channels through keyword searching, browsing recommended channels, identifying other users' activity, such as by viewing channels or media items shared by others, or a combination thereof. Users can also discover content and channels through advertisements presented within the internet-based content platform 120.

Once the end user identifies content they would like to consume, the end user can take different actions depending on access restrictions placed on the content. The end user can subscribe (e.g., for free or by paying a subscriber fee) to a channel to gain access to content. The subscriber fee can be a one-time fee, or can be a recurring fee. For example, the subscriber fees can be billed monthly, annually, or using any other billing periods, including a one-time pass, or a season pass. In some implementations, the subscriber fee may vary depending on user-selected advertising attributes or a user-selected subscription level for specific type(s) of content access.

To subscribe to a channel, the user can initiate a request to subscribe to the channel, such as by pressing a 'subscribe' button presented by application 110. The channel subscription subsystem 125 can receive the request of the end user to subscribe to the channel (e.g., paid or free). The subscription subsystem 125 can also request information from the end user, such as personal information (e.g., access credentials) and payment information of the end user. Once the channel subscription subsystem 125 receives the information from the end user, it can create a subscription to the channel for the end user based on the end user information. After creating the subscription for the end user, the channel subscription subsystem 125 can record the user subscription as subscription data 155 of data store 150. In one implementation, when the user subscription is recorded, the channel content providing subsystem 130 allows the user to immediately (e.g., in real time) consume media items of the channel. The user can also immediately (e.g., in real time) view his or her subscriptions from a user home GUI of the internet-based content platform 120.

To access content of a channel, the user can submit an access request to the internet-based content platform 120, such as by activating a play button within the application 110. The channel content providing subsystem 130 can provide access to the content of the channel to the end user according to the user subscription. The channel content providing subsystem 130 can check subscription data 155 for a user subscription and can provide access to content accordingly. In one implementation, the channel content providing subsystem 130 provides the end user access to the content of the channel via the same client device 105, application 110 and/or user interface that the end user used to make the request to subscribe to the channel.

In one implementation, the channel advertisement management subsystem 135 manages advertisements provided in conjunction with channels of the internet-based content platform 120. The channel advertisement management subsystem 135 can provide advertisements to the user according to the user subscription level. The channel advertisement management subsystem 135 can present advertisements to end users while the end users navigate and consume content within the internet-based content platform 120. In another implementation, the channel content access management subsystem 140 manages different types of access to media items of a channel.

In one implementation, network architecture 100 can include a social connection platform (not shown) that may be one or more computing devices (e.g., servers), data stores, networks, software components, and/or hardware components that may be used to allow users to connect to, share information, and/or interact with each other. The social connection platform may present to a user a listing (e.g., feed, stream, wall, etc.) of objects (such as posts, content items (e.g., video, images, audio, etc.), status updates, favorability indications, tags, messages, and so on) generated by other users of the social network. The social connection platform may also include a content sharing aspect that allows users to upload, view, tag, and share content, such as text content, video content, image content, audio content, and so on. Other users of the social connection platform may comment on the shared content, discover new content, locate updates, share content, and otherwise interact with the provided content. In one implementation, the internet-based content platform may be integrated with the social connection platform. For example, the social connection platform may use the internet-based content platform 120 to allow users to upload and/or share content. In another embodiment, the social connection platform may be separate from the internet-based content platform 120.

In one implementation, network architecture 100 can include multiple integrated platforms that can communicate with each other and permit users to discover and consume content across multiple platforms. For example, network architecture 100 can include an email platform (not shown) that may be hosted by one or more computing devices (e.g., servers), data stores, networks, software components, and/or hardware components that may be used to allow users to send and/or receive electronic-mail (emails) to each other. For example, a first user may use the email platform to send an email to a second user regarding a channel or media item of interest. The users may also attach files (e.g., video files, image files, text files, etc.) to the email messages. In one implementation, the email platform, and/or the social connection platform may also include chat functionality (e.g., a chat platform) to allow users to chat (e.g., to exchange instant message) with each other about channels and media items of interest. In another implementation, network architecture 100 includes a search platform that may be hosted by one or more computing devices, data stores, networks, software components, and/or hardware components that may be used to allow users to search for information and/or data. For example, the search platform may allow a user to search the Internet and/or other networks for channels, media items, topics, movies, videos, articles, blogs, websites, webpages, images, videos, etc. The search platform may also include a search engine.

Figure 2:
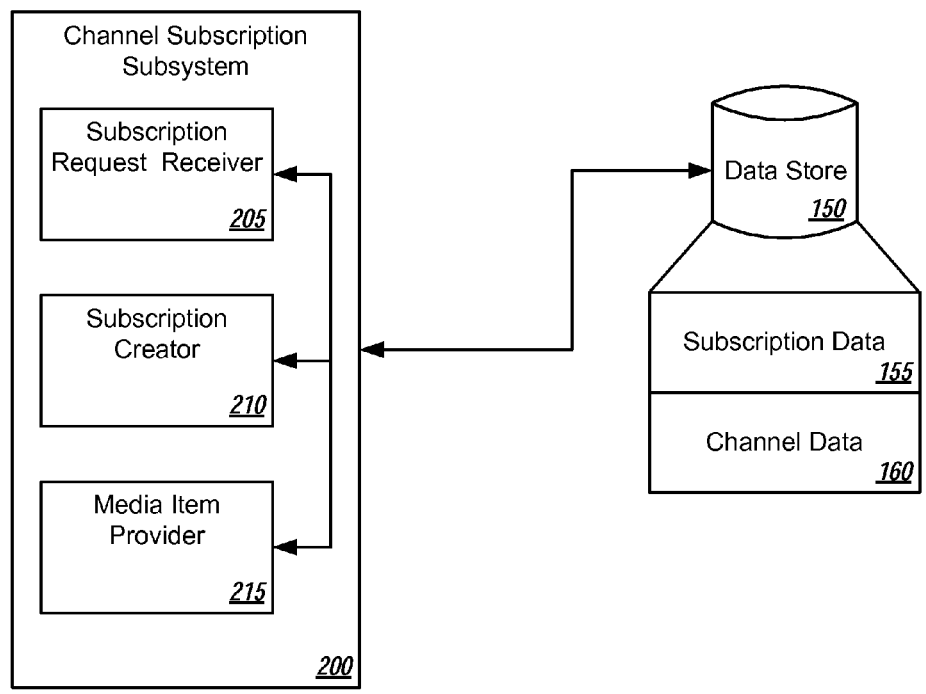
FIG. 2 illustrates a block diagram of a channel subscription subsystem in accordance with some implementation of the present disclosure.

FIG. 2 is a block diagram illustrating a channel subscription subsystem 200, in accordance with some embodiments of the present disclosure. The channel subscription subsystem 200 may be the same as the channel subscription subsystem 125 of FIG. 1 and may include a subscription request receiver 205, a subscription creator 210 and a media item provider 215. More or less components may be included in the channel subscription subsystem 200 without loss of generality. For example, some modules may be combined into a single module, or any modules may be divided into two or more modules. In one implementation, one or more of the modules may reside on different computing devices (e.g., different server computers).

The channel subscription subsystem 200 is communicatively coupled to the data store 150. For example, the channel subscription subsystem 200 may be coupled to the data store 150 directly or via a network (e.g., via network 115 as illustrated in FIG. 1).

The subscription request receiver 205 may receive a request of an end user to subscribe to a channel (e.g., paid or free) of the internet-based content platform 120. The request can be for a channel selected from among a list of channels (e.g., search results, recommended channels, channels shared by others, channels on a channel home GUI, related channels, etc.) that are presented by the internet-based content platform 120. The subscription request receiver 205 can receive the request of the end user via a user interface, such as a GUI presented by application 110 of client device 105. The user can select a channel from a list of channels presented in the user interface and can subscribe to the selected channel using a user interface element (e.g., a button, a list box, a check box, etc.) in the user interface. The subscription request receiver 205 can determine subscription information including, for example, an identifier of the selected channel (e.g., name of the channel) and end user information (e.g., name, password, etc.) associated with the subscription request. In one implementation, the subscription information further includes advertising attributes or a subscription level that corresponds to different types of access to the channel, as described herein. The subscription request receiver 205 can also request end user information, such as payment information. Payment information can include credit card information, bank information, digital currency information, digital wallet information, electronic payment information, etc. In one implementation, payment information includes third party authentication. For example, when submitting payment information to subscribe to a channel curated by a company that publishes a motorcycle racing magazine, the user can submit credentials that demonstrate the user is an existing subscriber of the motorcycle racing magazine.

The subscription creator 210 can create a subscription to the channel (e.g., free or paid) for the end user based on the subscription information. The subscription creator 210 can create a user subscription record and can record it as subscription data 155 in the data store 150. If the end user later modifies any of the subscription information (e.g., unsubscribes to the channel or selects a different advertising attribute or type of access), the subscription creator 210 modifies the subscription information associated with the user in the data store 150.

The media item provider 215 can provide access to the content of the channel (e.g., free or paid) to the end user based on the user subscription information in the subscription data 155 and channel data 160. As discussed above, the subscription data 155 includes details on user subscriptions to different channel, and the channel data 160 includes details on individual channels (e.g., a list of media items in each channel, whether individual media items in the channel are free or paid, etc.). The media item provider 215 provides access to the content of the channel at substantially the same time as when the subscription creator 210 creates the subscription for the end user. As mentioned above, a user can subscribe to a channel and can then quickly begin consuming content the channel. In one implementation, the media item provider 215 can provide access to the content of the channel via the same device, application or user interface that the user used for subscribing to the channel, thereby enabling convenient and fast access to content of the channel.

Figure 15A:
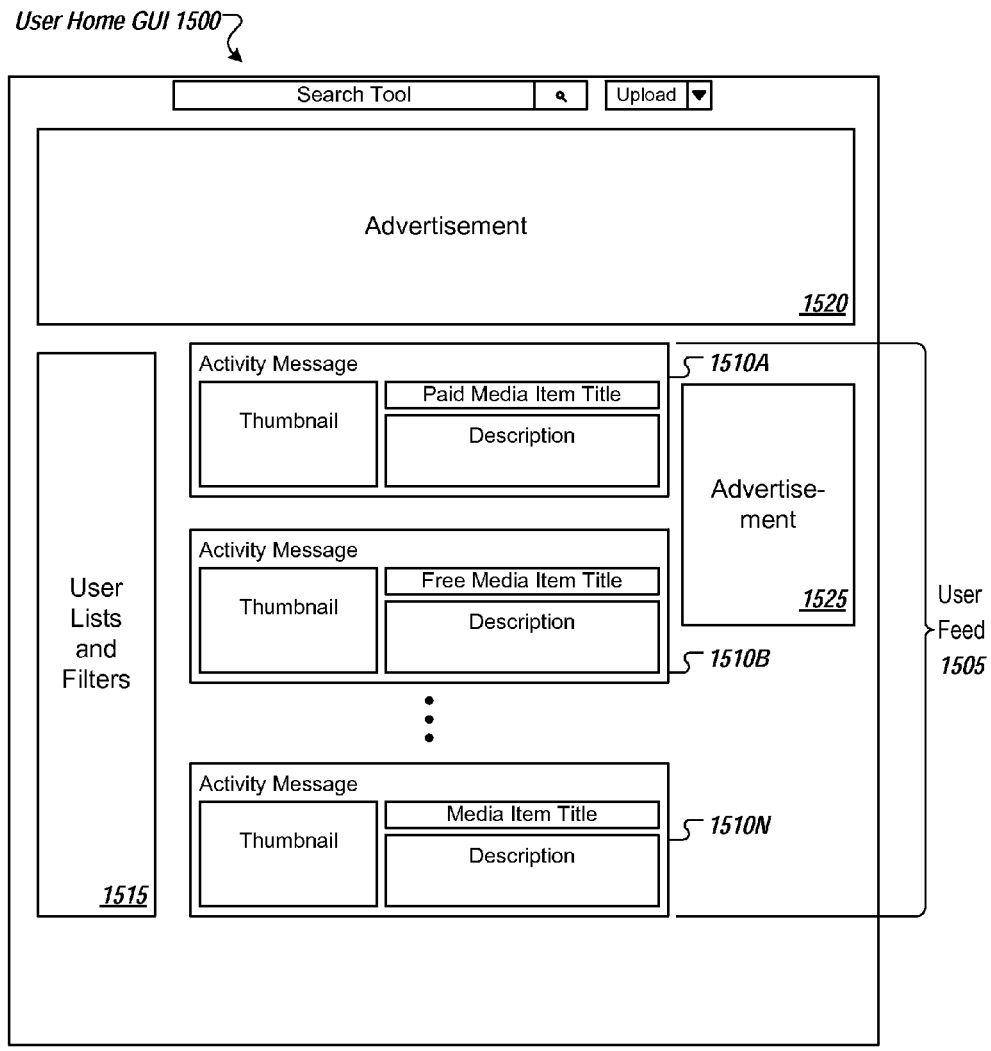
FIG. 15A illustrates an example user home page graphical user interface (GUI) in accordance with some implementation of the present disclosure.

In one implementation, when providing access to content of the channel, the media item provider 215 can add media items of the channel to a user feed generated for the end user. The media item provider 215 can present the user feed to the end user, an example of which is illustrated in FIG. 15A. In another implementation, providing access can include adding a subscribed channel to a user subscription list, which can be a list of channels to which a user has subscribed. The user subscription list can be presented to users on any GUI within the internet-based content platform 120, such as within user lists and filter 1515 as described herein, thereby enabling users to quickly access their subscribed channels from any GUI. In a further implementation, media item provider 215 can also provide access to the channel via search results presented to an end user in response to a search query, an example of which is further described in conjunction with FIG. 16. The user can select a search result to immediately begin consuming content of the channel. The media item provider 215 can also provide access to the content of the paid channel to the end user via an additional user interface of the internet-based content platform, such as a browse channels GUI that enables users to browse for channels of interest as further described in conjunction with FIG. 17, a channel home GUI that enables users to browse a channel for media items of interest as further described in conjunction with FIGS. 19 and 25, a composite channel home GUI that enables users to browse a composite channel for component channels and media items of interest as further described in conjunction with FIGS. 21 and 26, a component channel GUI, or via other mechanisms including advertisements 1525, as further described herein.

In another implementation, the channel subscription subsystem handles unsubscribe requests. In particular, the subscription request receiver 205 can receive a request to unsubscribe the user from a channel and can update the user information in the subscription data 155. When a user is unsubscribed from a channel, the media item provider 215 can prevent the end user from accessing content of the channel. When the channel is a paid channel that includes both free and paid media items, the media item provider 215 can prevent the end user from accessing the paid media items of the paid channel while allowing the end user to access free media items.

Figure 3:
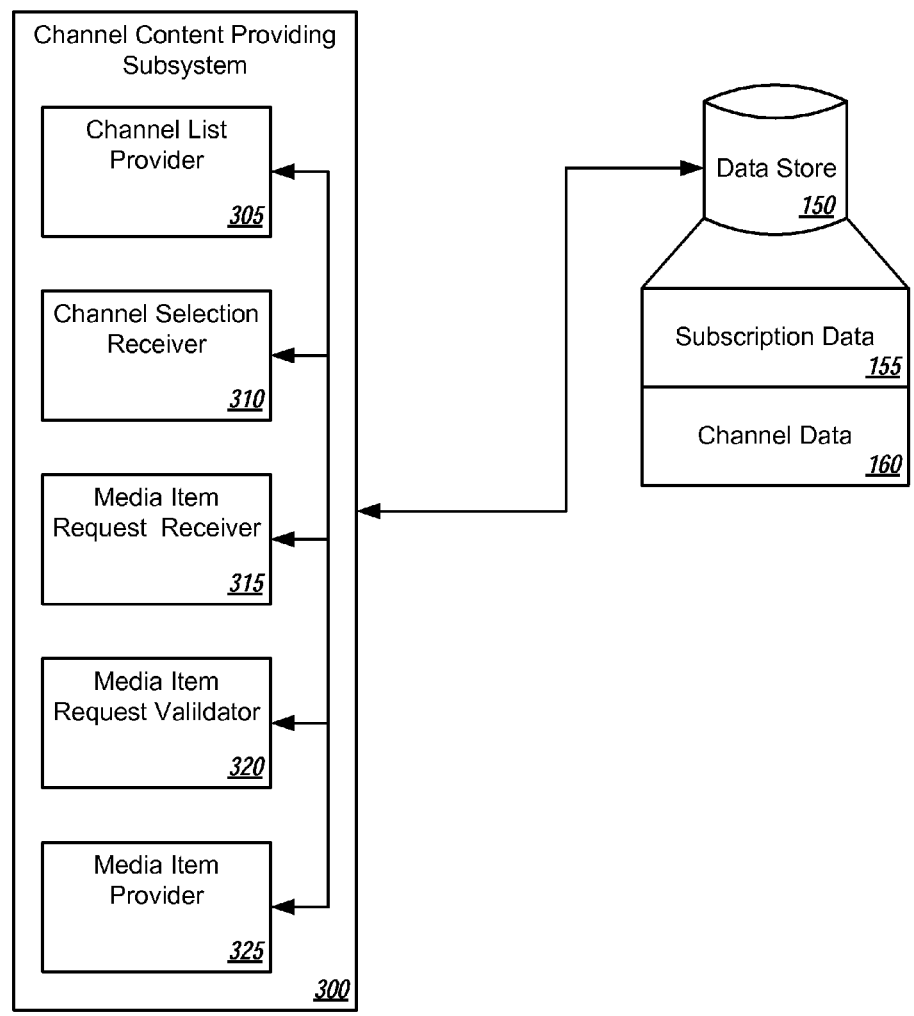
FIG. 3 illustrates a block diagram of a channel content providing subsystem in accordance with some implementation of the present disclosure.

FIG. 3 is a block diagram illustrating a channel content providing subsystem 300, in accordance with some embodiments of the present disclosure. The channel content providing subsystem 300 may be the same as the channel subscription subsystem 130 of FIG. 1 and may include a channel list provider 305, channel selection receiver 310, a media item request receiver 315, a media item request validator 320 and a media item provider 325. More or less components may be included in the channel content providing subsystem 300 without loss of generality. For example, some modules may be combined into a single module, or any of the modules may be divided into two or more modules. In one implementation, one or more of the modules may reside on different computing devices (e.g., different server computers).

The channel content providing subsystem 300 is communicatively coupled to the data store 150. For example, the channel content providing subsystem 300 may be coupled to the data store 150 directly or via a network (e.g., via network 115 as illustrated in FIG. 1).

The channel list provider 305 can provide a list of channels to an end user of the internet-based content platform. The list of channels can be generated using channel data 160 from data store 150 and can include channels the user has not yet subscribed to as well channels to which the user has subscribed. The list can be provided in a user interface that can include one or more channels. When the list includes more than one channel, the channels can be presented in groups or categories, as described in further detail in conjunction with FIG. 17. The list of channels can include free or paid channels, or both. The list of channels can be provided in response to user activity, such as a user-initiated search query, user navigation through the internet-based content platform, such as when a user navigates through a browse channels GUI, as further described in conjunction with FIG. 17, or when a user views activity of others, etc. The list of channels can also be provided to the end user as an advertisement, such as advertisement 1525 (e.g., as a list of recommended channels or channels that are, related subscribed channels, etc.), as described herein. Further, the list of channels can be provided in response to social activity, which can include when users share lists of channels with others via a message, email, text, wall post, etc. In another example, a user can activate a "like" button associated with a channel or a video and the user's social contacts can see that the user liked the channel or video. The list of channels can include multiple channels of different channel curators.

The channel selection receiver 310 receives a selection of a channel (e.g., free or paid) from the list of channels from the end user. A paid channel can include one or more paid media items and one or more free media item. A paid media item can be a media item that the user can access only after subscribing to a paid channel. A free media item can be a media item that the user can consume with or without subscribing to the paid channel. When the user selects a channel from the list of channels, media items of the channel can be presented to the user, such as via the user interface and the user can select a media item of the channel to consume (e.g., to watch a video).

The media item request validator 320 can handle user access to media items. The media item request validator 320 can determine whether the selected media item is a free item or a paid item. When the selected media item is a paid item, media item request validator 320 can request subscription information of the end user. In one implementation, request subscription information of the end user includes requesting access credentials of the end user. After the media item request validator 320 receives the access credentials from the end user, the media item request validator 320 can use the access credentials to determine whether the end user has previously subscribed to the channel. When the user has previously subscribed to the channel, the media item provider 325 provides the paid media item to the user. When the user has not previously subscribed to the channel, the media item provider 325 denies the user access to the paid media item.

In one implementation, when determining whether the end user has previously subscribed to the channel, the media item request validator 320 determines whether payment information of the end user has been received by the internet-based content platform. When the user has not previously subscribed to the channel, the media item request validator 320 can authorize providing limited access to the paid item or can encourage the user to subscribe to the channel, such as by presenting a user interface with information on how the user can subscribe to the channel. In one implementation, prior to or in conjunction with requesting the subscription information of the end user, the media item request validator 320 can authorize providing limited access to the paid item. Limited access to the paid item can include, for example, a preview or the first thirty seconds of a video or movie. Limited access can further include permitting the user to watch a predetermined number of videos of a paid channel. Once the user has watched the predetermined number of videos, the media item request validator 320 can inform the user that they need to pay a subscriber fee to watch more videos. When the selected media item is a free item, media item provider 325 can provide the free media item to the end user. The free item can be a preview of a paid media item that can be used to encourage a user to subscribe to the paid channel. Preview can refer to a shortened version of a media item such as a portion of the media item. For example, a preview of a video can be a trailer (a combination of some of the scenes) of the video, a predefined duration of the video, etc. In another implementation, the free media item is not a preview of any paid items of the channel but an independent or separate media item (e.g., a complete movie or a complete video clip) that can have its own preview.

In another implementation, the channel content providing subsystem 300 receives a request of a channel curator of a paid channel to remove an existing media item from the paid channel. In response to this request, the channel content providing subsystem 300 can remove the existing media item from the paid channel in real time.

Figure 4:
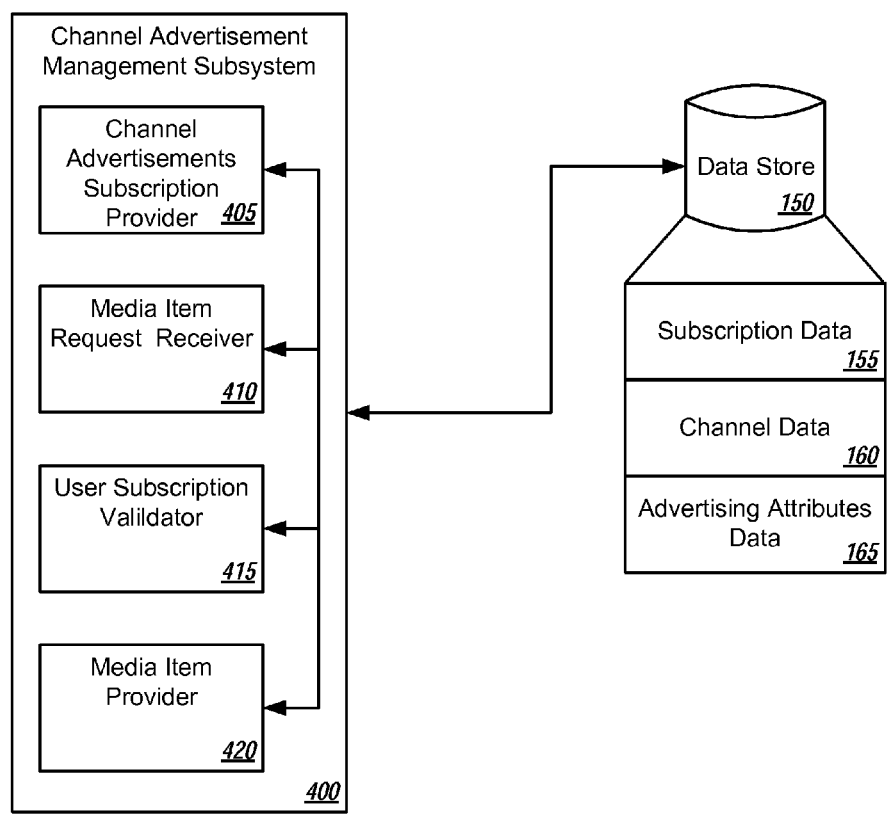
FIG. 4 illustrates a block diagram of a channel advertisement management subsystem in accordance with some implementation of the present disclosure.

FIG. 4 is a block diagram illustrating a channel advertisement management subsystem 400, in accordance with some embodiments of the present disclosure. The channel advertisement management subsystem 400 may be the same as the channel advertisement management subsystem 135 of FIG. 1 and may include a channel advertisements subscription provider 405, media item request receiver 410, a user subscription validator 415 and a media item provider 420. More or less components may be included in the channel advertisement management subsystem 400 without loss of generality. For example, some modules may be combined into a single module, or any of the modules may be divided into two or more modules. In one implementation, one or more of the modules may reside on different computing devices (e.g., different server computers).

The channel advertisement management subsystem 400 is communicatively coupled to the data store 150. For example, the channel advertisement management subsystem 400 may be coupled to the data store 150 directly or via a network (e.g., via network 115 as illustrated in FIG. 1).

The channel advertisements subscription provider 405 can enable a user to subscribe to a channel (e.g., paid or free). The channel advertisements subscription provider 405 can present, via an interface, advertising attributes of the channel, such as a subscriber set of advertising attributes. The advertising attributes can be retrieved from advertising attributes data 165 in data store 150 and then presented to the user. Advertising attributes can be created or set by a channel curator when the curator creates or defines a channel. The channel curator can also modify advertising attributes for a channel after the channel has been created or defined.

In one implementation, when subscribing to a channel, the user can select an advertising attribute from a subscriber set of advertising attributes of the channel. The subscriber set of advertising attributes can include, for example, an advertising attribute that decreases a number of advertisements presented to the user when the user consumes media items of the channel. Other examples of subscriber advertising attributes include a decrease of an aggregate length of time advertisements are presented to the user when the user consumes media items of the channel, a presentation of advertisements of a specific category, a reduction of a number of advertisements from a category, a frequency for presenting an advertisement, a duration for presenting an advertisement, or an option to skip an advertisement presentation within the channel, etc. When the channel is a paid channel, the channel advertisements subscription provider 405 can provide a list of subscriber fees that correspond to the subscriber set of advertising attributes. The subscriber set of advertisement attributes can vary depending on the subscriber fee for the paid channel. For example, an advertisement attribute that removes all advertisements from a channel can correspond to a higher subscriber fee than an advertisement attribute that reduces the number of advertisements presented per hour from six to five.

When subscribing to the channel, the user can select one or more of the advertising attributes. The channel advertisements subscription provider 405 can receive a subscription request of the user to subscribe to the channel that includes one or more advertising attributes selected from the subscriber set of advertising attributes. Using the subscriber set of advertising attributes selected by the user, the channel advertisements subscription provider 405 can determine a subscriber fee from the list of subscriber fees. The channel advertisements subscription provider 405 can request payment information of the user. Upon receiving a confirmation of a payment of the determined subscriber fee by the end user, the channel advertisements subscription provider 405 can create a subscription to the channel for the end user. In one implementation, the advertisement attribute is predetermined by the channel curator and is not selectable by the end user. In this implementation, the only subscription options afforded to the user are whether to subscribe to or unsubscribe from the channel, and the user cannot specify any advertisement attributes. Once the user selects an advertising attribute, the channel advertisements subscription provider 405 can cause the selected advertising attribute to be stored in subscription data 155 in data store 150.

The media item request receiver 410 can receive a user request for one of a plurality of media items of a channel. The user can request to consume the media item from anywhere, including from within the internet-based content platform, or from outside of the internet-based content platform. The user subscription validator 415 can determine whether the user is subscribed to the channel. To determine channel subscriptions of the user, the user subscription validator 415 can obtain subscription information associated with the user. The user subscription validator 415 can determine subscription information of the user based on subscription data 155 in storage 150. The user subscription validator 415 can inform the media item provider 420 whether the user is subscribed to the channel.

The media item provider 420 can provide access to media items of the channel based on the user subscription data 155. When the user is subscribed to the channel, the media item provider 420 can present the requested media item according to the subscriber set of advertising attributes, which can include removing or reducing advertisements provided in conjunction with playback of media items that are part of the channel. When the user is not subscribed to the channel, the media item provider 420 can present the requested media item according to a non-subscriber set of advertising attributes, which can include a full complement of advertisements, non-skippable advertisements, advertisements that can be skipped after a longer viewing duration than for subscribers of the channel, etc.

In one implementation, the selected advertising attributes can identify a predefined number of media items that the media item provider 420 can provide to the end user. When the user consumes the predefined number of media items of the channel, the advertising attribute can change. In an example, when the user consumes the predefined number of media items of the channel, the media item provider 420 can prevent advertisements from being presented to the end user. In another example, when the user consumes the predefined number of media items of the channel, the media item provider 420 can either increase or decrease the number of advertisements presented to the end user. For example, when a user consumes a predefined number of media items of a paid channel, the media item provider 420 can increase the number of advertisements presented to the user to encourage the user to change their subscription status to the channel (e.g., subscribe to the channel, pay a subscriber fee to subscribe to the channel, pay a greater subscriber fee for the channel, etc.). Similarly, when a user consumes a predefined number of media items of a paid or free channel, the media item provider 420 can decrease the number of advertisements presented to the user to reward active users with less advertisements.

Figure 5:
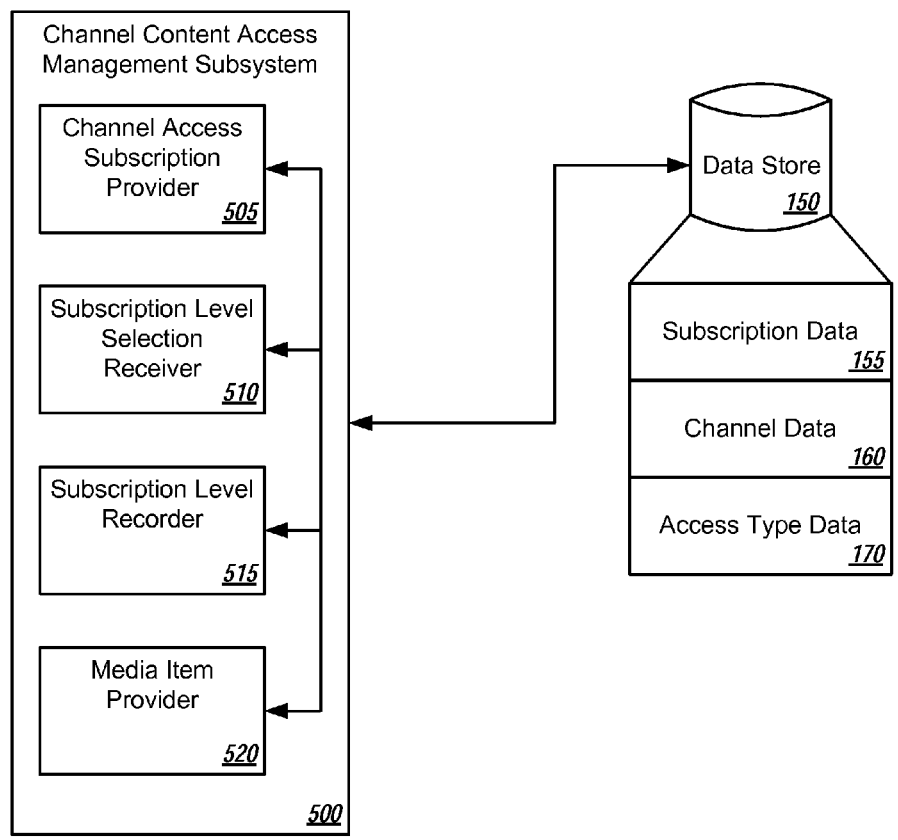
FIG. 5 illustrates a block diagram of a channel content access management subsystem in accordance with some implementation of the present disclosure.

FIG. 5 is a block diagram illustrating a channel content access management subsystem 500, in accordance with some embodiments of the present disclosure. The channel content access management subsystem 500 may be the same as the channel content access management subsystem 140 of FIG. 1 and may include a channel access subscription provider 505, subscription level selection receiver 510, a subscription level recorder 515 and a media item provider 520. More or less components may be included in the channel content access management subsystem 500 without loss of generality. For example, some modules may be combined into a single module, or any of the modules may be divided into two or more modules. In one implementation, one or more of the modules may reside on different computing devices (e.g., different server computers).

The channel content access management subsystem 500 is communicatively coupled to the data store 150. For example, the channel content access management subsystem 500 may be coupled to the data store 150 directly or via a network (e.g., via network 115 as illustrated in FIG. 1).

The channel access subscription provider 505 can permit a user to select a subscription level for a channel when subscribing to the channel. The channel access subscription provider 505 can use access type data 170 to create a list of types of access to media items of the channel and one or more subscription levels associated with different subscription fees for different types of access to the channel, and present this list to the user. The access type data can be defined or set by a channel curator when creating or defining a channel. For example, the channel curator can set an access type that permits users to pay for offline access when a user subscribes to the channel. The type of access to the media items of the channel affects end user consumption of the media items. One type of access can be a quality characteristic (e.g., a video resolution or display size) when consuming media items of the channel. For example, a quality characteristic type of access can be an option to view all media items of the channel in 1080p resolution or higher. Another type of access can include allowing access to media items of the channel from multiple user devices. For example, access to the content of the channel on be allowed from the user's personal computer, tablet and smartphone. A further type of access can include offline access to media items of the channel. For example, when a user elects an offline access type of access, the user can have access to media items of a channel when the user device is not connected to the internet. Other types of access can include adding subtitles to or changing a language of one or more media items in the channel. For example, a user can pay for access to a movie dubbed in the Mongolian language or with Mongolian subtitles. Another type of access can include allowing a user to block specific media items or channels based one some criteria, such as on an individual or categorical basis. For example, a user can choose to have movies and shows with an "R" rating be blocked or a user can choose to have block specific shows or movies to be blocked.

The subscription level selection receiver 510 can receive a selection of one of the subscription levels for the channel. In one implementation, receiving the selection of one of the plurality of subscription levels for the channel can include receiving a request of the end user to subscribe to the channel.

The subscription level recorder 515 can record the selected subscription level of the end user for the channel. The selected subscription level can be recorded and stored as part of a user's subscription data 155 in data store 150.

The media item provider 520 can provide a type of access to the plurality of media items of the channel for the end user according to the recorded subscription level of the end user for the channel. When providing access to content of the channel to the end user, the media item provider 520 can reference information stored in the subscription data 155, channel data 160 and access type data 170. For example, when a user requests access to a media item at a high resolution, media item provider 520 can provide the media item according to the user's subscriptions, such as according a subscription level that permits accessing the media item at a high resolution. The media item provider 520 can also provide the media item according to channel data and access type data that are defined by an entity other than the user, such as the channel curator, the internet-based content platform 120, or both. For example, a channel curator may set the channel to only be played in 1080p resolution. The internet-based content platform 120 may include channel data that decreases the playback resolution when a detected internet connection cannot support high resolution. In a situation that combines these two examples, the preference of the channel curator to play only in 1080p resolution potentially conflicts with the internet-based content platform 120 preference to reduce resolution for limited bandwidth situations. When such a conflict occurs, playback of a media item can be paused and a message can be displayed to the user that there is insufficient bandwidth to play the media item at 1080p resolution. Alternatively, the internet-based content platform 120 preference can override the channel curator's preference and the media item can be played back to the user. The internet-based content platform 120 can also present a message to the user that the media item is being presented at less than 1080p resolution and that the user should increase bandwidth to view the media item in 1080p.

In one implementation, when the selected subscription level pertains to a quality characteristic, providing the type of access to the media items of the channel includes ensuring that the media items are presented to the end user according to the selected quality characteristic. In another implementation, when the selected subscription level unlocks access to media items of the channel on one or more additional user devices, providing the type of access to media items of the channel includes providing the media items for presentation on any additional user device upon receiving a user request. In a further implementation, when the selected subscription level unlocks offline access to media items of the channel, providing the type of access to media items of the channel includes causing at least one of the media items of the channel to be stored on a user device for future offline access. In yet a further implementation, when the selected subscription level pertains to adding subtitles to one or more media items in the channel, providing the type of access to media items of the channel includes providing subtitles with one or more media items in the channel. In yet another implementation, when the selected subscription level pertains to changing a language of at least one media item of the channel, providing the type of access to media items of the channel includes changing the language of one or more media items in the channel.

When the user attempts to enable a type of access that is not part of the user's subscription data, the media item provider 520 can still present media items according to the requested type of access. For example, even if a user has not subscribed for access to videos in 1080p, the media item provider 520 can still present videos to the user in 1080p resolution. In other instances, the media item provider 520 can block the requested type of access and present a message to the user informing them that the requested type of access is not available under the user's current subscription. The message can also include instructions for how the user can add the requested type of access to their subscription data. For example, when the user requests to access a video from a user device not covered by the user subscription, the media item provider 520 can block access from that user device and inform the user how to unlock access for that user device. Similarly, when a user attempts to enable offline video access, the media item provider 520 can inform the user how to unlock this type of access. In another implementation, the media item provider 520 can provide the type of access not covered by the user subscription on a limited basis, such as on an as-available basis or as a preview or upsell scheme. For example, the media item provider 520 can provide videos in 1080p resolution as long as the user's internet connection is sufficient. The media item provider 520 can also provide a predetermined number of videos in 1080p, then switch to a lower resolution while informing the user on how to unlock 1080p resolution for future video playback. Similarly, the media item provider 520 can allow a user to select a predetermined number of videos for offline access. The media item provider 520 can also permit the user to watch a video where a portion of the video is dubbed in a requested language or has subtitles in a requested language. The media item provider 520 can prompt the user with information on how to unlock the different language or subtitles for the entire video.

Figure 6:
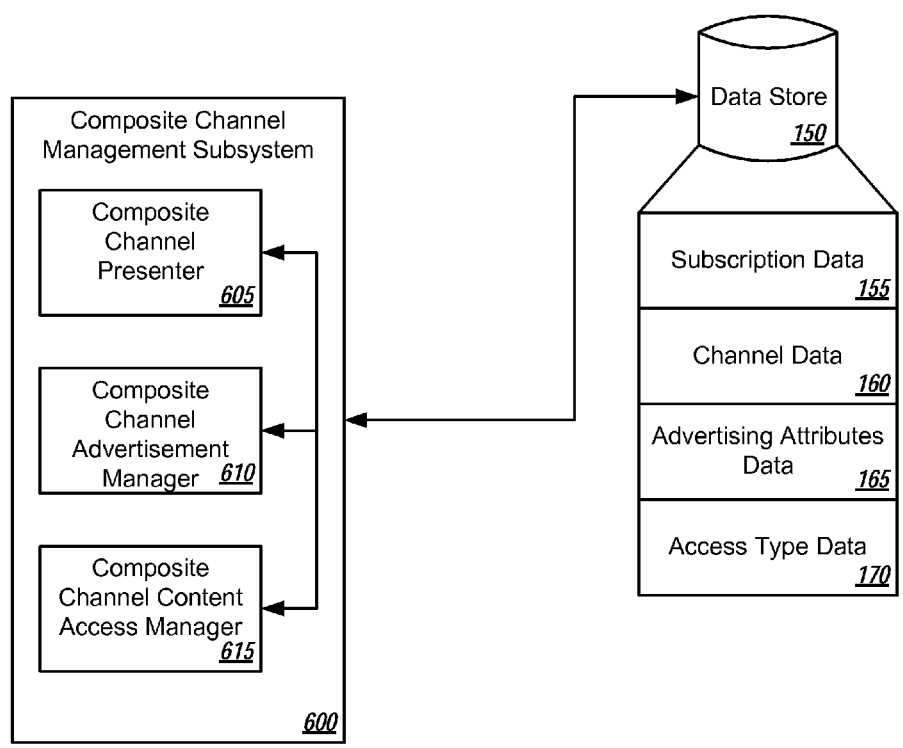
FIG. 6 illustrates a block diagram of a composite channel management subsystem in accordance with some implementation of the present disclosure.

FIG. 6 is a block diagram illustrating a composite channel management subsystem 600, in accordance with some embodiments of the present disclosure. The composite channel management subsystem 600 may be the same as the composite channel management subsystem 145 of FIG. 1 and may include a composite channel presenter 605, composite channel advertisement manager 610 and a composite channel content access manager 615. More or less components may be included in the composite channel management subsystem 600 without loss of generality. For example, some of the modules may be combined into a single module, or any of the modules may be divided into two or more modules. In one implementation, one or more of the modules may reside on different computing devices (e.g., different server computers).

The composite channel management subsystem 600 is communicatively coupled to the data store 150. For example, the composite channel management subsystem 600 may be coupled to the data store 150 directly or via a network (e.g., via network 115 as illustrated in FIG. 1).

The composite channel presenter 605 can present one or more composite channels using channel data 160 and manage subscriptions to the composite channels. A composite channel can be created by a channel curator who selects one or more component channels and/or one or more media items to include within a composite channel. A component channel refers to an individual channel that is part of a package represented by a composite channel. The composite channel may include component channels having different content types. For example, a user interested in a musician may want to subscribe to a channel that includes the musician's music videos, the musician's music, a blog about the musician, a newsletter about the musician, tweets of the musician, social network posts by or about the musician, etc. The composite channel presenter 605 can operate in a similar manner as channel subscription subsystem 200 of FIG. 2. The composite channel presenter 605 can receive requests to subscribe to composite channels, create user subscriptions and provide media items of the composite channels according to the user subscriptions. In one implementation, when the composite channel presenter 605 creates a user subscription to the composite channel, it can automatically subscribe the user to the component channels of the composite channel. In another implementation, the composite channel presenter 605 does not automatically subscribe the user to the component channels when creating a user subscription to the composite channel. Instead, the composite channel presenter 605 can present a user interface that prompts the user to select one or more component channels to subscribe to as part of a subscription flow, as further described in conjunction with FIG. 24D. For example, when the composite channel includes six component channels, the user can choose whether to subscribe to each of the six component channels for no additional subscriber fee.

The composite channel presenter 605 can also operate in a similar manner as channel content providing subsystem 300. The composite channel presenter 605 can present a list of composite channels within the internet-based content platform, receive selections to consume media items of the composite channels, validate media items and users, and provide media items of the composite channels according to the user subscriptions.

The composite channel advertisement manager 610 can direct advertising for component channels and media items of the composite channel. The composite channel advertisement manager 610 can operate in a similar manner as the channel advertisement management subsystem 400 of FIG. 4. In one implementation, all component channels and media items of a composite channel can have the same advertising attributes. In other implementation, when the composite channel includes two component channels, the two component channels can have different advertisement attributes. For example, one channel can be a premium movie channel that users are likely to watch. Since viewership is likely to be high, this channel can have a full complement of advertisements. A second channel, for example, can include movies that are not as likely to draw in users. In an effort to attract users, the second channel can have fewer or even no advertisements. Similarly, when the composite channel includes a combination of one or more component channels and standalone media items, the component channels can have different advertisement attributes than each other and can also have different advertisement attributes than the standalone media items. In one implementation, subscriber fees can vary for different subscription levels. For example, a subscription level that removes all advertisements from all component channels and media items of a composite channel can have a different subscriber fee than for a subscription level that only reduces the number of advertisements or removes all advertisements of a subset of component channels. Similarly, a subscriber fee for some subscription levels that unlock certain types of access can be different than for subscription levels that unlock other types of access. For example, a subscriber level that provides a user with offline access to media items of the composite channel can be different than a subscriber fee to present one or more media items in a different language.

The composite channel content access manager 615 can handle access to component channels and media items of the composite channel. The composite channel content access manager 615 can operate in a similar manner as the channel content access management subsystem 500 described in conjunction with FIG. 5. The composite channel content access manager 615 can facilitate composite channel subscriptions and can permit the user to select a subscription level when subscribing to a free or paid composite channel. In one implementation, all component channels and media items of a composite channel can have the same type of access. In other implementations, when the composite channel includes two component channels, the two component channels can have different types of access. For example, one channel may be accessed offline, while another may not. The subscription level can be associated with different subscription fees for different types of access to the composite channel. Offering different subscription levels provides users with greater flexibility to select content and channel characteristics that better match their personal needs.

FIG. 7-14 are flow diagrams illustrating methods for performing various operations, in accordance with some embodiments of the present disclosure, including creating subscriptions and providing access to content of a channel. The methods may be performed by processing logic that comprises hardware (e.g., circuitry, dedicated logic, programmable logic, microcode, etc.), software (e.g., instructions run on a processor to perform hardware simulation), or a combination thereof. Processing logic can control or interact with one or more devices, applications or user interfaces, or a combination thereof, to perform operations described herein. When presenting, receiving or requesting information from a user, processing logic can cause the one or more devices, applications or user interfaces to present information to the user and to receive information from the user.

For simplicity of explanation, the methods of FIGS. 7-14 are depicted and described as a series of operations. However, acts in accordance with this disclosure can occur in various orders and/or concurrently and with other operations not presented and described herein. Furthermore, not all illustrated operations may be required to implement the methods in accordance with the disclosed subject matter. In addition, those skilled in the art will understand and appreciate that the methods could alternatively be represented as a series of interrelated states via a state diagram or events.

Figure 7:
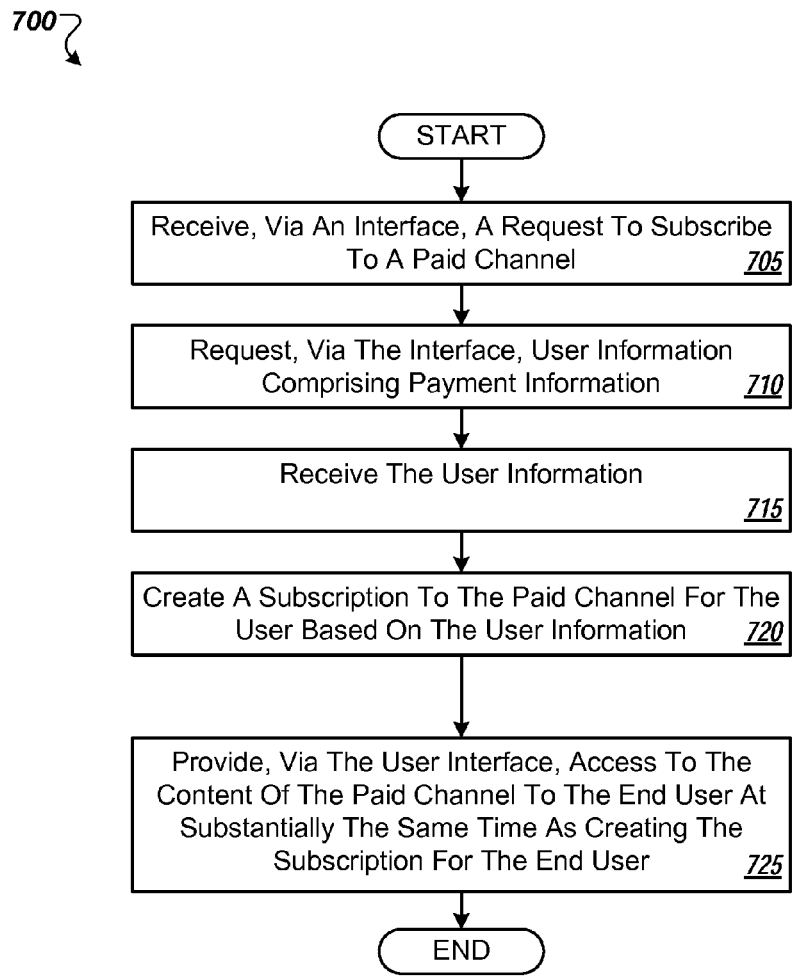
FIG. 7 illustrates a flow diagram of a method for creating a subscription of a user to a paid channel in accordance with some implementation of the present disclosure.

FIG. 7 is a flow diagram illustrating a method 700 of subscribing to a channel, in accordance with some embodiments of the present disclosure. In one implementation, method 700 may be performed by a channel subscription subsystem, as illustrated in FIGS. 2.

Referring to FIG. 7, the method 700 begins at block 705 where processing logic receives a request of an end user to subscribe to a paid channel of an internet-based content platform. The paid channel can be one of multiple channels of the internet-based content platform. The paid channel can also have dynamically changed content, as described herein. In one implementation, the subscription request is received via a user interface provided by an internet-based content platform and presented via a web browser or a mobile app. The subscription request can be issued when the end user activates or selects (e.g., clicks, touches swipes, or otherwise interacts with through a gesture, voice command, biometric input, retinal input, etc.) a UI element (e.g., a button, a check box, etc.) in the UI. The user selection of the user interface element can be alternatively received when a user clicks on a link (e.g., URL), a graphic representation of the subscription (e.g., image), the like. In one embodiment, the user interface includes a list of channels and the user can subscribe to a channel upon selecting a channel from the list. An example user interface that includes a list of channels is discussed herein in conjunction with FIGS. 16-21 and 25-27.

At block 710, processing logic requests end user information that can include payment information of the end user. In one implementation, processing logic receives the end user information via a user interface, which can be the same user interface used to receive the subscription request of the end user at block 705.

At block 715, processing logic receives the end user information. At block 720, processing logic creates a subscription to the paid channel for the end user based on the end user information.

At block 725, processing logic provides access to the content of the paid channel to the end user. In one implementation, processing logic provides access to the content of the paid channel to the end user via a user interface, which can be the same user interface as the one used at block 705 and/or block 710. This user interface can include a series of screens that appear in real time (immediately after receiving a corresponding input from the end user) one after another (blocks 705, 710 and 725) on the user device, without requiring the end user to launch another application (e.g., another mobile app) and/or another instance of the current application (e.g., another instance or tab of the web browser) on the user device. As a result, access to the content of the paid channel is provided to the end user at substantially the same time (with no noticeable delay) as the creation of the subscription to the paid channel for the end user. In some implementations, a curator of the paid channel can change the content of the paid channel at any item by adding a new media item and/or removing an existing media item, and the end user is immediately (without any noticeable delay) provided with access to the added media item and/or is immediately denied access to the removed media item.

Some examples of methods for providing access to content of a paid channel will be discussed in more detail below in conjunction with FIGS. 8, 9 and 10.

Figure 8:
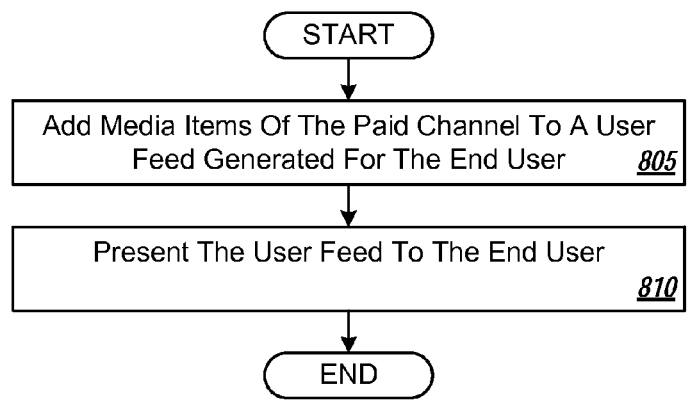
FIG. 8 illustrates a flow diagram of a method for presenting media items of a paid channel in a user feed in accordance with some implementation of the present disclosure.

FIG. 8 is a flow diagram illustrating a method 800 for providing access to media items of a channel in a user feed, in accordance with some embodiments of the present disclosure. Method 800 may be performed by a channel content providing subsystem 300, as illustrated in FIG. 3, or by a media item provider 215, as illustrated in FIG. 2.

Referring to FIG. 8, the method 800 begins with processing logic adding media items of the paid channel to a user feed generated for the end user (block 805). Processing logic can add both free media items and paid media items to the same user feed. The user feed may include a list of media items customized for the end user. For example, the user feed may include a list of videos selected for the end user (e.g. based on channels subscribed by the end user or based on videos recommended to the end user). Upon receiving a subscription request for a paid channel from the end user, media items of the paid channel are added to the user feed.

At block 810, processing logic presents the user feed to the end user, which can include presenting both a free media item and a paid media item within the same user feed. In one implementation, the free media item is available via the user feed after the user has subscribed to the channel (e.g., free or paid). In one implementation, processing logic presents the user feed to the end user via the same user interface and/or the same application that was used to receive the subscription request of the end user at block 705 of FIG. 7 and/or to request the end user information at block 710 of FIG. 7. The user feed with media items from the newly-subscribed paid channel can be presented to the user at substantially the same time (without any noticeable delay) as the creation of the subscription to the paid channel for the end user. The end user can select the media item from the user feed and immediately begin consuming the selected media item (e.g., begin playing the selected video).

If processing logic receives a request to unsubscribe the end user from the paid channel, processing logic prevents media items of the channel (e.g., free or paid) from appearing in the user feed.

Figure 9:
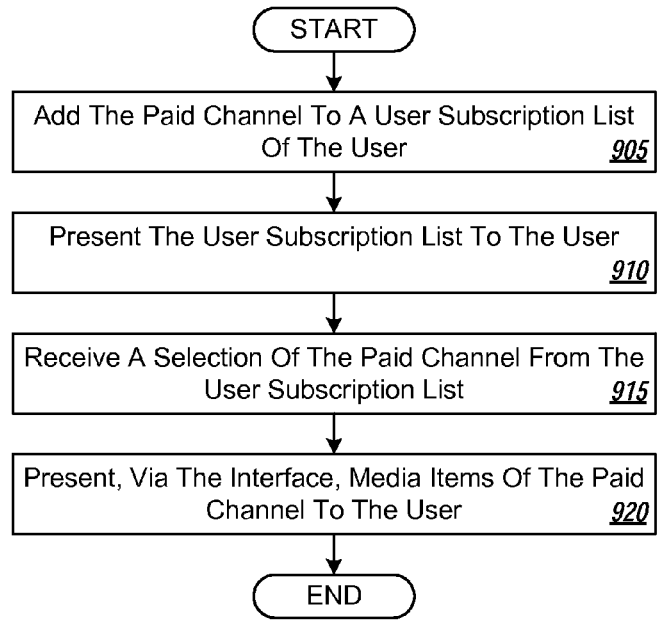
FIG. 9 illustrates a flow diagram of a method for presenting media items of a paid channel in a user subscription list in accordance with some implementation of the present disclosure.

FIG. 9 is a flow diagram illustrating a method 900 for providing access to media items of a paid channel using a user subscription list, in accordance with some embodiments of the present disclosure. Method 800 may be performed by a channel content providing subsystem 300, as illustrated in FIG. 3, or by a media item provider 215, as illustrated in FIG. 2.

Referring to FIG. 9, the method 900 begins with processing logic adding the paid channel to a user subscription list of the end user (block 905). The user subscription list can include a list of channels to which a user has subscribed. The paid channel can be added to the subscription list of the end user upon receiving the subscription request for the paid channel from the user.

At block 910, processing logic presents the user subscription list to the end user. The user subscription list can be presented via the same user interface and/or the same application that was used to receive the subscription request of the end user at block 705 of FIG. 7 and/or to request the end user information at block 710 of FIG. 7.

At block 915, processing logic receives a selection of the paid channel from the user subscription list. At block 920, processing logic presents media items of the paid channel to the end user. Processing logic can present media items of the paid channel to the end user via the same user interface and/or the same application that was used to receive the subscription request of the end user at block 705 of FIG. 7 and/or to request the end user information at block 710 of FIG. 7 and/or to present the user subscription list at block 910. The media items of the newly-subscribed paid channel can be presented to the end user at substantially the same time (without any noticeable delay) as the creation of the subscription to the paid channel for the end user. The end user can select one of the presented media items and immediately begin consuming the selected media item (e.g., begin playing the selected video).

Figure 10:
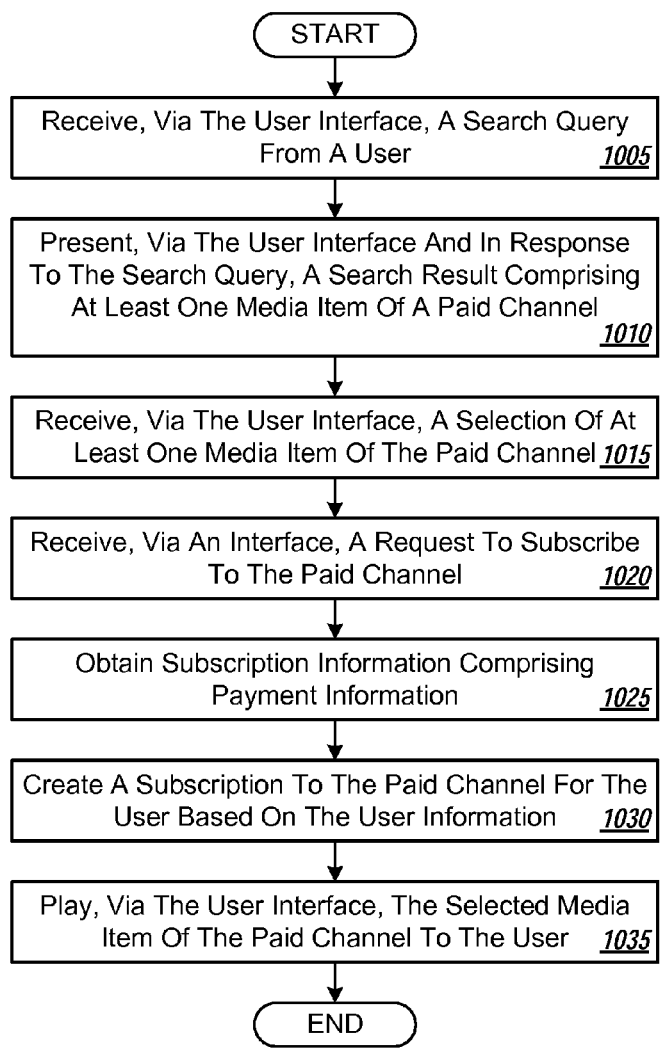
FIG. 10 illustrates a flow diagram of a method for presenting media items of a paid channel in search result in accordance with some implementation of the present disclosure.

FIG. 10 is a flow diagram illustrating a method 1000 for providing access to a paid channel or media items of a paid channel in a search result, in accordance with some embodiments of the present disclosure. Method 1000 may be performed by a channel content providing subsystem 300, as illustrated in FIG. 3, or by a media item provider, as illustrated in FIG. 2.

Referring to FIG. 10, the method 1000 begins with processing logic receiving a search query from a user (block 1005). The search query can be in any form, including text, voice, speech, gesture, retinal, biometric, etc. The search query can be keywords input in a search field of a GUI presented, for example, by a web browser or a mobile app.

At block 1010, processing logic presents a search result that includes at least one media item of a paid channel in response to the search query. The search result can be in any format, including text, audio, video, or a combination thereof. An example user interface that includes a search result with at least one media item of a paid channel is discussed in conjunction with FIG. 16.

At block 1015, processing logic receives a selection of one of the media items of the paid channel. Processing logic can receive the selection via the same user interface and/or the same application that was used to receive the search query at block 1005 and/or to present the search result at block 1010.

At block 1020, processing logic receives a request of an end user to subscribe to a channel (e.g., free or paid) of an internet-based content platform. The channel can be one of multiple channels of the internet-based content platform. The channel can also have dynamically changed content, as described herein. Processing logic can receive the subscription request via the same user interface and/or the same application that was used to receive the search query at block 1005 and/or to present the search result at block 1010, and/or to receive the selection of a media item at block 1015.

At block 1025, processing logic obtains subscription information that can include end user information and/or payment information of the end user. Processing logic can obtain the end user information via the same user interface and/or the same application that was used to receive the search query at block 1005 and/or to present the search result at block 1010, and/or to receive the selection of a media item at block 1015, and/or to receive a subscription request of the end user at block 1020.

At block 1030, processing logic creates a subscription to the paid channel for the end user based on the subscription information.

At block 1035, processing logic plays the selected media item of the paid channel to the end user via the same user interface and/or the same application that was used to receive the search query at block 1005 and/or to present the search result at block 1010, and/or to receive the selection of a media item at block 1015, and/or to receive a subscription request of the end user at block 1020, and/or to obtain subscription information at block 1025, and/or to create a subscription to the paid channel at block 1030. The media items of the newly-subscribed paid channel can be presented to the end user at substantially the same time (without any noticeable delay) as the creation of the subscription to the paid channel for the end user. The end user can select one of the presented media items and immediately begin consuming the selected media item (e.g., begin playing the selected video).

Figure 11:
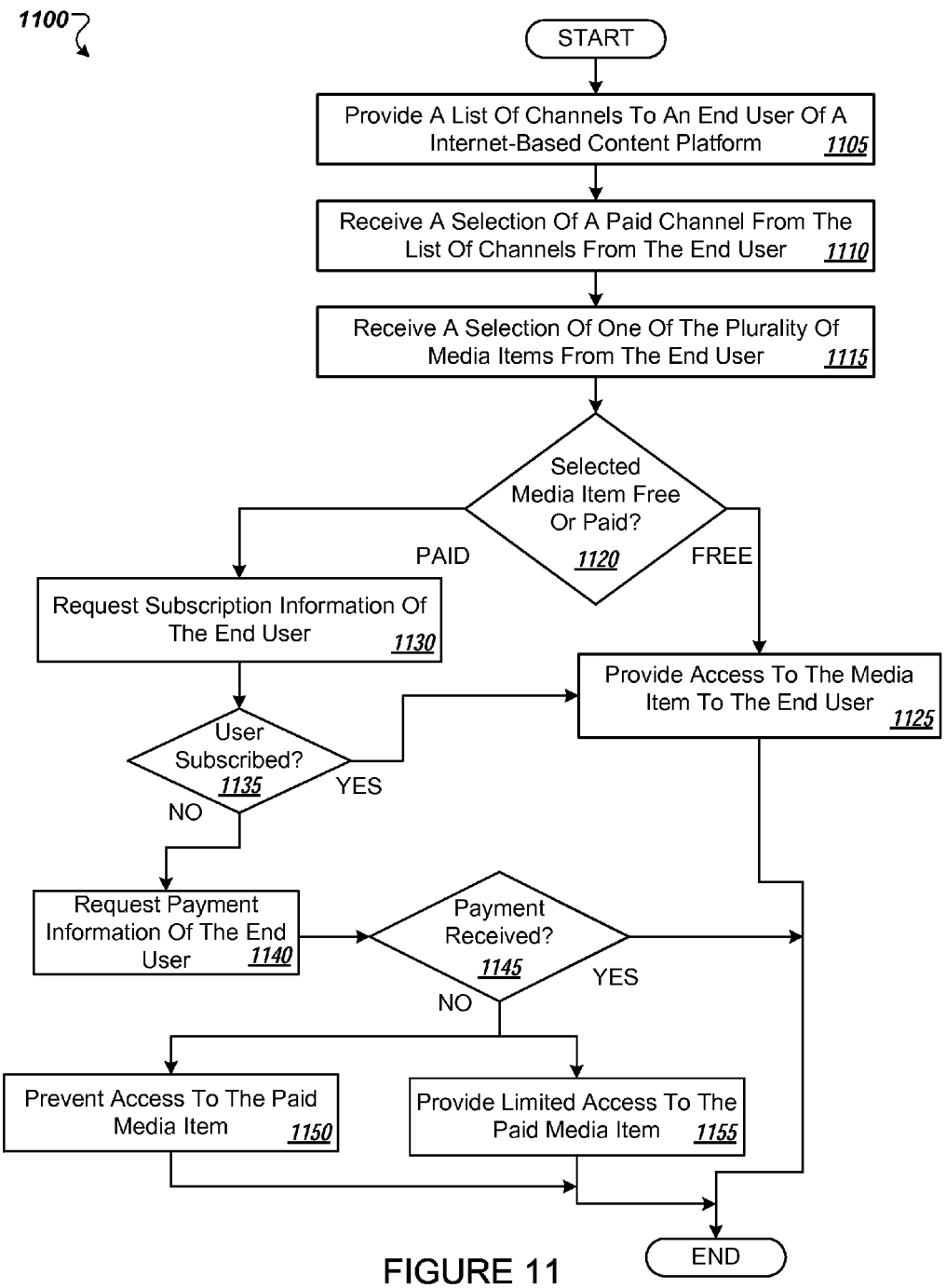
FIG. 11 illustrates a flow diagram of a method for providing access to media items in an internet-based content platform based on a user subscription, in accordance with some implementation of the present disclosure.

FIG. 11 is a flow diagram illustrating a method 1100 for providing access to media items in an internet-based content platform based on a user subscription, in accordance with some embodiments of the present disclosure. In one implementation, method 1100 may be performed by a channel content providing subsystem, as illustrated in FIG. 3.

Referring to FIG. 11, the method 1100 begins at block 1105 where processing logic provides a list of channels to an end user of the internet-based content platform (e.g., via a user interface rendered by a web browser or a mobile app). The list of channels can be a list of subscribable channels, any of which can be a paid channel. The paid channel can include at least one paid media item and at least one free media item.

At block 1110, processing logic receives a selection of a paid channel from the list of channels from the end user. In one implementation, processing logic skips block 1110 and proceeds to block 1115 without receiving a selection of the paid channel from the list of channels.

At block 1115, processing logic receives a selection of a media item of the paid channel via the user interface.

At block 1120, processing logic determines whether the selected media item is a free item or a paid item. Processing logic can consult a data store, such as data store 150, to determine this information.

When the media item is a free media item, processing logic provides access to the free media item to the end user at block 1125, without requiring any subscription information from the end user.

If the media item is a paid media item, processing logic requests subscription information of the end user. The subscription information can include access credentials of the end user, as described herein. In one implementation, requesting subscription information of the end user includes requesting access credentials of the end user. Depending on whether the end user provides valid subscription information (user credentials that can be used to verify that the payment information of the end user has been received by the internet-based content platform), processing logic determines whether the user is subscribed to the paid channel at block 1135.

If the user is subscribed to the paid channel, processing logic provides access to the paid media item to the end user at block 1125, without requiring any other subscription information from the end user. If the user has not subscribed to the paid channel, processing logic requests payment information of the end user at block 1140. When processing logic determines that payment has been received, processing logic provides access to paid media item to the end user at block 1125.

If processing logic determines that payment has not been received at block 1145, processing logic can prevent access to the media item at block 1150. Alternatively, when processing logic determines that payment has not been received at block 1145, processing logic can provide limited or restricted access to the paid media item at block 1155.

In one implementation, prior to requesting the subscription information of the end user, processing provides limited access to the paid media item, as described herein.

Figure 12A:
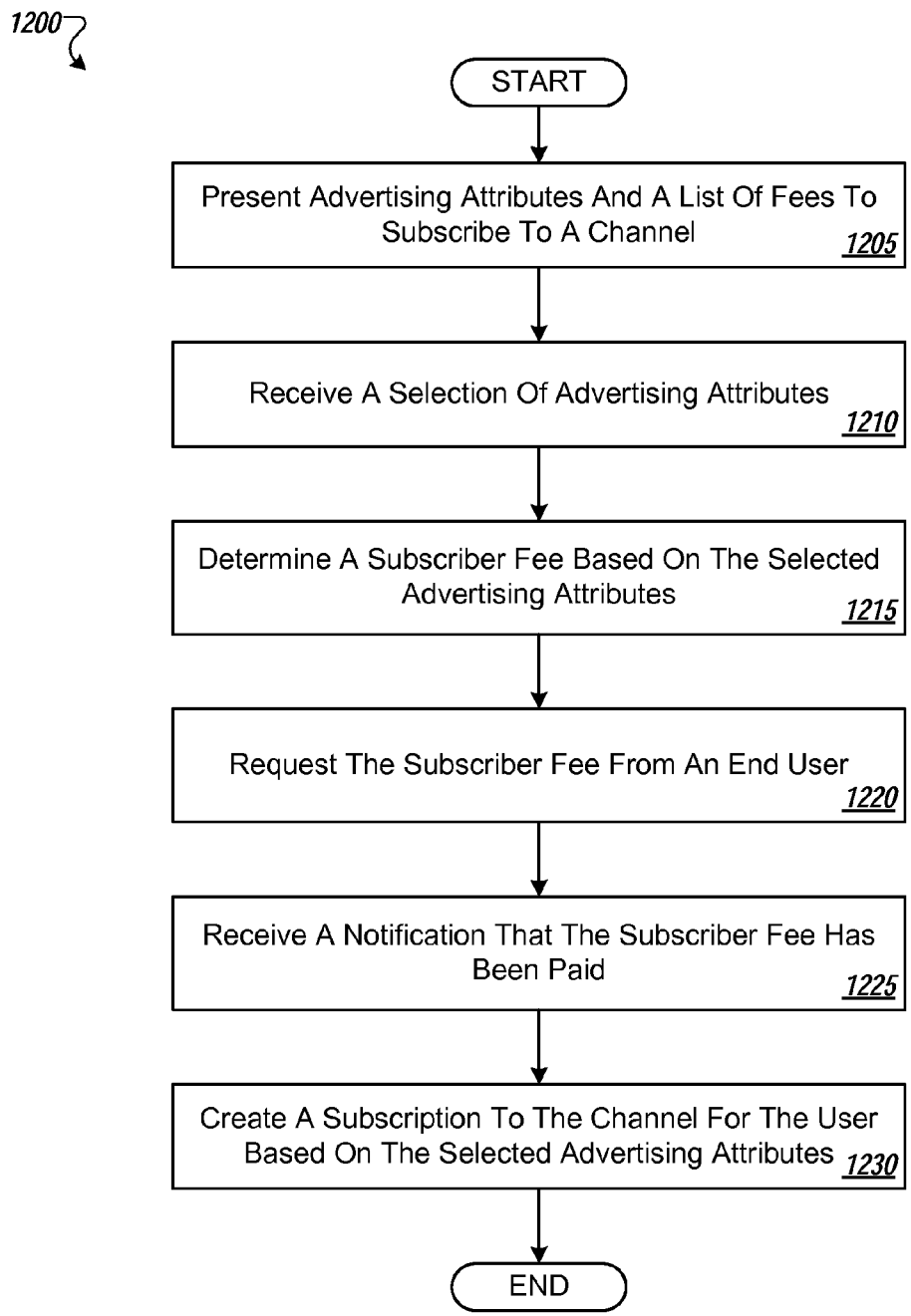
FIG. 12A illustrates a flow diagram of a method for permitting an end user to select advertising attributes of a channel when subscribing to the channel, in accordance with some implementation of the present disclosure.

FIG. 12A is a flow diagram illustrating a method 1200 for permitting an end user to select an advertising attribute when subscribing to a channel, in accordance with some embodiments of the present disclosure. In one implementation, method 1200 may be performed by a channel advertisement management subsystem, as illustrated in FIG. 4.

Referring to FIG. 12A, the method 1200 begins at block 1205 where processing logic presents a subscriber set of advertising attributes and a list of subscriber fees that correspond to the subscriber set of advertising attributes to an end user. The subscriber set of advertising attributes can relate to how advertisements are presented when the end user consumes media items of the channel, as described herein. Processing logic can obtain the subscriber set of advertising attributes and list of subscriber fees from a data store, such as by accessing advertising attributes data 165 of data store 150. Processing logic can present the subscriber set of advertising attributes and the list of subscriber fees via a user interface. The subscriber fee can be any amount, including zero or a negative amount (e.g., a rebate or credit to the user), and can be set by a channel curator.

At block 1210, processing logic receives a subscription request of the user to subscribe to the channel. The subscription request can include one or more advertising attributes selected from the subscriber set of advertising attributes.

At block 1215, processing logic determines a subscriber fee from the list of subscriber fees based on the selected advertising attributes. To determine the subscriber fee, processing logic can query a data store 150 for information, such as advertising attributes data 165 of data store 150. Processing logic can also query a user record to determine whether the user has any fee reductions that could reduce the amount of the subscriber fee.

At block 1220, processing logic requests the subscriber fee from the end user. Upon receiving a notification or confirmation of a payment of the determined subscriber fee at block 1225, processing logic proceeds to block 1230 and creates a subscription to the channel for the end user, where the subscription specifies the advertising attribute(s) selected by the end user. When creating the subscription, processing logic can create a new subscription record for a new user or can add the subscription to an existing subscription record of the end user. After block 1230, the method 1200 ends.

Figure 12B:
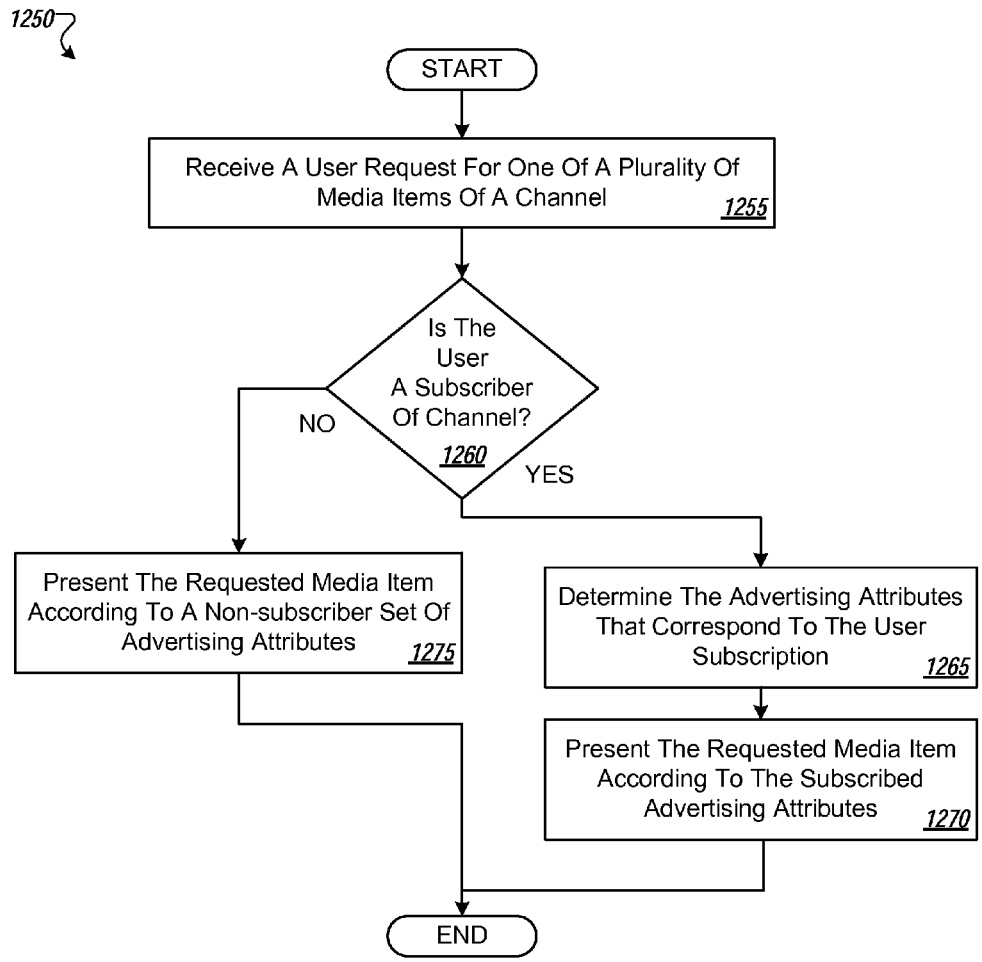
FIG. 12B illustrates a flow diagram of a method for presenting media items of a channel to an end user based on user-selected advertising attributes of the channel, in accordance with some implementation of the present disclosure.

FIG. 12B is a flow diagram illustrating a method 1250 for presenting media items of a channel to an end user based on advertising attributes selected for the channel by the end user, in accordance with one embodiment of the present disclosure. In one implementation, method 1250 may be performed by a channel advertisement management subsystem, as illustrated in FIG. 4.

Referring to FIG. 12B, the method 1250 begins at block 1255 where processing logic receives a user request to consume a media item of a channel.

At block 1260, processing logic determines whether the user is subscribed to the channel. Processing logic can query a data store, such as data store 150 to identify if a subscription exists for the user. If the user is subscribed to the channel, processing logic proceeds to block 1265 and determines one or more advertising attributes that correspond to the user subscription. Processing logic can query a data store, such as data store 150, when determining which advertising attributes correspond to the user subscription. The advertising attributes can be selected by a user, a channel curator, or automatically by a computer system.

Once the advertising attributes have been determined for the subscribed user, at block 1270 processing logic presents the requested media item according to a subscriber set of advertising attributes. After block 1270, the method 1250 ends.

If the user is not a subscriber of the channel, processing logic prevents access to the media item by the user. Alternatively, in the illustrated embodiment, processing logic can present at block 1275, the requested media item according to a non-subscriber set of advertising attributes, which can represent a predefined set of advertising attributes available to non-subscribers (e.g., to consume a free media item of the paid channel). After block 1275, the method 1250 ends.

Figure 13:
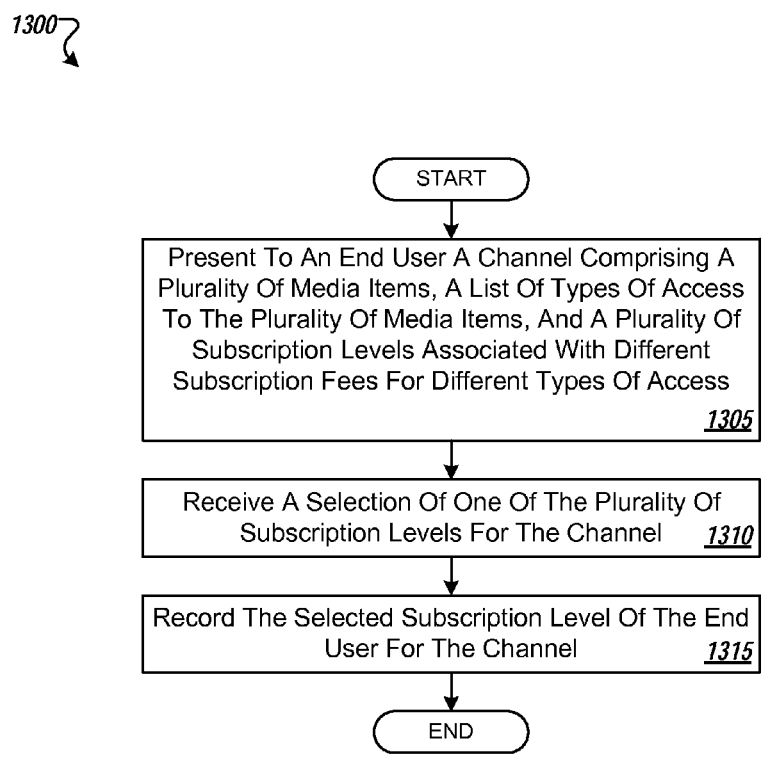
FIG. 13 illustrates a flow diagram of a method for permitting an end user to select one or more subscription levels when subscribing to a channel, in accordance with some implementation of the present disclosure.

FIG. 13 is a flow diagram illustrating a method 1300 for permitting an end user to select one or more subscription levels when subscribing to a channel, in accordance with some embodiments of the present disclosure. In one implementation, method 1300 may be performed by a channel content access management subsystem, as illustrated in FIG. 5.

Referring to FIG. 13, the method 1300 begins at block 1305 where processing logic presents a channel and a list of different types of access to the channel or to media items of the channel. The type of access to the media items can affect end user consumption of one or more of the media items of the channel. Processing logic can also present one or more subscription levels associated with different subscription fees for the different types of access. The channel presented by processing logic can be one of multiple paid channels of an internet-based content platform. Each paid channel can include one or more media items that are either paid or free items. The end user may be provided with an option to select a single type of access for the channel or multiple types of access for the channel (e.g., a combination of offline access and subtitles with a reduced number of advertisements).

At block 1310, processing logic receives a selection of one of the subscription levels for the channel, where the selected subscription level corresponds to a specific type(s)

of access to the content of the channel. At block 1315, processing logic records the selected subscription level of the end user for the channel, along with the specific type(s) of access to the content of the channel. When recording the selected subscription level of the end user, processing logic can modify an existing user record or create a new user record, either of which can be stores in a data store, such as data store 150. After block 1315, the method 1300 ends.

FIGS. 14A-E illustrate methods of providing different types of access to media items of the channel according to a subscription level of the end user.

Figure 14A:
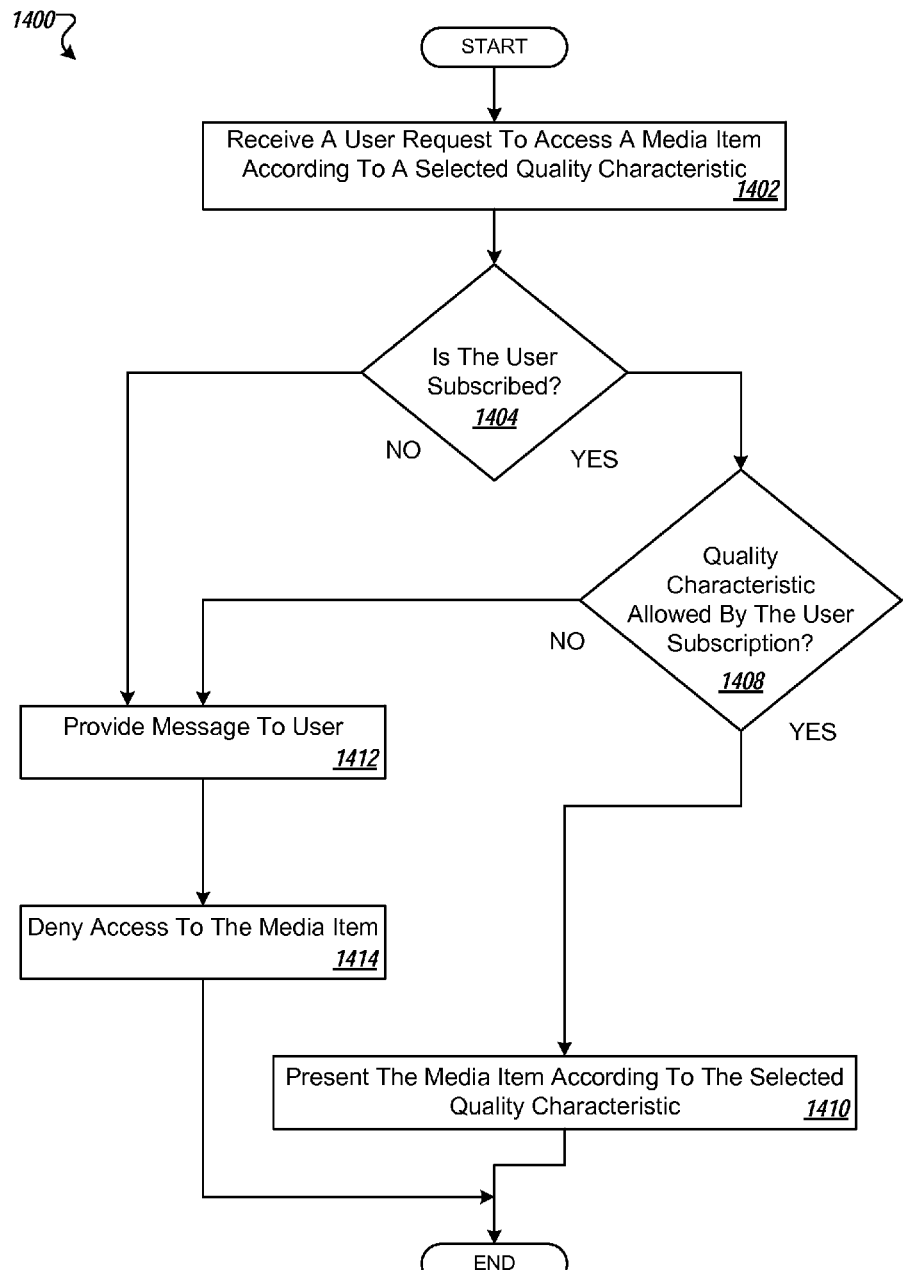
FIGS. 14A-E illustrate a flow diagram of a method for presenting a media item to an end user according to a subscription level, in accordance with some implementation of the present disclosure.

FIG. 14A is a flow diagram illustrating a method 1400 for presenting media items of a channel to an end user according to a quality characteristic type of access, in accordance with some embodiments of the present disclosure. In one implementation, method 1400 may be performed by a channel content access management subsystem, as illustrated in FIG. 5.

Referring to FIG. 14A, the method 1400 begins at block 1402 where processing logic receives a user request to access a media item according to one or more selected quality characteristics. The selected quality characteristics can include a video quality or resolution, as described herein. At block 1404, processing logic determines whether the user is subscribed to a channel that includes the media item. If the user is a subscriber of the channel, processing logic can determine a subscription level of the user and whether the selected quality characteristics are allowed under the user subscription at block 1408. Determining subscription information for the user can include querying a data store, such as data store 150, to identify subscription data and subscription level data of the user. When the subscription level allows the user to access the media item according to the requested type of access, at block 1410 processing logic can present the media item according to the selected quality characteristics. After block 1410, method 140 ends.

Alternatively, when processing logic determines that the user is not subscribed to the channel at block 1404, processing logic can present a message to the user. The message can be an error message that notifies the user that they are not subscribed to the channel. The message can also include information that instructs the user how to subscribe to the channel.

Similarly, if the user is a subscriber of the channel, but the user subscription does not allow the selected quality characteristics, processing logic can provide a message to the user at block 1412. The message can be an error message that notifies the user that their subscription level does not allow the requested type of access to the media item. This message can also include information that instructs the user how to unlock the requested type of access (e.g., quality characteristics).

At block 1414, processing logic can deny access to the media item. Denying access can include providing limited access to the media item, as described herein, and can also include providing limited access to the media item according to the selected quality characteristics. After block 1414, method 140 ends.

In one implementation, processing logic does not provide a message to the user and proceeds straight to block 1414 if the user is not a subscriber or if the user's subscription level does not allow the requested type of access. In a further implementation, if the user is not a subscriber or if the user's subscription level is insufficient, processing logic presents a subscription flow, similar to that of FIGS. 24A-B, to allow the user to easily subscribe to the channel to enable the requested type of access.

Figure 14B:
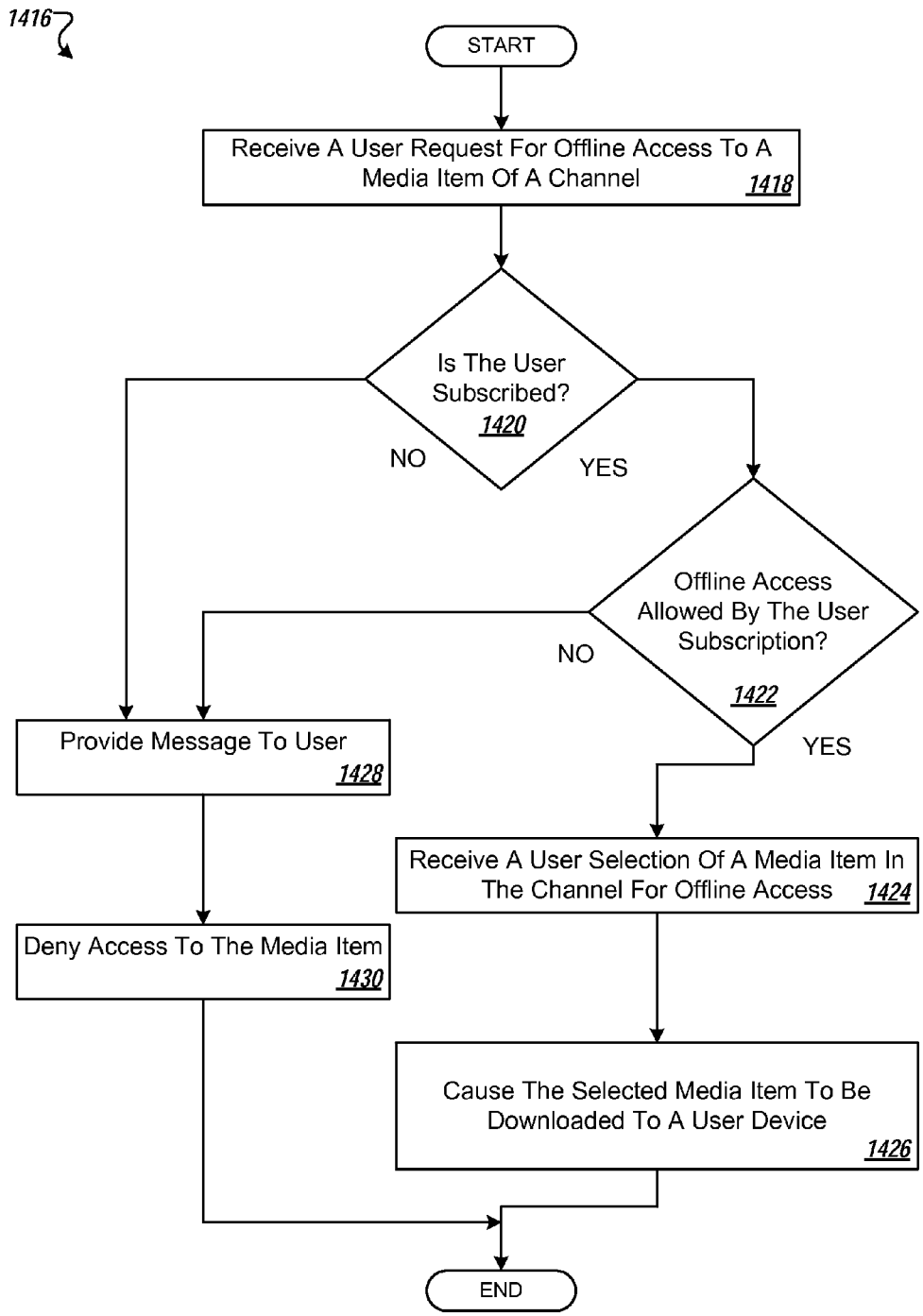

FIG. 14B is a flow diagram illustrating a method 1416 for presenting offline access to media items of a channel to an end user, in accordance with some embodiments of the present disclosure. In one implementation, method 1416 may be performed by a channel content access management subsystem, as illustrated in FIG. 5.

Referring to FIG. 14B, the method 1416 begins at block 1418 where processing logic receives a user request for offline access to a media item. At block 1420, processing logic determines whether the user is subscribed to a channel that includes the media item. If the user is a subscriber of the channel, at block 1422 processing logic can determine a subscription level of the user and whether offline access is allowed under the user subscription. Determining subscription information for the user can include querying a data store, such as data store 150, to identify subscription data and subscription level data of the user. If the subscription level allows the user to access the media item offline, at block 1424 processing logic can receive a selection of the media item in the channel for offline access. At block 1426, processing logic can cause the selected media item to be downloaded to a user device. In one implementation, processing logic does not perform block 1424 and proceeds from block 1422 to block 1426. After block 1426, method 1416 ends.

Alternatively, when processing logic determines that the user is not subscribed to the channel at block 1420, processing logic can provide a message to the user. The message can be an error message that notifies the user that they are not subscribed to the channel. The message can also include information that instructs the user how to subscribe to the channel.

Similarly, if the user is a subscriber of the channel, but the user subscription does not allow offline access, processing logic can provide a message to the user at block 1428. The message can be an error message that notifies the user that their subscription level does not allow the requested type of access to the media item. This message can also include information that instructs the user how to unlock the requested type of access (e.g., offline access).

At block 1430, processing logic can deny access to the media item. Denying access can include providing limited access to the media item, as described herein, and can also include providing limited offline access to the media item. After block 1430, method 1416 ends.

In one implementation, processing logic does not provide a message to the user and proceeds straight to block 1430 if the user is not a subscriber or if the user's subscription level does not allow the requested type of access. In a further implementation, when the user is not a subscriber or when the user's subscription level is insufficient, processing logic presents a subscription flow, similar to that of FIGS. 24A-B, to allow the user to easily subscribe to the channel to enable the requested type of access.

Figure 14C:
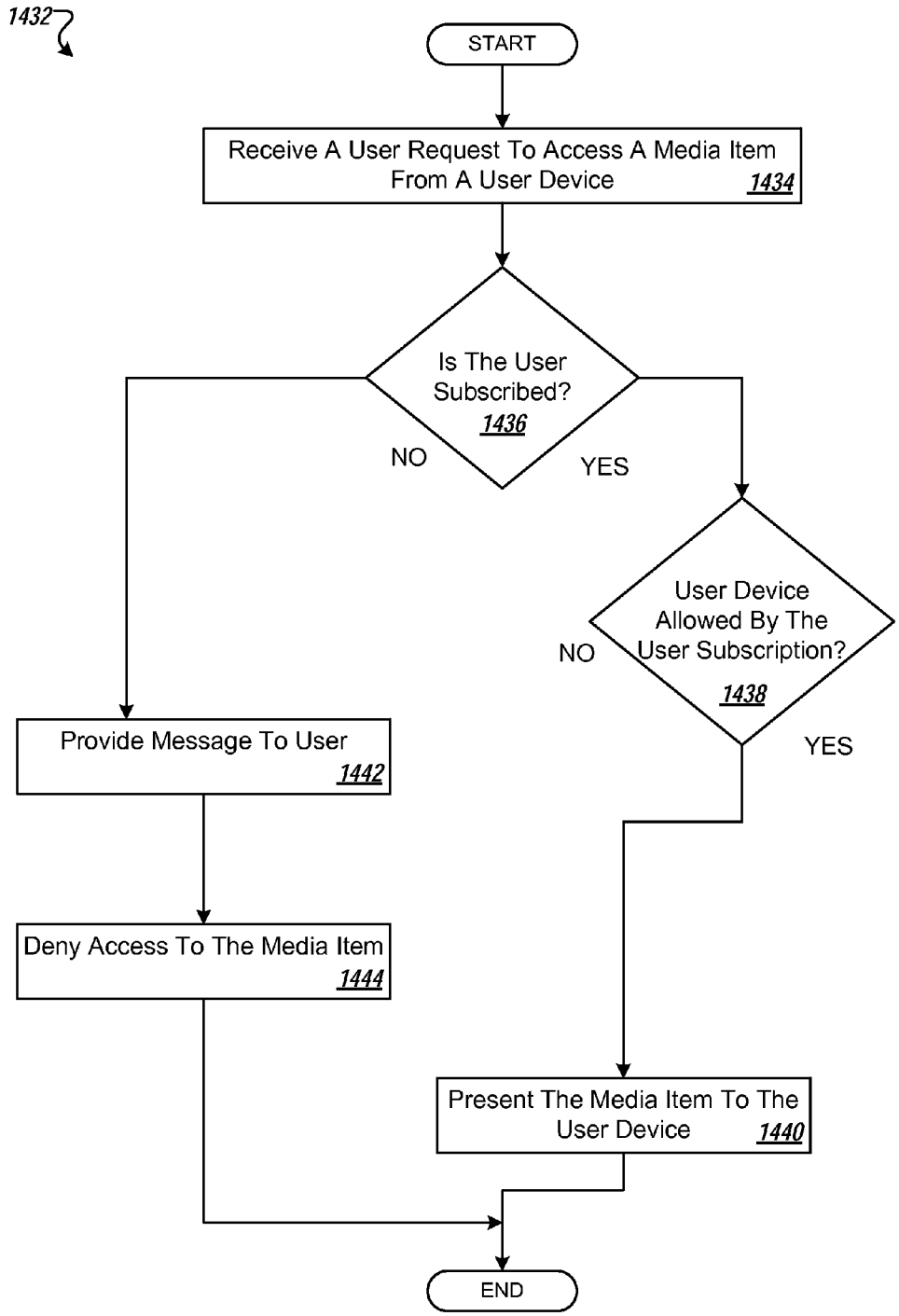

FIG. 14C is a flow diagram illustrating a method 1432 for providing media items of a channel to an additional user device, in accordance with some embodiments of the present disclosure. In one implementation, method 1432 may be performed by a channel content access management subsystem, as illustrated in FIG. 5.

Referring to FIG. 14C, the method 1432 begins at block 1434 where processing logic receives a user request to access a media item from an additional end user device. The end user device can be a second device operated by the end user. For example, the user may desire to use a laptop computer and a tablet computer to access media items. When subscribing to the channel, such as via the process flow of FIG. 13, the user can select a type of access that unlocks access for the desired devices. At block 1438, processing logic determines whether the user is subscribed to a channel that includes the media item. If the user is a subscriber of the channel, a block 1408 processing logic can determine a subscription level of the user and whether the end user device is allowed to be used for consuming media items of the channel under the user subscription at block 1408. Determining subscription information for the user can include querying a data store, such as data store 150, to identify subscription data and subscription level data of the user. If the subscription level allows the user to access the media item via the desired user device, at block 1440 processing logic can cause the media item to be streamed or downloaded to the end user device. After block 1440, method 1432 ends.

Alternatively, if processing logic determines that the user is not subscribed to the channel at block 1436, processing logic can provide a message to the user. The message can be an error message that notifies the user that they are not subscribed to the channel. The message can also include information that instructs the user how to subscribe to the channel.

Similarly, if the user is a subscriber of the channel, but the user subscription does not allow access from the end user device, processing logic can provide a message to the user at block 1442. The message can be an error message that notifies the user that their subscription level does not allow the requested type of access to the media item. This message can also include information that instructs the user how to unlock the requested type of access (e.g., additional end user devices).

At block 1444, processing logic can deny access to the media item. Denying access can include providing limited access to the media item, as described herein, and can also include providing limited access to the media item to the end user device. After block 1444, method 1432 ends.

In one implementation, processing logic does not provide a message to the user and proceeds straight to block 1444 if the user is not a subscriber or if the user's subscription level does not allow the requested type of access. In a further implementation, if the user is not a subscriber or if the user's subscription level is insufficient, processing logic presents a subscription flow, similar to that of FIGS. 24A-B, to allow the user to easily subscribe to the channel to enable the requested type of access.

Figure 14D:
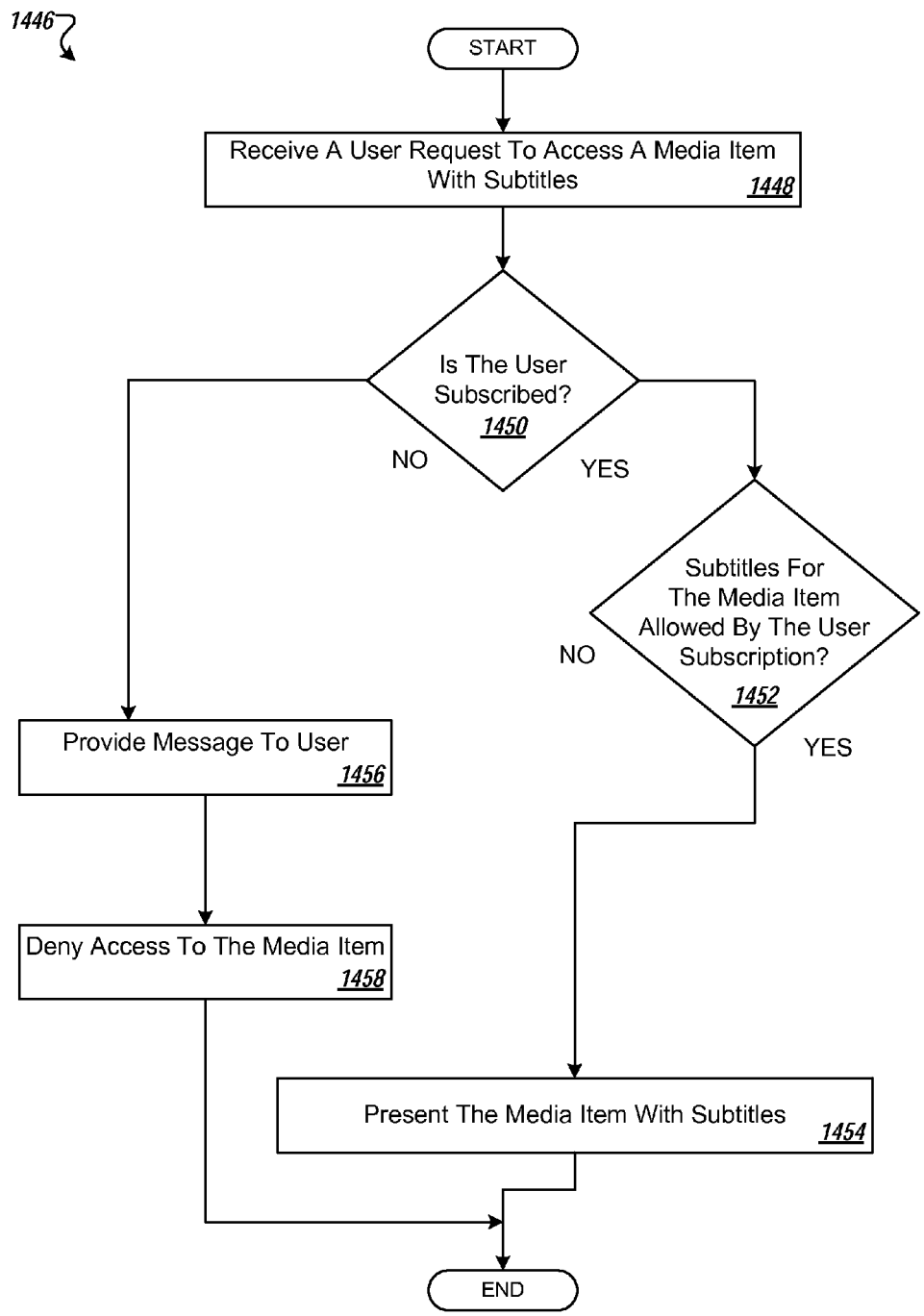

FIG. 14D is a flow diagram illustrating a method 1446 for presenting media items of a channel with subtitles, in accordance with some embodiments of the present disclosure. In one implementation, method 1446 may be performed by a channel content access management subsystem, as illustrated in FIG. 5.

Referring to FIG. 14D, the method 1446 begins at block 1448 where processing logic receives a user request to access a media item with subtitles. At block 1450, processing logic determines whether the user is subscribed to a channel that includes the media item. If the user is a subscriber of the channel, processing logic can determine a subscription level of the user and whether subtitles are allowed for the media item under the user subscription at block 1452. Determining subscription information for the user can include querying a data store, such as data store 150, to identify subscription data and subscription level data of the user. When the subscription level allows the user to access the media item according to the requested type of access, at block 1454 processing logic can present the media item with subtitles. After block 1454, method 140 ends.

Alternatively, when processing logic determines that the user is not subscribed to the channel at block 1450, processing logic can present a message to the user. The message can be an error message that notifies the user that they are not subscribed to the channel. The message can also include information that instructs the user how to subscribe to the channel.

Similarly, if the user is a subscriber of the channel, but the user subscription does not allow the subtitles for the selected media, processing logic can provide a message to the user at block 1456. The message can be an error message that notifies the user that their subscription level does not allow the requested type of access to the media item. This message can also include information that instructs the user how to unlock the requested type of access (e.g., subtitles).

At block 1458, processing logic can deny access to the media item. Denying access can include providing limited access to the media item, as described herein, and can also include providing limited access to the media item with the selected subtitles. After block 1458, method 1446 ends.

In one implementation, processing logic does not provide a message to the user and proceeds straight to block 1458 if the user is not a subscriber or if the user's subscription level does not allow the requested type of access. In a further implementation, if the user is not a subscriber or if the user's subscription level is insufficient, processing logic presents a subscription flow, similar to that of FIGS. 24A-B, to allow the user to easily subscribe to the channel to enable the requested type of access.

Figure 14E:
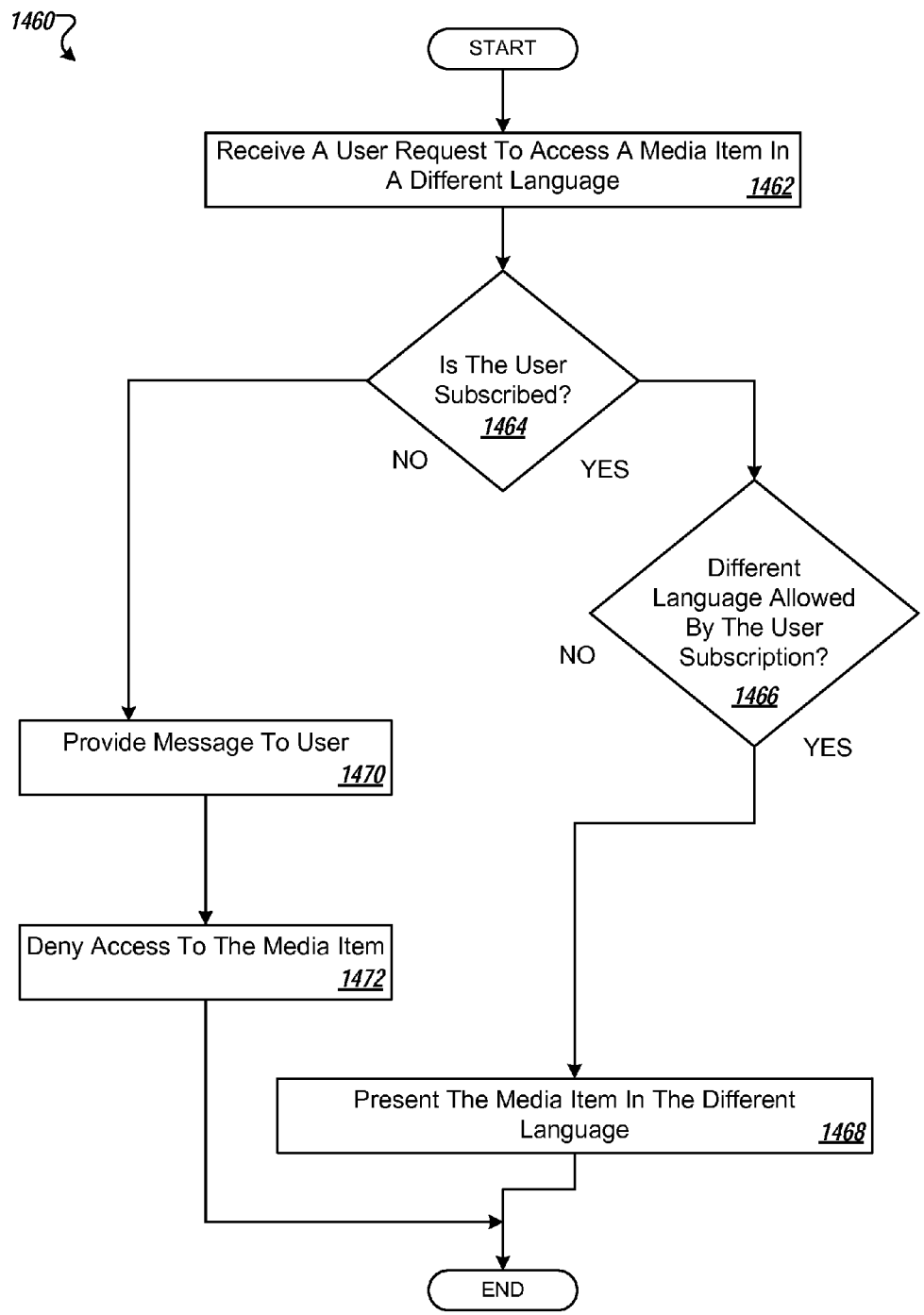

FIG. 14E is a flow diagram illustrating a method 1460 for presenting media items of a channel to an end user in a different language, in accordance with some embodiments of the present disclosure. In one implementation, method 1460 may be performed by a channel content access management subsystem, as illustrated in FIG. 5.

Referring to FIG. 14E, the method 1460 begins at block 1462 where processing logic receives a user request for access to a media item in a different language. The selected different language can include any language, including English, French, Spanish, German, Farsi, Galactic Basic, etc. At block 1464, processing logic determines whether the user is subscribed to a channel that includes the media item. If the user is a subscriber of the channel, at block 1466 processing logic can determine a subscription level of the user and whether the selected different language is allowed under the user subscription. Determining subscription information for the user can include querying a data store, such as data store 150, to identify subscription data and subscription level data of the user. If the subscription level allows the user to access the media item in a different language, at block 1468 processing logic can present the media item in the different language. After block 1468, method 1460 ends.

Alternatively, when processing logic determines that the user is not subscribed to the channel at block 1464, processing logic can provide a message to the user. The message can be an error message that notifies the user that they are not subscribed to the channel. The message can also include information that instructs the user how to subscribe to the channel Similarly, if the user is a subscriber of the channel, but the user subscription does not allow the selected different language, processing logic can provide a message to the user at block 1470. The message can be an error message that notifies the user that their subscription level does not allow the requested type of access to the media item. This message can also include information that instructs the user how to unlock the requested type of access (e.g., different languages).

At block 1472, processing logic can deny access to the media item. Denying access can include providing limited access to the media item, as described herein, and can also include providing limited access to the media item according to the selected different language. After block 1472, method 1460 ends.

In one implementation, processing logic does not provide a message to the user and proceeds straight to block 1472 if the user is not a subscriber or if the user's subscription level does not allow the requested type of access. In a further implementation, when the user is not a subscriber or when the user's subscription level is insufficient, processing logic presents a subscription flow, similar to that of FIGS. 24A-B, to allow the user to easily subscribe to the channel to enable the requested type of access.

FIGS. 15-27 illustrate example graphical user interfaces (GUI) in accordance with aspects of the present disclosure. The example GUIs may be presented by and/or displayed within a web browser when the user accesses the internet-based content platform via the web browser. In another embodiment, the example GUIs may be an interface presented by a media viewer (e.g., an app, an application, a program, a software module/component, etc., that may be used to subscribe to channels and view, play, and/or consume media items of the channels). Some example GUIs include control elements in the form of a button (e.g., a button for subscribing to a channel). However, it should be noted that various other control elements can be used for selection by a user such as a check box, a link, or any other user interface elements.

As shown, some example GUIs contain a search tool (e.g., to search for a channel or media item of interest), an upload tool (e.g., to upload a new media item to an internet-based content platform), a menu (e.g., to navigate to different GUIs of the internet-based content platform), a user identifier, a settings tool (e.g., to configure settings of GUIs of the internet-based content platform), and a navigation tool for navigating to other platforms (e.g., an email platform, a social platform, a storage platform, an image platform, a calendar platform, among others).

FIG. 15A is an example user home (e.g., homepage) GUI 1500 in accordance with some embodiments of the present disclosure. The user home GUI 1500 can include a user feed 1505, user lists and filters 1515, a masthead advertisement 1520 and at least one other advertisement 1525.

The user feed 1505 can include information of activities associated with channels to which the user is subscribed. When the user subscribes to a channel (e.g., paid and free) or connects with a social contact, the internet-based content platform may provide the user with new media items (e.g., new content) to consume and/or provide the user with access to media items. For example, media items from subscribed channels (e.g., paid and free) may be displayed on the user feed 1505. It should be understood that any type of activity or feed information from any source or other entity may be shown in the user feed 1505. For example, an image (e.g., a JPEG) may be shown in the user feed 1505. In another example, digital music (e.g., an MP3) may be played in the user feed 1505. In yet another example, social media information (e.g., a tweet, a like, etc.) may be shown in the user feed 1505. In a further example, blog information (e.g., a blog post, etc.) may be shown in the user feed 1505.

The information of activities of others (e.g., channels, social contacts, celebrities, etc.) can be presented as one or more user feed items 1510A-1510N. The user feed items 1510A-1510N can include an activity message, a thumbnail or frame of a media item, a media item title, and a description of the media item. In one embodiment, the user feed items 1510A-1510N can include information about the most recent activities associated with each channel (e.g., content uploaded to the channel, etc.), as well as a mechanism for the user to perform an action for that activity (e.g., providing a frame or thumbnail of the content uploaded to the channel that serves as a link to the content). A user feed item 1510A can include an activity message that "Channel A uploaded a video," as well as a thumbnail or frame of the video which the user can activate to view the new video. Another user feed item 1510B can include an activity message that "Channel B added five videos to a playlist," as well as the playlist, which can include links to the videos added to the playlist. When a curator of a channel, for example, adds a new media item to the paid channel, a new user feed item 1510 that introduces the new item to the user can be added to the user feed 1505. This new user feed item 1510 can be added to the user feed 1505 in real-time (as soon as the curator of the channel provides the new media item to be added to the channel). Similarly, when the curator of the channel removes an existing media item from a channel, any corresponding existing user feed items 1510 can be removed from the user feed 1505 in real time. When a user is unsubscribed from a channel, the internet-based content platform can also prevent media items of the channel from appearing in the user feed 1505.

The user lists and filters 1515 can be a list of one or more channels (free or paid) that may be of interest to the user. The user lists and filters 1515 can also include a guide that helps the user to discover content that may be of interest. For example, user lists and filters 1515 can include a section for what to watch, what media items are popular on the internet-based content platform, what media items social contacts of the user have been consuming, etc. The user lists and filters 1515 can also include links to help the user to see their watch history and what media items they have marked for later consumption.

The user lists and filters 1515 can also include a subscriptions section that includes a list of one or more channels that the user is currently subscribed to. In one implementation, the subscriptions section may include a list of all channels, both free and paid, to which the user is subscribed. In another embodiment, the subscriptions section may include a subset of channels to which the user is subscribed. For example, the subscriptions section may be organized around whether the channel is a paid channel or a free channel. The subscriptions section may also present a predefined number of channels (e.g., five channels), the channels that the user accesses most frequently, the channels that the user has accessed most recently, the channels that the user has most recently subscribed to, etc. The subscriptions section may also be organized by one or more advertising attributes, by a type of access or by a subscription level. The subscriptions section can further include the channel names "Channel A" and "Channel B" to present to the user that the user is currently subscribed to channel A and channel B. When a user subscribes to a channel, the channel can be added to the subscriptions section. The user can then select the channel from the subscriptions section to consume (e.g., playback or listen to) media items of the channel. The user can select a media item of the channel and can immediately consume the media item.

In one implementation, the user lists and filters 1515 can include one or more buttons (not shown). The buttons may allow the user to view a history of the media items that the user has consumed (e.g., viewed or played). For example, when the user selects and/or activates a button, a new GUI that includes a list of the last (e.g., ten, twenty, fifty or hundred) media items viewed by the user may be presented to the user. A button may allow a user to view different playlists of media items that the user has previously created and/or obtained. A playlist may be a list and/or an order of different media items that can be viewed in sequential or shuffled order without interaction from the user. A media viewer (e.g., a media viewer application and/or a web browser) may play the media items on a playlist in the order in which the media items are listed on the playlist. A user may also transition between media items on a play list. For example, a user may play the next media item on the playlist or may select a particular media item in the playlist.

In a further implementation, when the user is unsubscribed from a channel, the channel is removed from the subscriptions section. The user may be unsubscribed from a channel if the user provides user input indicating that the user wants to unsubscribe from the recommended channel. For example, the user may activate an "Unsubscribe" button. For paid channels, the user may be unsubscribed from a subchannel if the user's subscription runs out. For example, if the user subscription was for a term of one month and the user does not pay for an additional month, the user may be unsubscribed from the channel. Similarly, when a user gains access to a channel through a promotion or trial period, the user may be unsubscribed from the channel when the promotion or trial period concludes.

The masthead advertisement 1520 can be an advertisement that is prominently displayed on the user home GUI 1500 for each user of the internet-based content platform. The masthead advertisement 1520 includes one or more media types, such as text, audio, video and an image. The display prominence and positioning of the masthead advertisement 1520 can help drive user traffic to a particular internet destination described in the masthead advertisement 1520. To facilitate driving traffic, the masthead advertisement 1520 can include one or more hyperlinks that direct users to an internet property, such as a channel home GUI or composite channel home GUI, as described in conjunction with FIGS. 19, 21, 25 and 26. The masthead advertisement 1520 can also encourage subscriptions to a channel and can include a subscribed button that enables a user to subscribe to a channel from the masthead advertisement 1520.

The advertisement 1525 can be any type of advertisement, such as a display advertisement, a banner advertisement, a video advertisement, etc. The advertisement 1525 can be used to inform users of content and channels that may be of interest to the user. In one implementation, the advertisement 1525 can include a list of one or more channels, as described in further detail in conjunction with FIGS. 18A and 18B.

In one implementation, the ads for the masthead advertisement 1520 or for the advertisement 1525 are auctioned to determine what ads should be returned to the internet-based content platform and/or the order in which they should be presented to the user. This determination may depend on, for example, advertisers' bids (e.g., the maximum amount an advertiser will pay per user click on an advertisement) and/or the performance scores of the ads. The performance score of an ad may be calculated based on, for example, historical click-through rates, relevance of an advertiser's ad text and keywords, an advertiser's account history, etc. In another implementation, the ads are selected by channel advertisement management subsystem 135 on a reservation basis (e.g., based on predefined conditions) without taking into account other advertisers' bids and/or the performance scores of the ads.

Figure 15B:
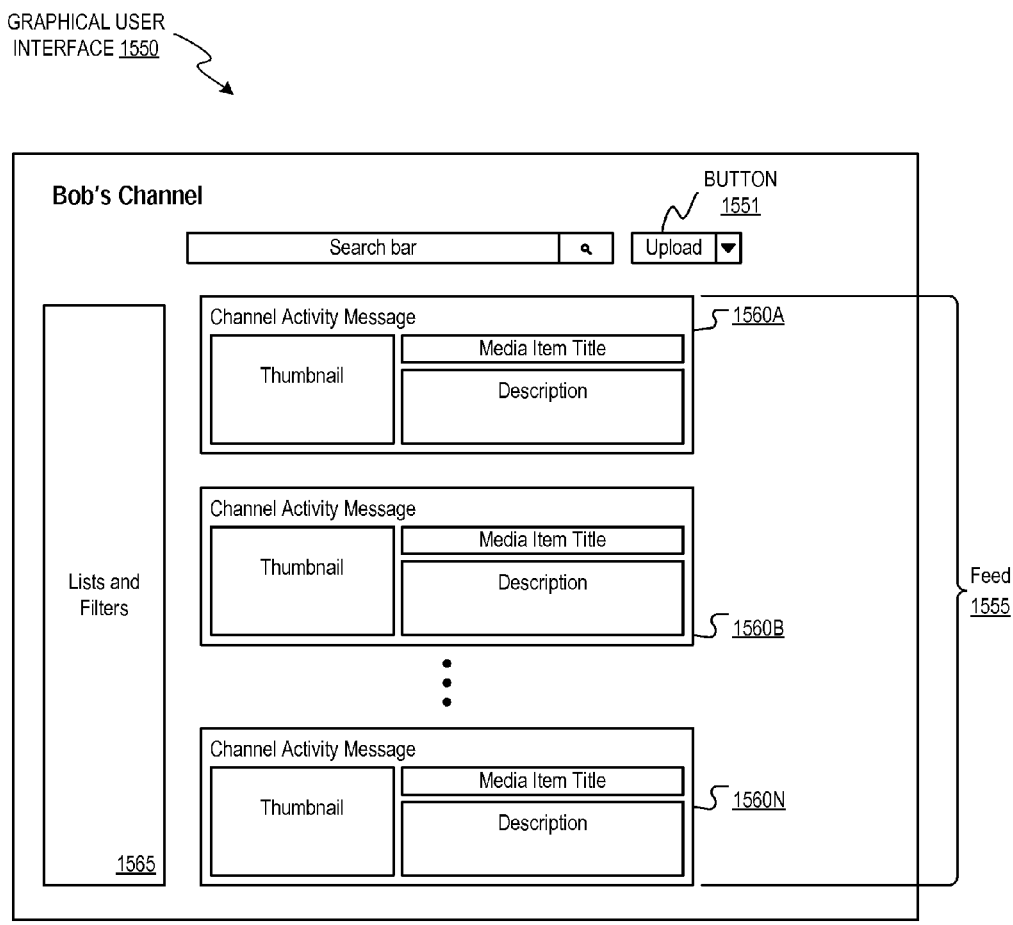
FIG. 15B illustrates an example home GUI that may be presented to a channel curator after the channel curator creates a new channel and/or after the channel curator logs into an internet-based content platform, according to some implementation of the present disclosure.

FIG. 15B illustrates an example home GUI 1550 that may be presented to a channel curator after the channel curator creates a new channel and/or after the channel curator logs into an internet-based content platform, according to one embodiment of the present disclosure. The GUI 1550 includes a search bar, button 1551, lists and filters 1565, and a feed 1555. As indicated in FIG. 3, the name of the channel created by the channel curator is "Bob's Channel." The GUI 1550 illustrates that a user of the internet-based content platform can be a curator of some channels, as well as an end user of other channels.

The button 1551 allows a channel curator to upload media items to the channel (e.g., to Bob's Channel). When the channel curator activates (e.g., selects, clicks, etc.) the button 1551, a media item upload GUI may be presented to the channel curator. The media item upload GUI may allow the channel curator to select and upload media items to the channel (e.g., to Bob's Channel).

The feed 1555 can include information of activities associated with channels to which the channel curator is subscribed. When the channel curator subscribes to a channel (e.g., paid and free) or connects with a social contact, the internet-based content platform may provide the channel curator with new media items (e.g., media items added to a channel that the channel curator is subscribed to, media items that have been commented on or approved by a social contact of the channel curator, etc.) to consume and/or provide the channel curator with access to media items. For example, media items from subscribed channels (e.g., paid and free) may be displayed on the user feed 1555. It should be understood that any type of activity or feed information from any source or other entity may be shown in the feed 1555. For example, an image (e.g., a JPEG) may be shown in the feed 1555, digital music (e.g., an MP3) may be played in the feed 1555, social media information (e.g., a tweet, a like, etc.) may be shown in the feed 1555, blog information (e.g., a blog post, etc.) may be shown in the feed 1555, etc.

The information of activities of others (e.g., other channel curators, social contacts, celebrities, etc.) can be presented as one or more feed items 1560A-1560N. The feed items 1560A-1560N can include an activity message, a thumbnail or frame of a media item, a media item title, and a description of the media item. In one embodiment, the feed items 1560A-1560N can include information about the most recent activities associated with each channel (e.g., content uploaded to the channel, etc.), as well as a mechanism for the channel curator to perform an action for that activity (e.g., providing a frame or thumbnail of the content uploaded to the channel that serves as a link to the content). For example, feed item 1560A may include an activity message that "Channel A uploaded a video," as well as a thumbnail or frame of the video which the channel curator can activate to view the new video. When other channel curators add and/or remove media items from their channels, the feed 1555 may be updated in real-time (e.g., new feed items may be added and existing feed items may be removed). When a channel curator is unsubscribed from a channel, the internet-based content platform can also prevent media items of the channel from appearing in the feed 1555.

The lists and filters 1565 can be a list of one or more channels (free or paid) that may be of interest to the channel curator. The lists and filters 1565 can also include a guide that helps the channel curator to discover content that may be of interest. For example, lists and filters 1565 can include a section for what to watch, what media items are popular on the internet-based content platform, what media items social contacts of the channel curator have been consuming, etc. The lists and filters 1565 can also include links to help the channel curator to see their watch history and what media items they have marked for later consumption.

The lists and filters 1565 can also include a subscriptions section that includes a list of one or more channels that the channel curator is currently subscribed to. In one embodiment, the subscriptions section may include a list of all channels, both free and paid, to which the channel curator is subscribed. In another embodiment, the subscriptions section may include a subset of channels to which the channel curator is subscribed. The subscriptions section may also present a predefined number of channels (e.g., five channels), the channels that the channel curator accesses most frequently, the channels that the channel curator has accessed most recently, the channels that the channel curator has most recently subscribed to, etc. The subscriptions section can further include the channel names (e.g., "Channel A") to present to the channel curator that the channel curator is currently subscribed to channel. When a channel curator subscribes to a channel, the channel can be added to the subscriptions section. The channel curator can then select the channel from the subscriptions section to consume (e.g., playback or listen to) media items of the channel. The channel curator can select a media item of the channel and can immediately consume the media item.

In one implementation, the lists and filters 1565 can include one or more buttons (not shown). The buttons may allow the channel curator to view a history of the media items (e.g., a list of the last ten, twenty, fifty, or hundred media items) that the channel curator has consumed (e.g., viewed or played). A button may allow a channel curator to view different playlists of media items that the channel curator has previously created and/or obtained. A playlist may be a list and/or an order of different media items that can be viewed in sequential or shuffled order without interaction from the channel curator. A media viewer (e.g., a media viewer application and/or a web browser) may play the media items on a playlist in the order in which the media items are listed on the playlist. A channel curator may also transition between media items on a play list. For example, a channel curator may play the next media item on the playlist or may select a particular media item in the playlist.

In a further implementation, when the channel curator is unsubscribed from a channel, the channel is removed from the subscriptions section. The channel curator may be unsubscribed from a channel if the channel curator provides input indicating that the channel curator wants to unsubscribe from the recommended channel. For example, the channel curator may activate an "Unsubscribe" button. For paid channels, the channel curator may be unsubscribed from a channel if the channel curator's subscription runs out. For example, if the subscription was for a term of one month and the channel curator does not pay for an additional month, the channel curator may be unsubscribed from the channel. Similarly, when a channel curator gains access to a channel through a promotion or trial period, the channel curator may be unsubscribed from the channel when the promotion or trial period concludes.

Figure 16:
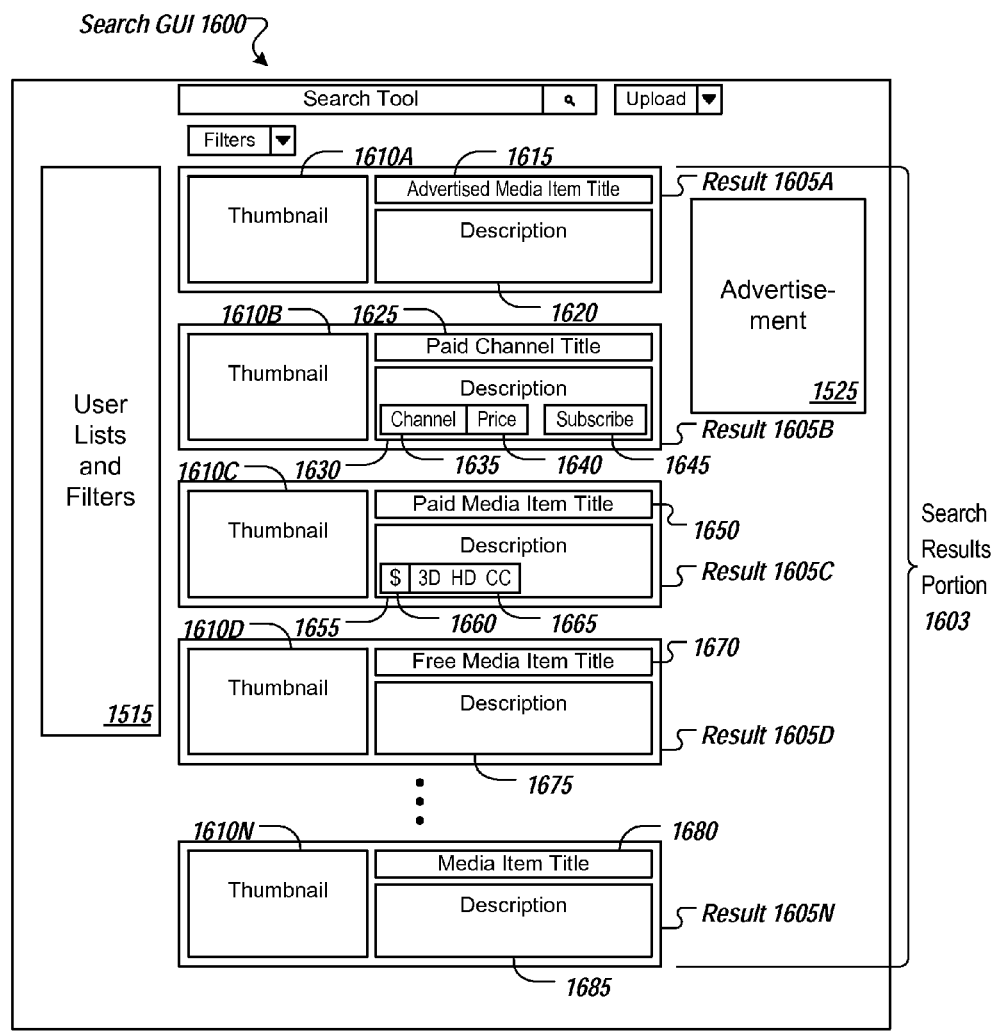
FIG. 16 illustrates an example search GUI in accordance with some implementation of the present disclosure.

FIG. 16 is an example search GUI 1600 in accordance with some embodiments of the present disclosure. The search GUI 1600 includes a search results portion 1603, user lists and filters 1515 and at least one advertisement 1525.

The search results portion 1603 presents search results in the search GUI in response to a search query of the end user. The search can be a text-based search, an image-based search, an audio-based search, a video-based search, a biometric input-based search, etc. When the end user performs a search using a search tool in the search GUI 1600, for example, one or more search results 1605A-1605N can be presented to the user. The search results can be media items, both paid and free, and channels, also paid or free. The search GUI 1600 can receive a selection of a media item of a paid channel from among the search results. The search GUI 1600 can then cause the media item to be played to the end user. In one implementation, the search results can include at least one advertised search result, shown as result 1605A, that appears prominently among other the search results.

Search results 1605A, 1605B, 1605C, 1605D and 1605N have been provided in the search GUI 1600 as examples and can be presented in any order. Each search result can include a thumbnail, the title of a channel or media item, and a description of the channel or media item. The thumbnail 1610 may be text, a thumbnail, an image, an icon, a frame, a video, a video clip, and/or some other media used to represent the media item for the search result 1605.

In an example, the search result 1605A is an advertised media item and can include the title of the advertised media item 1615, a description of the media item 1620, and a thumbnail 1610A.

Search result 1605B specifies a paid channel and can include the title of the paid channel 1625, a description of the paid channel 1630, and a thumbnail 1610B. The description of the paid channel 1630 can also include an indicator 1635 that the search result specifies a channel, a price 1640 to subscribe to the paid channel and a subscribe button 1645 that the user can activate to subscribe to the paid channel directly from the search GUI 1600. In one implementation, when the user activates the subscribe button, the user can be presented with a screen or a pop-up window where the user can enter subscription information, and payment information to subscribe to the paid channel.

Search result 1605C can specify a paid media item that is part of a paid channel and can include the title of the paid media item 1650, a description of the paid media item 1655, and a thumbnail 1610C. The description of the paid media item 1655 can also include a paid icon 1660 that notifies the user that the media item is a paid media item, and an indicator 1665 of the types of access available for the paid media item. In this example, available types of access for the paid media item search result 1605C include playback in three dimensions, playback in high-definition (e.g., 1080p, 4k), and closed captions.

Search result 1605D specifies a free media item that is part of a free channel and can include the title of the free media item 1670, a description of the free media item 1675, and a thumbnail 1610d.

Search result 1605N can be for any type of media item or channel, can indicate whether it is free or paid and can also indicate any advertising attribute or available type of access to the user. In one implementation, the internet-based content platform can configure the search results to increase visibility for media items that are part of channels the user has already subscribed to. In another implementation, internet-based content platform can configure the search results to increase visibility for media items that the user is not subscribed to, but has access to because the user is subscribed to a composite channel containing the particular channel or media item featured in the search result.

Figure 17:
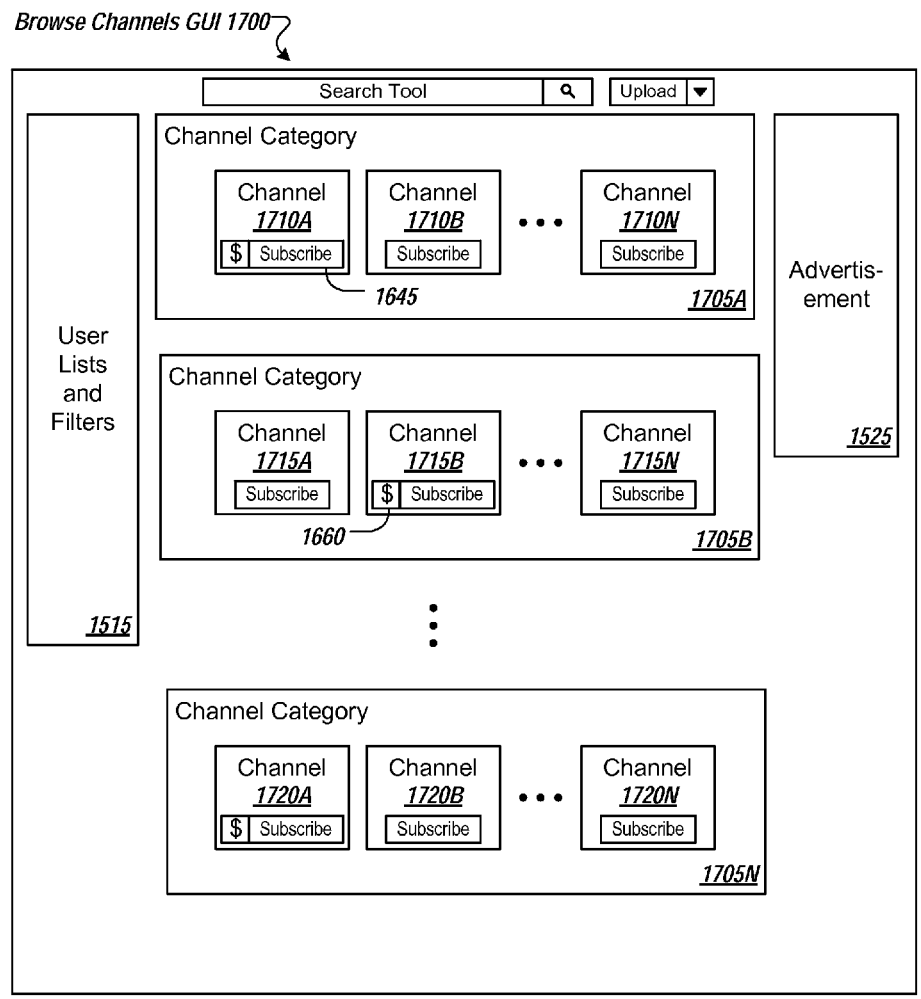
FIG. 17 illustrates an example browse channels GUI in accordance with some implementation of the present disclosure.

FIG. 17 is an example browse channels GUI in accordance with some embodiments of the present disclosure. The browse channels GUI includes one or more channel categories 1705A-N, user lists and filters 1515, at least one advertisement 1525, subscribe button 1645 and paid icon 1660.

The channel categories 1705A-N can each include one or more channels. Channel can be grouped by the categories 1705A-N and can be for any category including a "best of" category, a sports category, an interest category, etc. The channels within the categories can be free or paid. Some channel categories contain only free channels. Other channel categories contain only paid channels. Hybrid channel categories contain both paid and free channels. Paid channels can be identified as being paid through text, an icon, an image or any other indication that the user should pay for full access to the paid channel. In an example, channel category 1705A includes channels 1710A-N, at least one of which is a paid channel. Similarly, channel category 1705B includes channels 1715A-N.

Figure 18A:
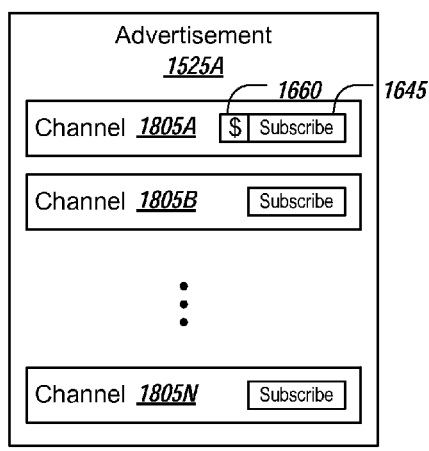
FIGS. 18A-B illustrate example advertisement GUIs in accordance with some implementation of the present disclosure.
Figure 18B:
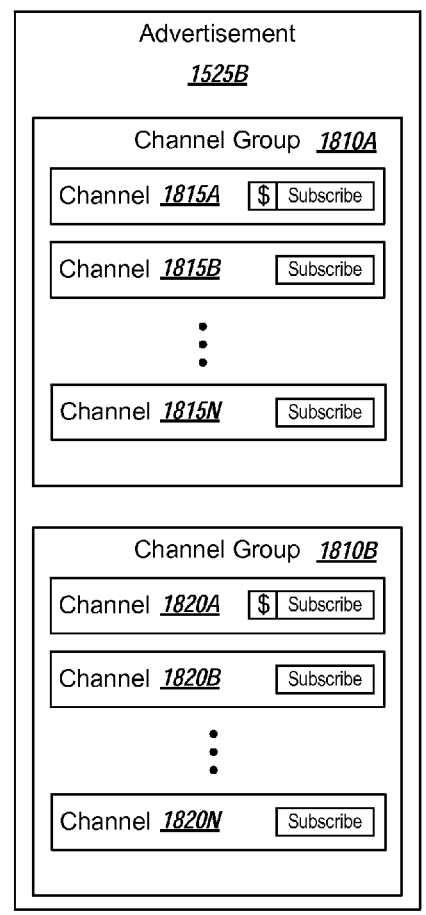

FIGS. 18A-B illustrate example advertisements 1525 in accordance with aspects of the present disclosure. The advertisements 1525 can include one or more channels 1805A-N that are part of a list or group. For example, advertisements 1525 can present recommended, suggested, popular, featured, paid, or composite channels to the user. Advertisements 1525 can include subscribe button 1645 and paid icon 1660.

In one implementation, the advertisement 1525 includes a graphical indicator (e.g., subscribe button) next to each recommended channel. In one implementation, when a user activates or otherwise selects the graphical indicator, a menu appears that facilitates user subscription to the channel. In an alternate embodiment, when a user activates on the graphical indicator, a popup window including a graphical representation (e.g., an image of a single frame from the digital content) of digital content in the recommended channel appears. It should be understood that in other embodiments, other indicators such as graphical representations, and/or text can be presented to a user to provide recommended channels associated with the internet-based content platform. Paid channels can include an additional graphical indicator that notifies the user that the channel is a paid channel.

FIG. 18B illustrates different channel groups 1810A and 1810B within the advertisement 1525B. One channel group 1810A, for example, can be for recommended channels for the user while another channel group 1810B can be for popular channels. Any number of channel groups can be presented in advertisement 1525B.

In one implementation, the content sharing platform may identify recommended paid channels for the user based on interactions that the user has with other users of the content sharing platform and/or other platforms. For example, the content sharing platform may identify other users that communicate with the user (e.g., other users that the user emails, other users that the user chats with, other users that the user communicates messages with using a social connection platform, etc.). The content sharing platform may identify paid channels curated by the other users and/or paid channels that the other users may be subscribed to. The content sharing platform may temporarily subscribe the user to these paid channels on a trial basis (e.g., recommended channels). In another example, the content sharing platform may also analyze the interactions (e.g., analyze the emails, chats, messages, and/or posts) to identify channels that may include media items that are of interest to the user. In another embodiment, the content sharing platform may temporarily subscribe a user to paid channels based on user input provided by the user. For example, the user may voluntarily provide input indicating the user's interests, preferences, likes, dislikes, hobbies, employment, geographical location, personal information, and/or other demographic information. The content sharing platform may identify recommended paid channels that include media items that may be of interest to the user based on the personal information and/or other demographic information voluntarily provided by the user via advertisements 1525A and 1525B.

In situations in which the systems discussed here collect personal information about users, or may make use of personal information, the users may be provided with an opportunity to control whether programs or features collect user information (e.g., information about a user's social network, social actions, interactions or activities, profession, a user's preferences, a user's viewing history, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 19:
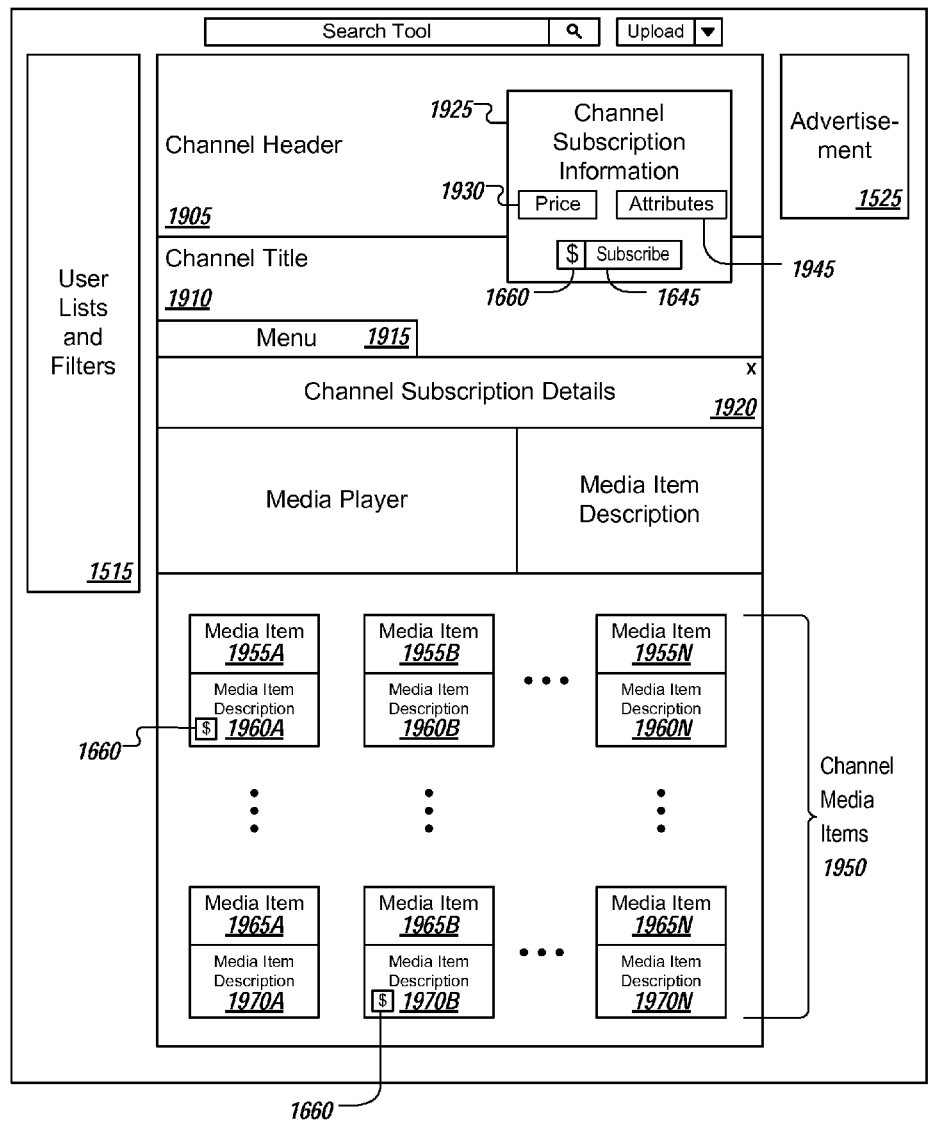
FIG. 19 illustrates an example channel home GUI in accordance with some implementation of the present disclosure.

FIG. 19 illustrates an example channel home GUI 1900 in accordance with some implementations of the present disclosure. The channel home GUI 1900 can showcase media items offered through the channel and can encourage a user to subscribe to the channel. The channel home GUI 1900 can also disseminate information to users about the channel, media items of the channel or any other information the channel curator chooses to make available on the channel home GUI 1900. When the channel home GUI 1900 is for a paid channel, it can present information to users about subscribing to the paid channel. For example, the channel home GUI 1900 can showcase interesting media items that are accessible through a paid subscription to the paid channel. Additionally, the channel home GUI 1900 can present different subscription fees, durations, and subscription options, such as paying for different advertising attributes of the paid channel, or for different types of access to media items of the paid channel. Using the information presented by the channel home GUI 1900, the user can make an informed purchasing decision.

The channel home GUI 1900 can include a channel header 1905, a channel title 1910, a menu 1915, channel subscription details 1920, channel subscription information 1925, one or more channel media items 1950, user lists and filters 1515, one or more advertisements 1525, subscribe button 1645 and paid icon 1660.

The channel header 1905 can describe the channel, media items of the channel, or can be a promotion for the channel. The channel header 1905 can be an image or text that is selected by the channel curator.

The menu 1915 can enable user to navigate to different channel GUIs, such as a home GUI, a browse GUI, a channel feed GUI, a media item GUI, an about GUI, a discussion GUI, or a channel search GUI.

The menu 1915 can enable the user to navigate to different channel GUIs, such as a home GUI, a browse GUI, a channel feed GUI, a media item GUI, an about GUI, a discussion GUI, or a channel search GUI.

Channel subscription details 1920 can specify benefits for subscribing to the paid channel. Channel subscription details 1920 can also include promotions or trial periods for the channel. Channel subscription details 1920 can further include metadata of the channel, such as created by metadata, channel description and channel statistics. The statistics can include a number of people who have subscribed to the paid channel, aggregate statistics across other channels, a number of media items in the paid channel, etc.

Channel subscription information 1925 can present subscriber fees 1930, advertising attributes 1945, types of access (not shown) to the user, and a paid icon 1660. The user subscribes to the paid channel by activating a subscribe button 1645.

In one implementation, the paid channel has one subscription level that is set by the channel curator. In another implementation, the paid channel can permit a user to select an advertising attribute from among a subscriber set of advertising attributes. To subscribe to the channel with the selected advertising attribute, the user pays the corresponding subscriber fee. In another implementation, the paid channel has multiple subscription levels that correspond to different types of access to the media items of the paid channel. When subscribing to the paid channel, the user can select a subscription level that unlocks a desired type of access to media items of the paid channel.

The channel home GUI 1900 can also include one or more media items 1950. The media items can be organized in any manner and the organization can help users locate interesting media items. Media items can be organized in different categories, such as recent uploads, popular uploads, likes, playlists, parodies, original videos, reposts, or other categories. In one implementation, a channel curator defines some or all of the categories and organizes media items of the channel within the categories. When a channel curator adds or uploads a media item to the channel, the new media item can be presented as part of the paid channel immediately after the channel curator adds the new media item to the paid channel. Users that are browsing the channel may observe the addition of the new media in real time. Similarly, when the channel curator remove an existing media item from the paid channel, the existing media item can be removed from the channel home GUI 1900 in real time. In another implementation, users can organize, filter and sort media items by category, upload date, number of views, number of like, number of dislikes, paid, free, etc.

Some of the media items can be viewable for free, even if the media items are part of a paid channel. Users can watch these media items even if they have not subscribed to the paid channel, which can be a way for the user to sample content of the paid channel before committing to paying for access. In another implementation, one or more media items of the paid channel can be available for individual purchase within the channel for users who have not subscribed to the paid channel. Such media items can have an identifier 1935 to inform the user that the media item can be purchased on an individual basis. In this manner, the user can choose between renting or purchasing a single media item or subscribing to a whole channel that includes the media item.

The channel home GUI 1900 can also include one or more advertisement 1525. The advertisement 1525 can present channels or media items that are related to the channel depicted in the channel home GUI 1900.

Figure 20:
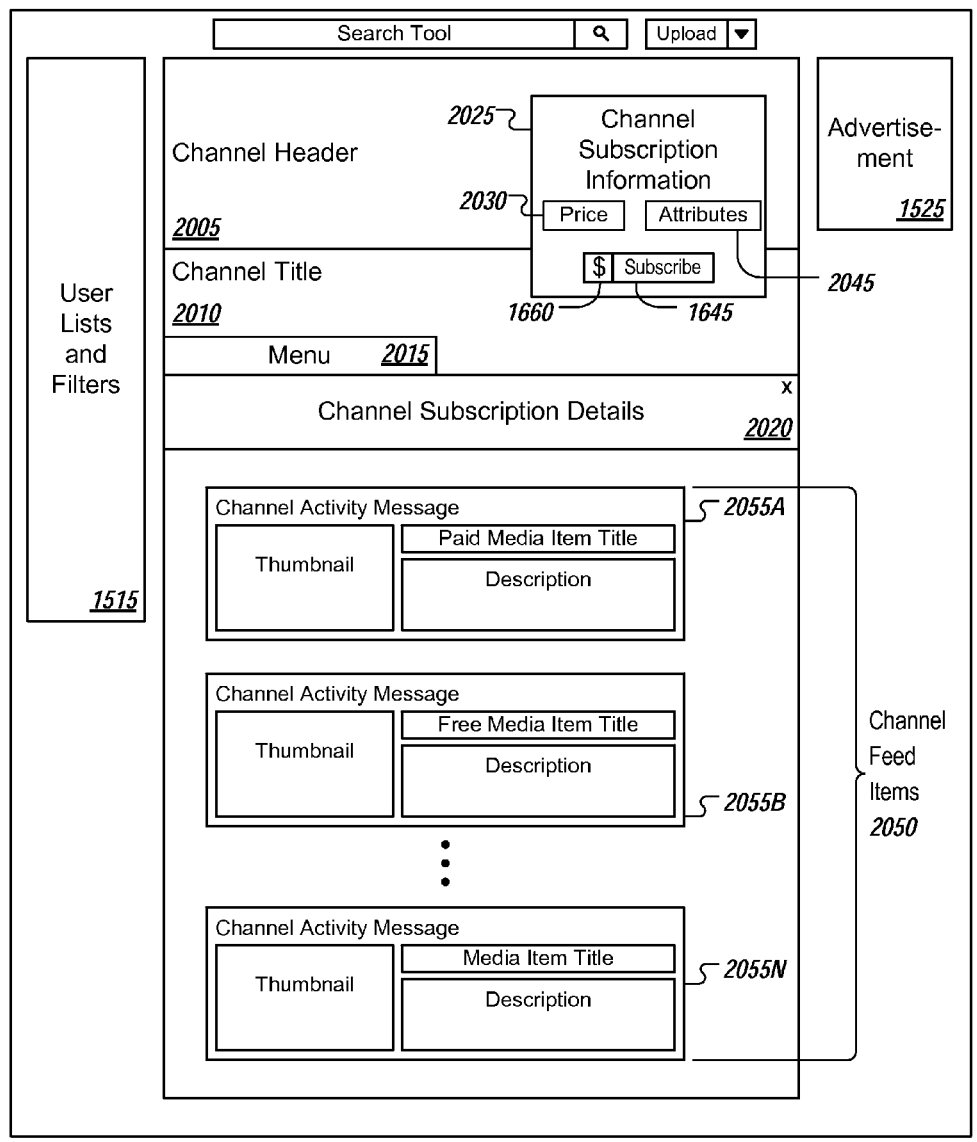
FIG. 20 illustrates an example channel feed GUI in accordance with some implementation of the present disclosure.

FIG. 20 illustrates an example channel feed GUI 2000 in accordance with some implementations of the present disclosure. The channel feed GUI 2000 can be similar to the channel home GUI, with similar features, such as a channel header 2005, a channel title 2010, a menu 2015, channel subscription details 2020, channel subscription information 2025, user lists and filters 1515, advertisement 1525, subscribe button 1645 and paid icon 1660. In one implementation, a user can navigate to the channel feed GUI 2000 using navigation tools in the menu 2015. The channel feed GUI 2000 can also include one or more channel feed items 2055A-N within a channel feed 2050.

The channel feed 2050 can include information about activities associated with channels to which the user is subscribed. In one implementation, the channel feed 2050 can include information about the most recent activities (e.g., activity items) associated with the channel (e.g., paid or free media items uploaded to the channel, etc.), as well as a mechanism for the user to perform an action for that activity (e.g., providing a frame, image, and/or icon of the digital content uploaded to the channel that serves as a link to the digital content).

As illustrated in FIG. 20, the channel feed 2050 includes feed items 2055A-N. Each media item may include information about the activity, the title of a media item, a description of the media item, and thumbnail for the media item. In one implementation, when a user is unsubscribed from a paid channel, the user may not be permitted to view the channel feed 2050.

Figure 21:
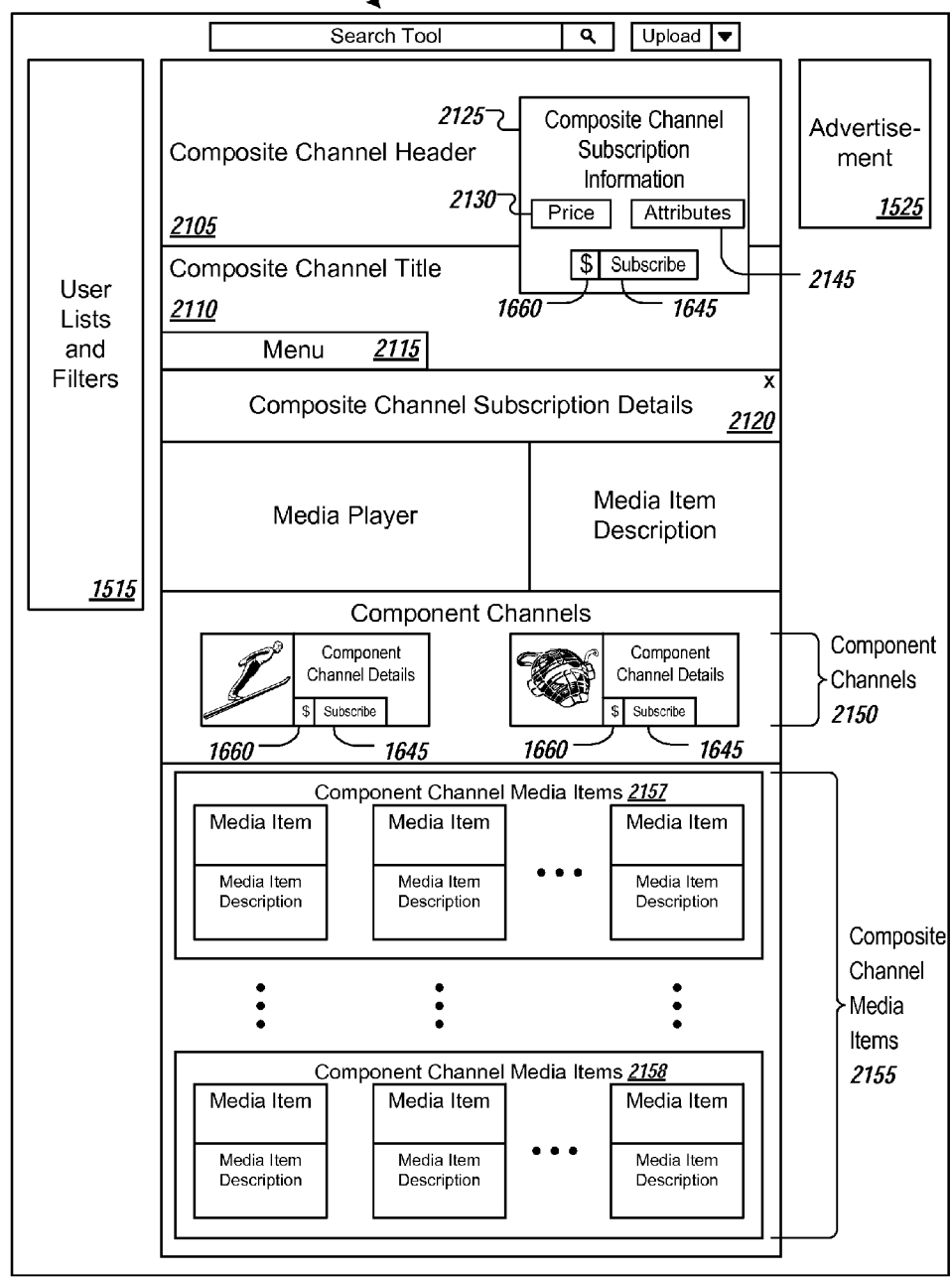
FIG. 21 illustrates an example composite channel home GUI in accordance with some implementation of the present disclosure.

FIG. 21 illustrates an example composite channel home GUI 2100 in accordance with some implementations of the present disclosure. The composite channel home GUI 2100 can be similar to the channel home GUI 1900 and can include similar features, such as a composite channel header 2105, a composite channel title 2110, a menu 2115, composite channel subscription details 2120, composite channel subscription information 2025, user lists and filters 1515, advertisement 1525, paid icon 1660 and subscribe button 1645. In one implementation, a user can navigate to the composite channel home GUI 2100 using navigation tools in the menu 2115.

In addition to the features described in the channel subscription information 1925 of FIG. 19, the composite channel subscription information 2125 can also include information pertaining to the composite channel, one or more component channels, and media items of the composite channel that are not part of any component channel. Because the composite channel can include multiple component channels, the composite channel subscription information 2125 can inform users that subscribing to the composite channel can be more cost effective then subscribing to each component channel individually.

The composite channel home GUI 2100 can also include a listing of component channels 2150 included in a subscription to the composite channel. In one implementation, each component channel can include a subscribe button 1645 that can be used to subscribe to the component channel individually.

The composite channel home GUI 2100 can also include one or more composite channel media items 2155. The media items can be organized in any manner and the organization can help users locate interesting media items. Media items can be organized in different categories, such as by component channel, recent uploads, popular uploads, likes, playlists, parodies, original videos, reposts, or other categories. In one implementation, a channel curator defines some or all of the categories and organizes media items of the channel within the categories. As shown, the media items of the composite channel are grouped by component channels. When a channel curator adds or uploads a media item to the channel, the new media item can be presented as part of the composite channel immediately after the channel curator adds the new media item to the composite channel. Users that are browsing the composite channel may observe the addition of the new media in real time. Similarly, when the channel curator removes an existing media item from the composite channel, the existing media item can be removed from the composite channel home GUI 2100 in real time. In another implementation, users can organize, filter and sort media items by category, upload date, number of views, number of like, number of dislikes, paid, free, etc.

Composite channel subscription details 2120 can include benefits for subscribing to the composite channel. Composite channel subscription details 2120 can also include promotions or trial periods for the channel. Composite channel subscription details 2120 can further include metadata of the channel, such as created by metadata, channel description and channel statistics. The statistics can include a number of people who have subscribed to the composite channel, aggregate stats across all component channels, a number of channels included in the composite channel, a number of media items included in the composite channel.

Figure 22A:
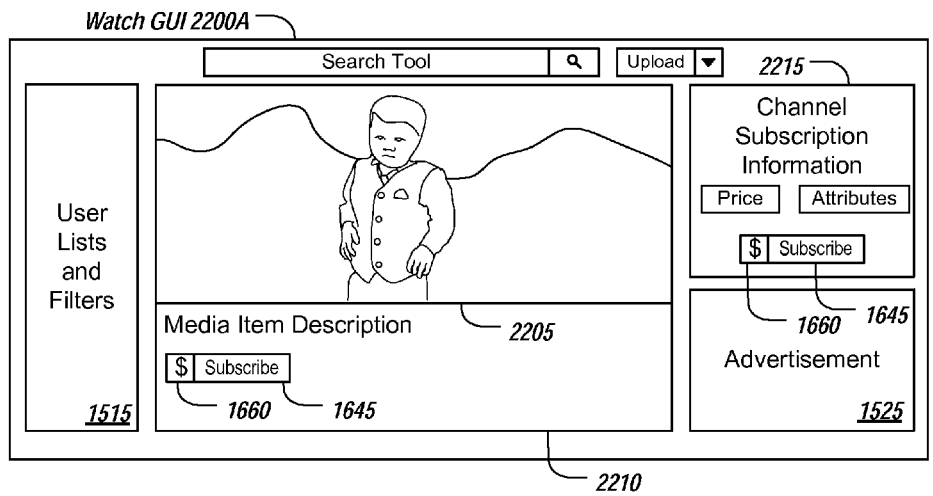
FIGS. 22A-B illustrate example watch GUIs in accordance with some implementation of the present disclosure.
Figure 22B:
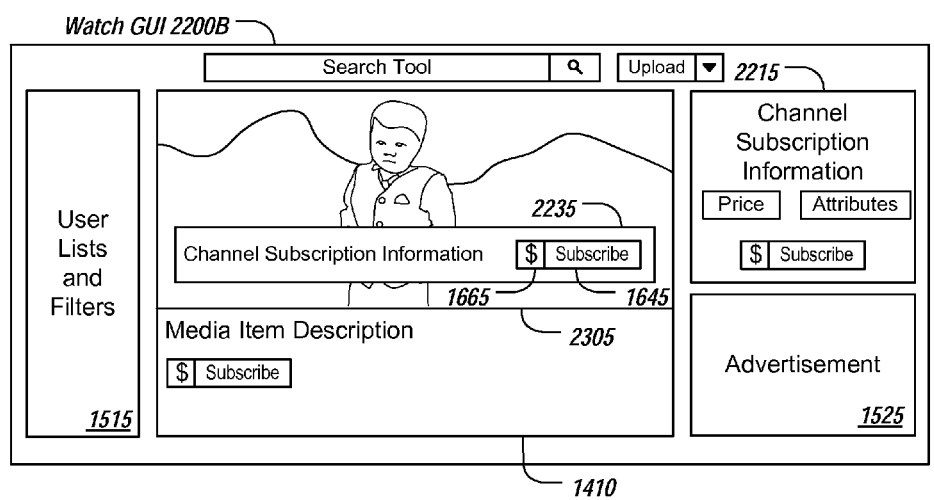

FIGS. 22A-B illustrate example watch GUIs 2200A-B in accordance with some embodiments of the present disclosure. Watch GUIs 2200A-B may be displayed to the user in response to a user selection of a media item, such as from the user lists and filters 1515, advertisement 1525, user feed, search GUI, channel home GUI, channel feed GUI, search result, channel page, composite channel page, an external source, etc. Watch GUIs 2200A-B can include a media viewer 2205, a description 2210, channel subscription information 2215, user lists and filters 1515, at least one advertisement 1525, subscribe button 1645 and paid icon 1660.

The media viewer 2205 can include media viewer controls (not shown) which may be used to control the consumption of the media items (e.g., digital videos and/or digital music). The media viewer controls may include a play button, a pause button, a rewind button, a fast forward button, and a volume button. The play button may allow a user to begin and/or restart playback of the media items. The pause button may allow a user to pause and/or un-pause playback of the media items. The rewind button may allow a user to rewind playback, move and/or skip to an earlier point in time in the media items. The fast forward button may allow a user to fast forward playback, move, and/or skip to a later point in time in the media items. The media viewer 2205 may also include a play time display, a playback bar and a playback slider. The play time display may display a current play time and/or a total play time for the media items. For example, a total play time (e.g., the total length) of media item may be 2 minutes and 30 seconds. The current play time may be current time/position in the playback of media item. Playback slider may be positioned on a region of a playback bar that corresponds to the current play time. The playback slider may be adjusted (e.g., dragged) to any other region of the playback bar to adjust the current play time shown in the play time display. The media viewer 2205 may present any type of content, including videos, images, music, and/or other media items.

Watch GUIs 2200A-B can also include description 2210. The description 2210 may include information such as the title, a detailed description of the media item or of a channel associated with the media item, whether the media item is a paid or free item, whether the media item is part of a free or paid channel, a subscription fee to subscribe to a channel associated with the media item, types of access that can be unlocked by subscribing to a channel associated with the media item, a number of approvals from other users (e.g. "likes"), number of dislikes, the channel that the media item belongs to, and total number of views for the media item. The description 2210 can further include a button that allows a user to subscribe to a paid channel that includes the media item presented in the media viewer 2205.

The channel subscription information 2215 can indicate subscriber fees, subscription levels, advertising attributes, types of access, etc., as described herein.

In one implementation, when a user is consuming a media item in the media viewer 2205, other media items or channels from the same curator can be prominently displayed in advertisement 1525.

In one implementation, the watch GUI 2200A-B can present a message that informs the user that the selected media item is a paid media item that encourages the user to subscribe to the paid channel for full access to the media items of the paid channel. The message can inform the user of any paid channels that include the paid media item as well as how to subscribe to these paid channels. The message can be displayed before, during or after playback of the media item. For example, before permitting access to a media item, watch GUI 2200A-B can present a message informing the user that the item is a paid item. The watch GUI 2200A-B can also present a request that the user subscribe to the channel prior to consuming the media item. In another example, the watch GUI 2200A-B can present the first two minutes of a thirty minute video, then require a subscription to the channel for further media item consumption.

FIG. 22B illustrates one implementation where a message 2235 is presented in the media viewer 2205 during playback. The message indicates that the user needs to subscribe to the channel to obtain full access to the media item.

FIGS. 23A-D illustrate example channel subscription information GUIs 2300 in accordance with some embodiments of the present disclosure. Channel subscription information interfaces 2300 may be displayed to the user to encourage a user to subscribe to a paid channel as well as to inform the user of what subscriptions levels or other options are available through subscription. The channel subscription information interface 2300 can be presented (e.g., as a pop-up window or a main window portion) as part of any GUI provided by the internet-based content platform. Further, when a user navigates to a paid media item that the user is not allowed to consume, channel subscription information 2300 can be presented to the user to encourage subscription.

FIG. 23A illustrates one example of a channel subscription information GUI 2300a that includes a title or description of the paid channel, different subscriber fees and subscription durations (e.g., $2.99/month or $43.99/year), an access grace period (e.g., a 14 day trial), an advertising attribute (e.g., no advertising), and a number of other users subscribed to the paid channel (e.g., 15,098,198). Channel subscription information GUI 2300a also includes a subscribe button 1645 alongside a paid icon 1660. The subscribe button 1645 can receive a request of a user to subscribe to the paid channel.

FIG. 23B illustrates one example of a composite channel subscription information GUI 2300b that includes a title or description of the paid composite channel, a number of included component channels (e.g., two additional channels), different subscriber fees and subscription durations (e.g., $2.99/month or $43.99/year), a type of access (e.g., offline access), an advertising attribute (e.g., no advertising), and a number of other users subscribed to the paid composite channel (e.g., 15,098,198). Channel subscription information interface 2300b also includes a subscribe button 1645 alongside a paid icon 1660. The subscribe button can be selected by a user to subscribe to the paid composite channel.

FIG. 23C illustrates another example of a channel subscription information GUI 2300c for a paid channel that includes additional information 2310 about subscribing to a composite channel that includes the paid channel and four more component channels for the same subscriber fee (e.g., $3.99/month).

FIG. 23D illustrates a further example of a composite channel subscription information GUI 2300d, which can be used when a user attempts to subscribe to a component channel that is only available via a composite channel.

FIGS. 24A-D illustrates a paid channel subscription GUI flow in accordance with some implementations of the present disclosure. FIGS. 24A-D can be presented to a user on a single user device, or via a single application.

Figure 24A:
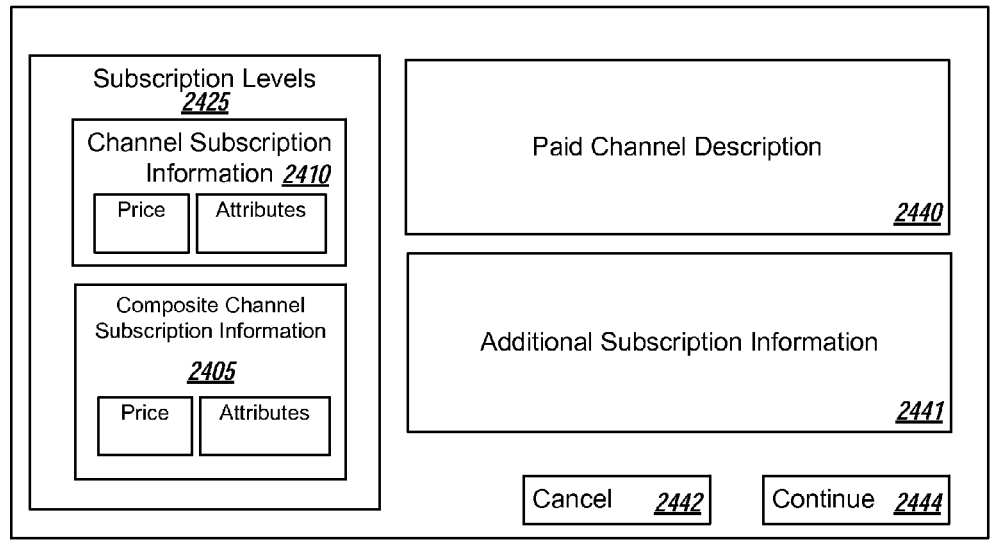
FIG. 24A illustrates an example channel subscription GUI in accordance with some implementation of the present disclosure.

FIG. 24A illustrates an example channel subscription GUI 2400. When a user discovers a channel of interest, the user can select a subscribe button to initiate a flow to subscribe to the channel of interest. When the user selects a subscribe button to subscribe to the channel of interest, the user is directed to channel subscription GUI 2400 where information about that channel, including subscription information, is presented to the user. The channel subscription GUI 2400 can include a subscription levels section 2425, a paid channel description 2440, additional subscription details 2441, a cancel button 2442 and a continue button 2444.

The subscription levels section 2425 can be a listing of one or more channels that the user can subscribe to using the example paid channel subscription flow. When the channel of interest is a paid channel, the channel subscription information 2410 can present additional information about the channel and subscription. For example, the channel subscription information 2410 can inform the user of one or more subscription periods and related subscriber fees. When the paid channel is a component channel of one or more composite channels, the subscription levels section 2425 can also include composite channel subscription information 2405, which informs the user of additional ways to obtain access to the channel of interest. Similar to the channel subscription information 2410, the composite channel subscription information 2405 can inform the user of one or more subscription periods and related subscriber fees. When multiple channels (e.g., paid and composite) are presented in subscription levels section 2425, the user can select from the multiple channels and other portions of channel subscription GUI 2400 (e.g., paid channel description 2440, channel subscription details 2441) are populated with information about the selected channel.

Paid channel description 2440 can present further information about the paid channel, such as the title of the channel and a paragraph of text that describes the channel.

Channel subscription details 2441 can include further information about the subscription, such as what type of access the user can have after subscribing to the paid channel, free trial information, etc.

Figure 24B:
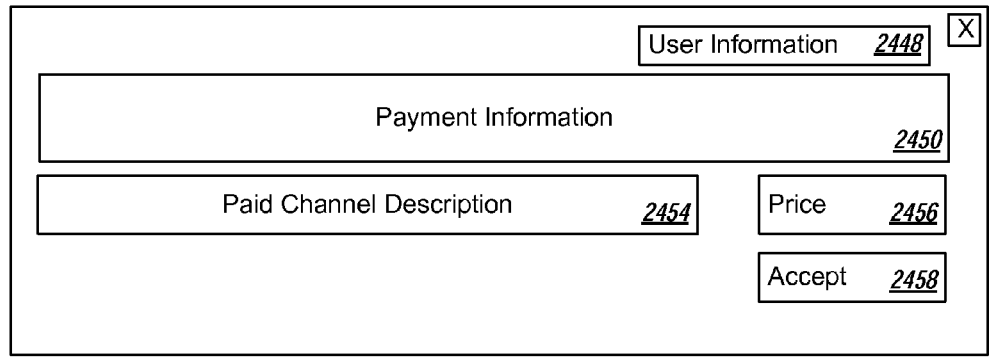
FIG. 24B illustrates an example subscription payment GUI in accordance with some implementation of the present disclosure.

FIG. 24B illustrates an example subscription payment GUI 2446, which includes user information 2448, payment details 2450, paid channel description 2454, subscriber fee 2456, and an accept button 2458.

The user information 2448 can include a user name when the user is logged in, or can request user access credentials when the user is not logged in. Payment details 2450 can include a name or description of the entity receiving the payment, and a total charge for the subscription. When subscribing to multiple channels at once, payment details 2450 can also include an itemized description of each channel the user is subscribing to. Payment details 2450 can also inform the user that the subscriber fee is a recurring payment. Payment details 2450 can further include cancellation policies and terms of service. Payment details 2450 can also include user payment information, such as how the user is paying for the subscription (e.g., a credit card, digital currency, etc.). Subscriber fee 2456 can describe the total subscriber fee to subscribe to the paid channel. When the user is ready to subscribe to the paid channel, the user can activate the accept button 2458 to complete the purchase.

Figure 24C:
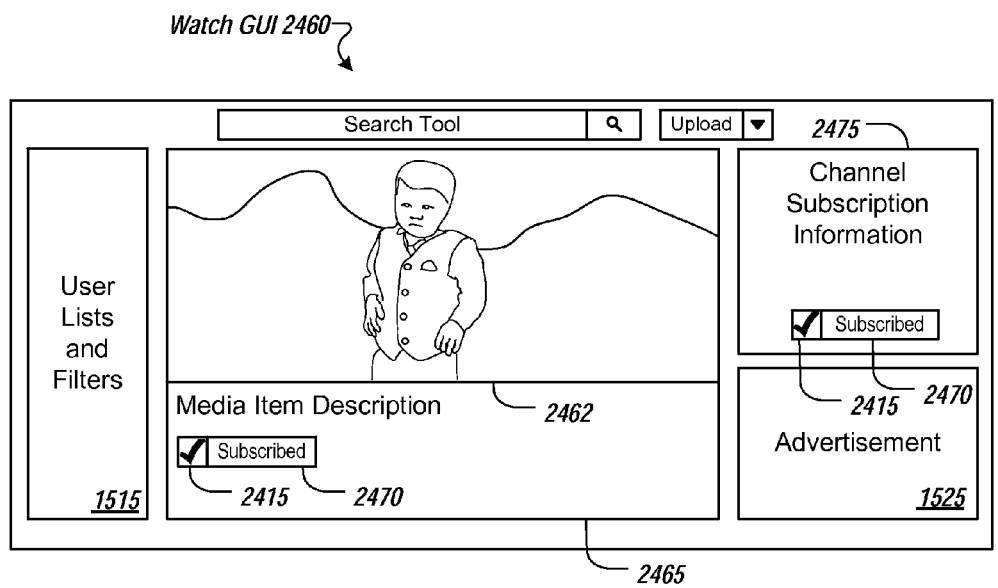
FIG. 24C illustrates an example watch GUI in accordance with some implementation of the present disclosure.

FIG. 24C illustrates an example watch GUI 2460 that can be presented to the user immediately after the user subscribes to a paid channel. This enables a user whose media consumption experience was interrupted by a payment flow, such as the payment flow described in FIGS. 24A-B, to quickly resume consuming content. The watch GUI 2460 can include a media viewer 2462 that plays media items. The watch GUI 2460 can also include a check box 2415 and a subscribed button 2470 that indicates that the user is subscribed to a paid channel that includes the media item.

Figure 24D:
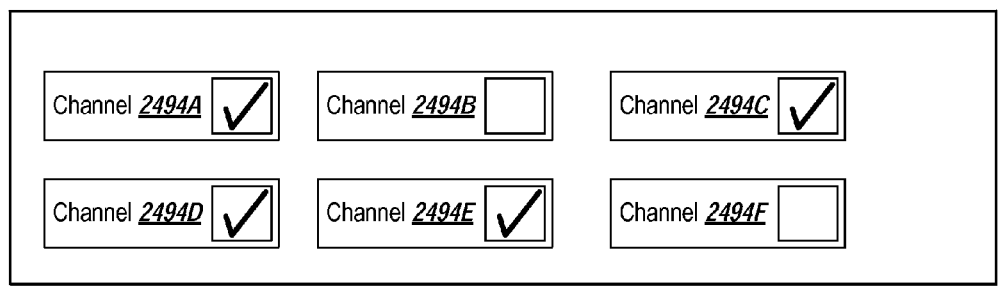
FIG. 24D illustrates an example component channel addition GUI in accordance with some implementation of the present disclosure.

FIG. 24D illustrates an example component channel addition GUI 2485 according to some implementations of the present disclosure. After a user subscribes to a composite channel, the user can be automatically subscribed to all component channels. In another implementation, after the user subscribes to a composite channel, the user can be presented with a list of available component channels 2494A-F, which is depicted in component channel addition GUI 2485. The user can select or deselect one or more of the component channels to subscribe or unsubscribe to the component channels 2494A-F. Since the user paid for access to the component channels 2494A-F via the composite channel, the user may not need to submit an additional subscriber fee when subscribing to the component channels 2494A-F.

Figure 25:
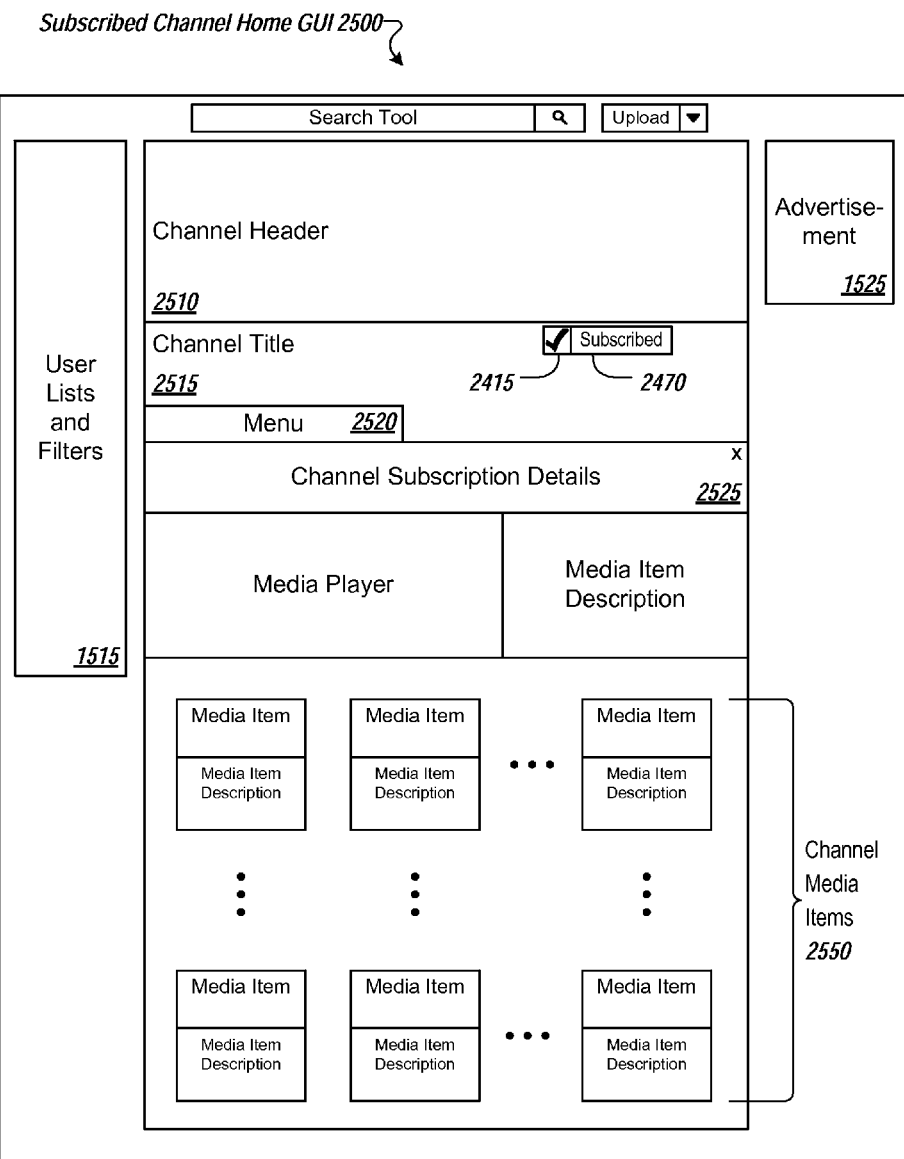
FIG. 25 illustrates an example subscribed channel home GUI in accordance with some implementation of the present disclosure.
Figure 26:
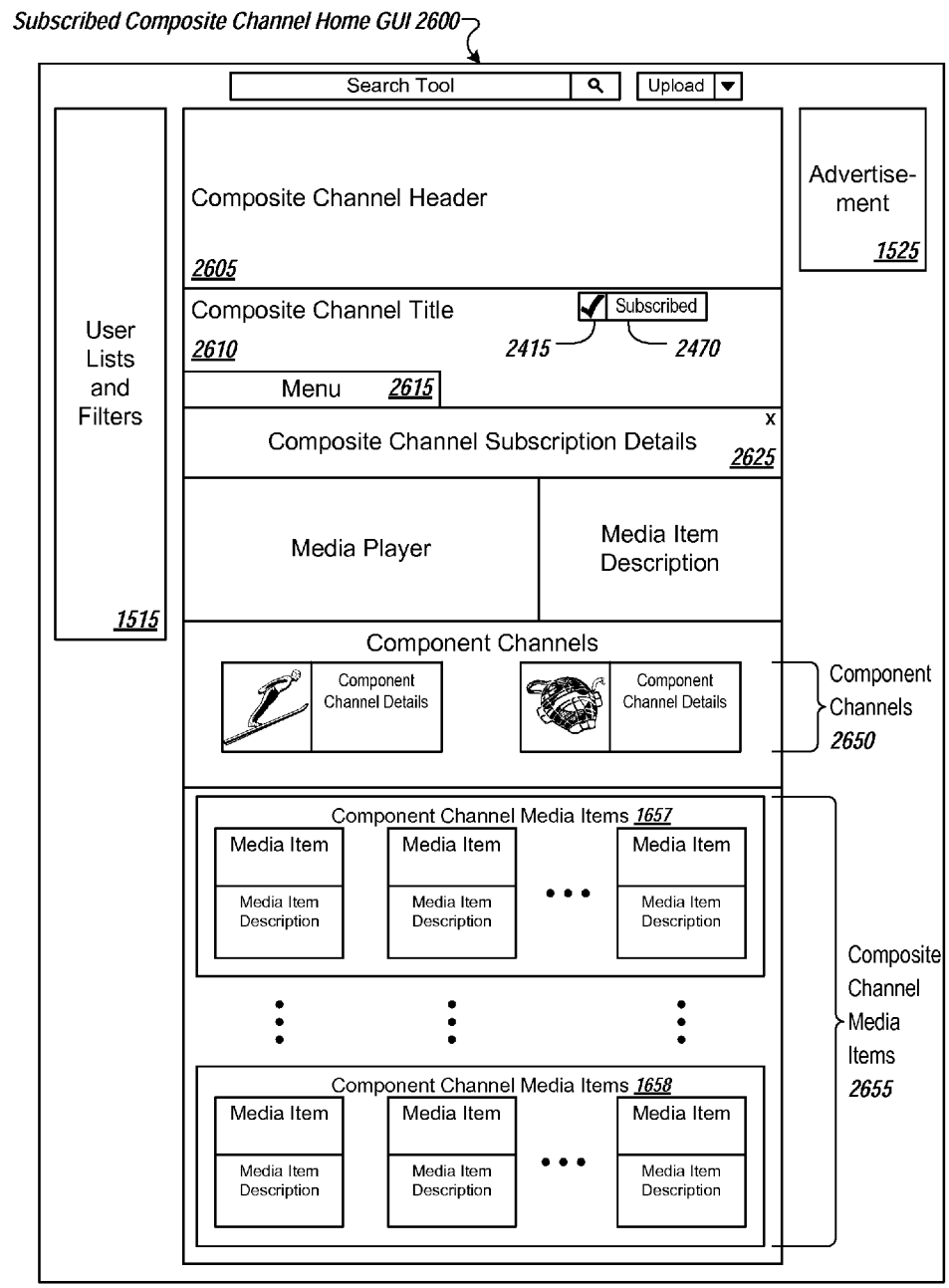
FIG. 26 illustrates an example subscribed composite channel home GUI in accordance with some implementation of the present disclosure.

FIGS. 25 and 26 illustrate an example subscribed channel home GUI 2500 and an example subscribed composite channel home GUI 2600, respectively. Each can include an indication to the user that the user is subscribed, such as the check box 2415 and a subscribed button 2470. In some implementations, the appearance, organization or features subscribed channel home GUI 2500 and the subscribed composite channel home GUI 2600 can change depending on whether the user is subscribed to the paid channel or composite channel. For example, a subscribed user may have access to additional content, or to a features video when viewing the subscribed channel home GUI 2500 or subscribed composite channel home GUI 2600. In another implementation, only subscribers have access to see content of the paid channel or composite channel. For composite channels, at least one of the component channels can be blocked for non-subscribers.

In one implementation, a user may become subscribed to a composite channel after the user subscribes to a threshold number of component channels. For example, the user is a subscriber of four component channels, each of which has a $0.99/month subscriber fee. A composite channel that includes these four component channels, as well as three additional component channels and a few premium media items, can all be available through a composite channel with a subscriber fee of $2.99/month. The internet-based content provider can automatically subscribe the user to the composite channel and notify the user of the additional component channels and premium media items that are now available to the user. In one implementation, the internet-based content provider can refund or credit a difference in subscriber fee when automatically subscribing the user to the composite channel. In another example similar to the example above, but the composite channel has a subscriber fee of $5.99/month. Although the user is paying an aggregate subscriber fee of $3.96/month, which is less than the composite channel fee, the internet-based content provider can subscribe the user to the composite channel and notify the user of the availability of the additional component channels and premium media items.

Figure 27:
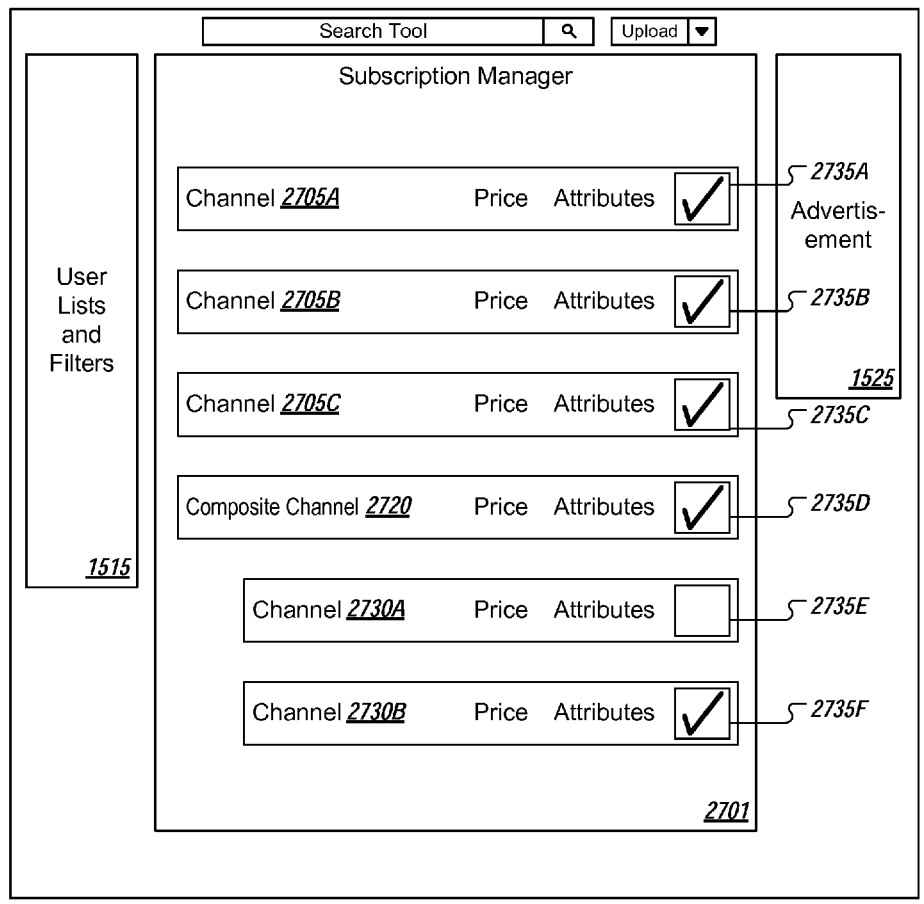
FIG. 27 illustrates an example subscription manager GUI in accordance with some implementation of the present disclosure.

FIG. 27 is a diagram that illustrates an example subscription manager GUI 2700 in accordance with some implementation of the present disclosure. The subscription manager GUI 2700 permits users to view or modify their channel subscriptions. The subscription manager GUI 2700 includes a subscription manager section 2701, user lists and filters 1515, and at least one advertisement 1525.

The subscription manager section 2701 can include a list of all of the user's subscribed channels. Using various GUI tools, the user can filter, sort and otherwise configure the display of the list of channels. As illustrated in FIG. 27, the subscribed channels have been filtered to show a user's paid channels, which includes three paid channels 2705A-C and one composite channel 2720. The user can view information about each of the channels, such as subscriber fees, subscription levels, types of access, subscription renewal status, billing cycles, rental expiration dates, subscription expiration dates, expired rentals, expired subscriptions, when the user subscribed to the channel, payment method, etc. In some implementations, the subscription manager section 2701 can present notifications to highlight various aspects of subscribed channels. For example, subscription manager section 2701 can change the color of a channel title, decryption or price (e.g., to red) to indicate that the subscription is getting close to expiration. The subscription manager section 2701 can also present a total price for all of the user's subscribed channels. The total price can also be presented with respect to price for a specific billing cycle, for example. Other examples of notifications can include a notification about subscriptions with potential payment problems (e.g., credit card expiring soon, credit card expired), subscriptions that the user canceled but still has access to until the end of the billing cycle, subscriptions the user has allowed to lapse, etc.

The subscription manager section 2701 can also present various interface tools to the user to permit the user to perform different actions with respect to the subscribed channels. For example, the user can renew a subscription to a channel from the subscription manager section 2701, modify an existing subscription (e.g., change a selected advertising attribute, subscription level or type of access), place a subscription on hold, or can cancel a subscription. In one implementation, a user can select an option for the internet-based content platform to remind the user when a subscription is going to end soon. The user can select a method of communicating such a reminder, such as email, text message, banner ad, etc. In the illustrate example, the subscription manager section 2701 includes a subscribe toggle 2735A-F that permits a user to quickly subscribe or unsubscribe to a channel.

For composite channels, such as composite channel 2720, the user can view all of the foregoing for the composite channel as well as for component channels 2730A-B of the composite channel 2720. In addition, subscription manager section 2701 may permit users to unsubscribe from a component channel without unsubscribing from the composite channel 2720 or from other component channels, as illustrated by the unchecked subscribe toggle 2735E.

Figure 28:
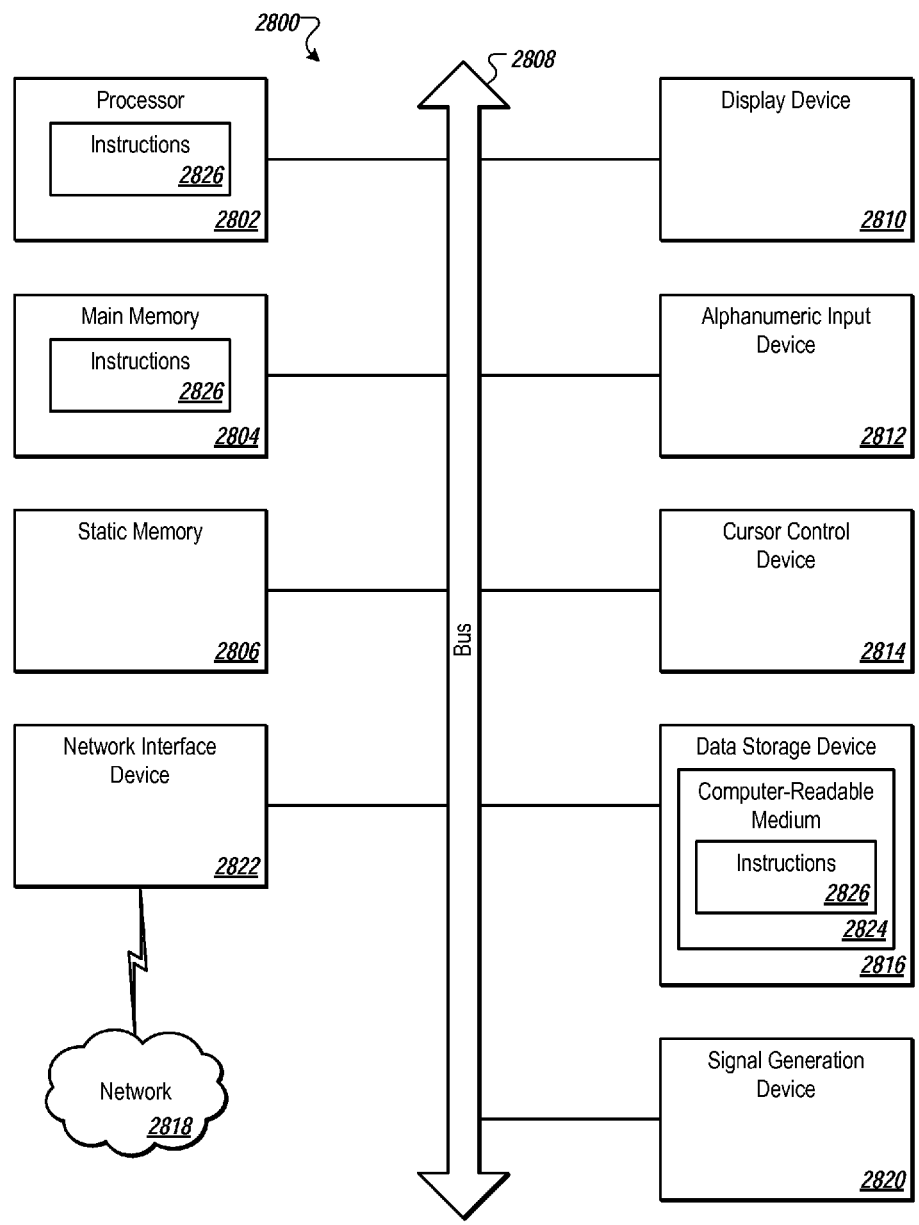
FIG. 28 illustrates block diagram of an example computing device that may perform one or more of the operations described herein.

FIG. 28 illustrates a diagrammatic representation of a machine in the example form of a computing device 2800 within which a set of instructions, for causing the machine to perform any one or more of the methodologies discussed herein, may be executed. The computing device 2800 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 2800 includes a processing device (e.g., a processor) 2802, a main memory 2804 (e.g., read-only memory (ROM), flash memory, dynamic random access memory (DRAM) such as synchronous DRAM (SDRAM)), a static memory 2806 (e.g., flash memory, static random access memory (SRAM)) and a data storage device 2816, which communicate with each other via a bus 2808.

Processing device 2802 represents one or more general-purpose processing devices such as a microprocessor, central processing unit, or the like. More particularly, the processing device 2802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 2802 may also be one or more special-purpose processing devices such as an application specific integrated circuit (ASIC), a field programmable gate array (FPGA), a digital signal processor (DSP), network processor, or the like. The processing device 2802 is configured to execute instructions 2826 for performing the operations and steps discussed herein.

The computing device 2800 may further include a network interface device 2822 which may communicate with a network 2818. The computing device 2800 also may include a display device 2810 (e.g., a liquid crystal display (LCD) or a cathode ray tube (CRT)), an alphanumeric input device 2812 (e.g., a keyboard), a cursor control device 2814 (e.g., a mouse) and a signal generation device 2820 (e.g., a speaker). In one implementation, the display device 2810, the alphanumeric input device 2812, and the cursor control device 2814 may be combined into a single component or device (e.g., an LCD touch screen).

The data storage device 2816 may include a computer-readable storage medium 2824 on which is stored one or more sets of instructions 2826 (e.g., channel subscription subsystem, channel content providing subsystem, channel advertisement management subsystem, channel content access management subsystem, composite channel management subsystem) embodying any one or more of the methodologies or functions described herein. The instructions 2826 may also reside, completely or at least partially, within the main memory 2804 and/or within the processing device 2802 during execution thereof by the computing device 2800, the main memory 2804 and the processing device 2802 also constituting computer-readable media. The instructions may further be transmitted or received over a network 2818 via the network interface device 2822.

While the computer-readable storage medium 2826 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "subscribing," "providing," "determining," "unsubscribing," "receiving," "generating," "changing," "requesting," "creating," "uploading," "adding," "presenting," "removing," "preventing," "playing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method implemented by an internet-based content platform, comprising:
adding, by a processing device, a subset of media items of a plurality of media items of a paid channel to a user interface for presentation to an end user, the paid channel created by the internet-based content platform responsive to a request of a channel curator, the paid channel presented to the end user in the user interface as a graphical user interface (GUI) object with an indicator of a subscription status of the end user with respect to the paid channel, the plurality of media items of the paid channel comprising at least one paid media item and at least one free media item;
receiving, via the user interface, a selection of one of the plurality of media items from the end user;
determining whether the selected media item is a free item or a paid item;
responsive to determining that the selected media item is a paid item:
determining that the end user is not a subscriber of the paid channel;
requesting the end user to subscribe to the paid channel to view the selected media item; and
upon receiving subscription information from the end user, causing the GUI object with the indicator of the subscription status of the end user to indicate in the user interface that the end user is subscribed to the paid channel, providing the selected media item for playback by the end user, and adding the paid channel to a feed generated for the end user, the feed presenting a plurality of channels currently subscribed to by the end user, and recent activities associated with the plurality of channels subscribed to by the end user;
responsive to determining that the selected media item is a free item, providing the selected media item for playback by the end user without requesting the end user to subscribe to the paid channel; and
removing the subset of media items of the paid channel from the feed in response to receiving a request from the end user to unsubscribe from the paid channel.

2. The method of claim 1, the plurality of media items comprising at least one of a video item, an audio item, an image, a blog entry, a tweet, a social network post, an online publication, a software program, or an online video game.

3. The method of claim 1, further comprising determining that the end user is a subscriber of the paid channel by:
requesting access credentials of the end user;
receiving the access credentials from the end user;
determining that the end user has previously subscribed to the paid channel based on the access credentials; and
providing access to the paid item.

4. The method of claim 3, wherein determining that the end user has previously subscribed to the paid channel comprises determining whether payment information of the end user has been received by the internet-based content platform.

5. The method of claim 1, wherein the at least one free media item is not a preview of any of the at least one paid item.

6. The method of claim 1, wherein the list of channels includes multiple paid channels of different channel curators.

7. The method of claim 6, wherein the different channel curators comprise one or more of a video hosting service, a video sharing service, a video broadcaster, a content creation service, a content rental service, a content purchasing service, a television service, or a television broadcaster.

8. The method of claim 1, further comprising:
prior to requesting the end user to subscribe to the paid channel, providing limited access to the paid item.

9. The method of claim 8, where the limited access includes at least one of: a trailer of the media item, a portion of the paid item, access to the paid item for a predetermined amount of time, or access to the paid item for a predetermined number of views.

10. The method of claim 1 further comprising receiving a request from the end user to create a new paid channel.

11. The method of claim 1, wherein the paid channel is a composite channel comprising a plurality of component channels.

12. The method of claim 11, wherein the composite channel includes at least one component channel and at least one media item that is not part of any component channel.

13. A system, comprising:
a memory; and
a processing device coupled with the memory, the processing device being configured to
add a subset of media items of a plurality of media items of a paid channel to a user interface for presentation to an end user, the paid channel created by the internet-based content platform responsive to a request of a channel curator, the paid channel presented to the end user in the user interface as a graphical user interface (GUI) object with an indicator of a subscription status of the end user with respect to the paid channel, the plurality of media items of the paid channel comprising at least one paid media item and at least one free media item;
receive, via the user interface, a selection of one of the plurality of media items from the end user;
determine whether the selected media item is a free item or a paid item;
responsive to determining that the selected media item is a paid item:
determine that the end user is not a subscriber of the paid channel;
request the end user to subscribe to the paid channel to view the selected media item; and
upon receiving subscription information from the end user, cause the GUI object with the indicator of the subscription status of the end user to indicate in the user interface that the end user is subscribed to the paid channel, provide the selected media item for playback by the end user, and add the paid channel to a feed generated for the end user, the feed presenting a plurality of channels currently subscribed to by the end user, and recent activities associated with the plurality of channels subscribed to by the end user;
responsive to determining that the selected media item is a free item, provide the selected media item for playback by the end user without requesting the end user to subscribe to the paid channel; and
remove the subset of media items of the paid channel from the feed in response to receiving a request from the end user to unsubscribe from the paid channel.

14. The system of claim 13, wherein the processing device is further configured to determine that the end user is a subscriber of the paid channel by:
requesting access credentials of the end user;
receiving the access credentials from the end user;

determining that the end user has previously subscribed to the paid channel based on the access credentials; and providing access to the paid item.

15. The system of claim 13, wherein the list of channels includes multiple paid channels of different channel curators.

16. The system of claim 15, wherein the different channel curators comprise one or more of a video hosting service, a video sharing service, a video broadcaster, a content creation service, a content rental service, a content purchasing service, a television service, or a television broadcaster.

17. The system of claim 13, wherein the paid channel is a composite channel comprising a plurality of component channels.

18. The system of claim 17, wherein the composite channel includes at least one component channel and at least one media item that is not part of any component channel.

19. A non-transitory computer readable storage medium, having instructions stored therein, which when executed, cause a processing device to perform operations comprising:

adding a subset of media items of a plurality of media items of a paid channel to a user interface for presentation to an end user, the paid channel created by the internet-based content platform responsive to a request of a channel curator, the paid channel presented to the end user in the user interface as a graphical user interface (GUI) object with an indicator of a subscription status of the end user with respect to the paid channel, the plurality of media items of the paid channel comprising at least one paid media item and at least one free media item;

receiving, via the user interface, a selection of one of the plurality of media items from the end user;

determining whether the selected media item is a free item or a paid item;

responsive to determining that the selected media item is a paid item:

determining that the end user is not a subscriber of the paid channel;

requesting the end user to subscribe to the paid channel to view the selected media item; and upon receiving subscription information from the end user, causing the GUI object with the indicator of the subscription status of the end user to indicate in the user interface that the end user is subscribed to the paid channel, providing the selected media item for playback by the end user, and adding the paid channel to a feed generated for the end user, the feed presenting a plurality of channels currently subscribed to by the end user, and recent activities associated with the plurality of channels subscribed to by the end user;

responsive to determining that the selected media item is a free item, providing the selected media item for playback by the end user without requesting the end user to subscribe to the paid channel; and removing the subset of media items of the paid channel from the feed in response to receiving a request from the end user to unsubscribe from the paid channel.

20. The non-transitory computer readable storage medium of claim 19, wherein the at least one free media item is not a preview of any of the at least one paid item.

21. The non-transitory computer readable storage medium claim 19, wherein the processing device to further perform operations comprising:

prior to requesting the end user to subscribe to the paid channel, providing limited access to the paid item.

22. The non-transitory computer readable storage medium of claim 21, where the limited access includes at least one of: a trailer of the media item, a portion of the paid item, access to the paid item for a predetermined amount of time, or access to the paid item for a predetermined number of views.

23. The non-transitory computer readable storage medium of claim 19, wherein the processing device to further perform operations comprising receiving a request from the end user to create a new paid channel.

* * * * *